(12) United States Patent
Abe et al.

(10) Patent No.: US 10,837,977 B2
(45) Date of Patent: Nov. 17, 2020

(54) RACK FOR DISPENSING AND DISPENSING SYSTEM

(71) Applicant: KABUSHIKI KAISHA YASKAWA DENKI, Kitakyushu (JP)

(72) Inventors: Noriko Abe, Fukuoka (JP); Yukio Hashiguchi, Fukuoka (JP); Makoto Umeno, Fukuoka (JP); Hiroshi Kumagai, Fukuoka (JP); Yukiko Sawada, Fukuoka (JP); Motohisa Kamei, Fukuoka (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 596 days.

(21) Appl. No.: 15/146,291

(22) Filed: May 4, 2016

(65) Prior Publication Data

US 2016/0334429 A1 Nov. 17, 2016

(30) Foreign Application Priority Data

May 11, 2015 (WO) .................. PCT/JP2015/063515
Jul. 31, 2015 (JP) ................................ 2015-152910

(51) Int. Cl.
*B25J 9/16* (2006.01)
*B01L 9/06* (2006.01)
*G01N 35/00* (2006.01)
*G01N 35/10* (2006.01)

(52) U.S. Cl.
CPC ............ *G01N 35/0099* (2013.01); *B01L 9/06* (2013.01); *B25J 9/1679* (2013.01); *B01L 2200/025* (2013.01); *G01N 35/00584* (2013.01); *G01N 35/1002* (2013.01); *G01N 35/1011* (2013.01); *G01N 2035/1025* (2013.01); *G05B 2219/39024* (2013.01); *G05B 2219/39217* (2013.01);

(Continued)

(58) Field of Classification Search
None
See application file for complete search history.

(56) References Cited

U.S. PATENT DOCUMENTS

| 4,730,435 A | 3/1988 | Riddle et al. |
| 5,106,584 A * | 4/1992 | Funakubo ............ G01N 35/028 422/63 |
| 5,337,919 A | 8/1994 | Spaulding et al. |

(Continued)

FOREIGN PATENT DOCUMENTS

| JP | 2005-304303 A | 11/2005 |
| JP | 2010-096643 A | 4/2010 |

(Continued)

OTHER PUBLICATIONS

International Search Report dated Oct. 6, 2015 in PCT/JP2015/071887 (with English Translation of Categories of Cited Documents).

(Continued)

*Primary Examiner* — Jill A Warden
*Assistant Examiner* — Brittany I Fisher
(74) *Attorney, Agent, or Firm* — Oblon, McClelland, Maier & Neustadt, L.L.P.

(57) ABSTRACT

A rack includes a container holder that is fixed to a stage and holds a container that contains a liquid to be dispensed and a camera that is fixed to the stage and located in a position where the camera is capable of capturing an image of the container.

20 Claims, 34 Drawing Sheets

(52) U.S. Cl.
CPC ............. *G05B 2219/40073* (2013.01); *G05B 2219/40609* (2013.01)

(56) References Cited

U.S. PATENT DOCUMENTS

| | | | |
|---|---|---|---|
| 5,341,854 A | 8/1994 | Zezulka et al. | |
| 5,366,896 A | 11/1994 | Margrey et al. | |
| 5,431,201 A | 7/1995 | Torchia et al. | |
| 5,534,222 A | 7/1996 | Kelbrick et al. | |
| 5,786,598 A | 7/1998 | Clark et al. | |
| 5,797,515 A | 8/1998 | Liff et al. | |
| 5,805,454 A | 9/1998 | Valerino et al. | |
| 5,925,885 A | 7/1999 | Clark et al. | |
| 5,941,867 A | 8/1999 | Kao | |
| 6,037,598 A | 3/2000 | Cicha | |
| 6,048,086 A | 4/2000 | Valerino, Sr. | |
| 6,066,294 A | 5/2000 | Lin et al. | |
| 6,083,763 A | 7/2000 | Balch | |
| 6,673,316 B1 | 1/2004 | Okamoto et al. | |
| 6,832,844 B2 | 12/2004 | Guzorek | |
| 10,406,552 B2 | 9/2019 | Tomuta et al. | |
| 2003/0049863 A1* | 3/2003 | Woodward | B01L 3/0262 436/180 |
| 2003/0074223 A1 | 4/2003 | Hickle et al. | |
| 2003/0103839 A1 | 6/2003 | Osborne et al. | |
| 2004/0034447 A1 | 2/2004 | Vollm | |
| 2004/0067482 A1* | 4/2004 | Yasuda | C12M 25/00 435/4 |
| 2004/0154690 A1 | 8/2004 | Osborne et al. | |
| 2005/0084423 A1* | 4/2005 | Zarowitz | B01L 3/021 422/504 |
| 2005/0123445 A1 | 6/2005 | Blecka et al. | |
| 2005/0224137 A1 | 10/2005 | Tribble et al. | |
| 2005/0226779 A1 | 10/2005 | Oldham et al. | |
| 2005/0231723 A1 | 10/2005 | Blasenheim et al. | |
| 2005/0236579 A1 | 10/2005 | Jenkins et al. | |
| 2005/0252572 A1 | 11/2005 | Khan et al. | |
| 2005/0252574 A1 | 11/2005 | Khan et al. | |
| 2005/0273196 A1 | 12/2005 | Valerino, Sr. | |
| 2005/0279419 A1 | 12/2005 | Tribble et al. | |
| 2006/0006190 A1 | 1/2006 | Janet et al. | |
| 2006/0105359 A1 | 5/2006 | Favuzzi et al. | |
| 2006/0133965 A1* | 6/2006 | Tajima | G01N 35/1009 422/400 |
| 2006/0157507 A1 | 7/2006 | Chang et al. | |
| 2006/0259195 A1 | 11/2006 | Eliuk et al. | |
| 2007/0125442 A1 | 6/2007 | Tribble et al. | |
| 2007/0177778 A1* | 8/2007 | Massaro | G01N 35/1016 382/128 |
| 2008/0096285 A1* | 4/2008 | Koyata | G01N 21/59 436/164 |
| 2008/0227663 A1* | 9/2008 | Tisone | B01J 19/0046 506/39 |
| 2009/0325309 A1* | 12/2009 | Favuzzi | G01N 35/1002 436/180 |
| 2010/0028124 A1* | 2/2010 | Lackner | G01N 35/0099 414/806 |
| 2010/0028203 A1* | 2/2010 | Frey | G01N 35/0099 422/65 |
| 2010/0092032 A1* | 4/2010 | Boca | B25J 9/1679 382/103 |
| 2010/0092683 A1 | 4/2010 | Ermantraut et al. | |
| 2010/0111767 A1* | 5/2010 | Yonekura | G01N 35/00732 422/65 |
| 2012/0195794 A1* | 8/2012 | Lebl | B01L 3/50273 422/63 |
| 2013/0017127 A1* | 1/2013 | Tokumaru | C12M 23/10 422/509 |
| 2013/0019697 A1 | 1/2013 | McKeen et al. | |
| 2013/0076882 A1 | 3/2013 | Itoh | |
| 2013/0280143 A1* | 10/2013 | Zucchelli | B25J 9/1697 422/501 |
| 2014/0079871 A1* | 3/2014 | Lu | H05K 3/3484 427/8 |
| 2014/0112829 A1* | 4/2014 | Thomas | G01N 35/00 422/63 |
| 2014/0120192 A1* | 5/2014 | Nakayama | C12M 21/08 425/135 |
| 2014/0273194 A1* | 9/2014 | Handique | G01N 21/6428 435/288.7 |
| 2014/0296089 A1 | 10/2014 | Holmes et al. | |
| 2015/0111198 A1* | 4/2015 | Brisebat | G01N 35/0099 435/5 |
| 2015/0127157 A1 | 5/2015 | Matsukuma | |
| 2015/0276772 A1 | 10/2015 | Dockrill et al. | |

FOREIGN PATENT DOCUMENTS

| | | |
|---|---|---|
| JP | 2010-197047 A | 9/2010 |
| JP | 2012-526996 A | 11/2012 |
| JP | 2013-72806 A | 4/2013 |
| WO | WO 2010/132823 A2 | 11/2010 |
| WO | WO 2015/066342 A1 | 5/2015 |

OTHER PUBLICATIONS

Office Action dated Oct. 23, 2018 in Japanese Patent Application No. 2015-152910, 4 pages (with partial English translation).

Office Action dated Aug. 21, 2018 in Japanese Patent Application No. 2017-517582, with English translation, 6 pages.

International Preliminary Report on Patentability and Written Opinion dated Nov. 23, 2017 in PCT/JP2015/063515 (submitting English translation only).

International Preliminary Report on Patentability and Written Opinion dated Nov. 23, 2017 in PCT/JP2015/071887 (submitting English translation only).

Extended European Search Report dated Feb. 12, 2019 in European Patent Application No. 15891896.1, 10 pages.

Office Action dated Oct. 17, 2019 in corresponding U.S. Appl. No. 15/806,339.

\* cited by examiner

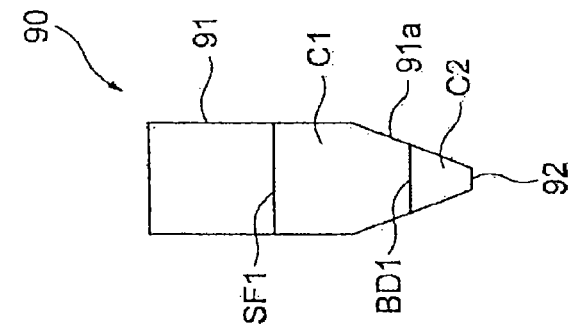
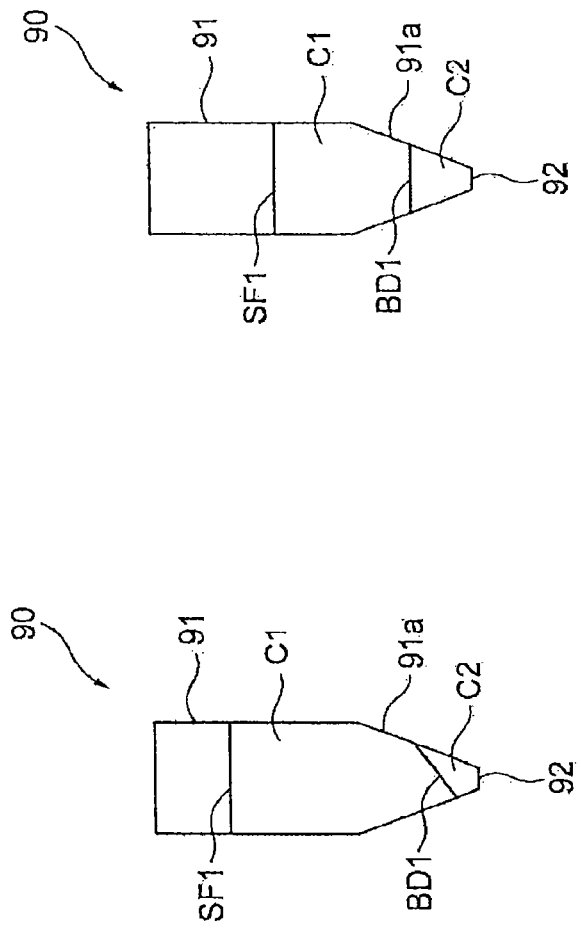

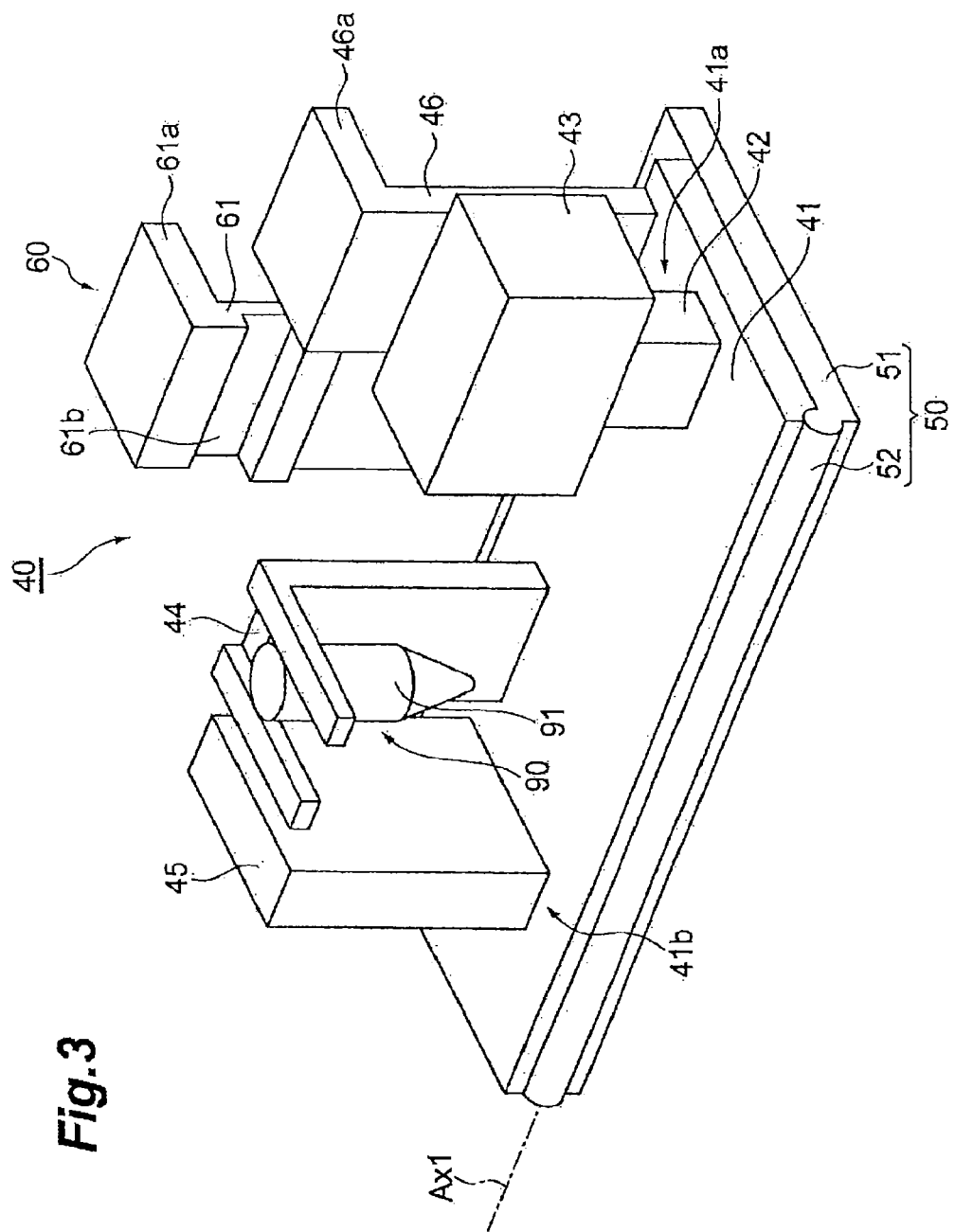

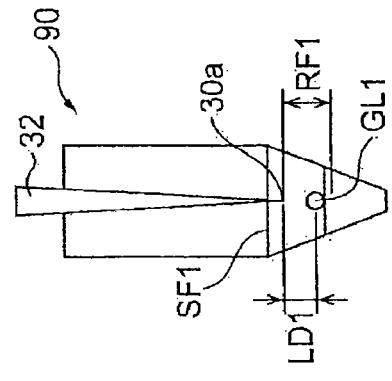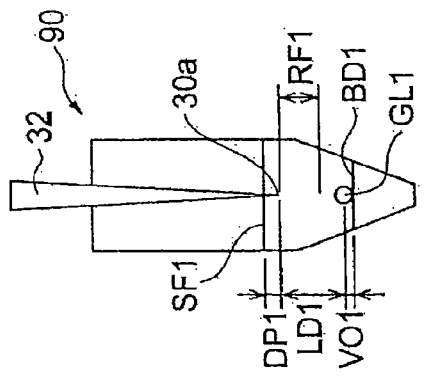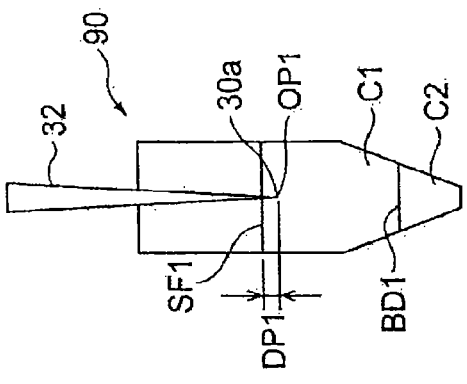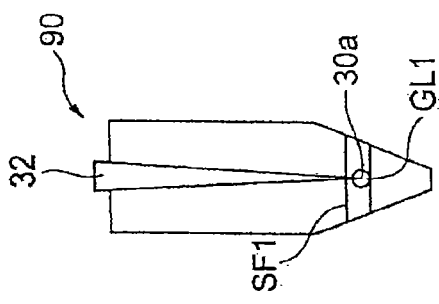
Fig.16A Fig.16B Fig.16C Fig.16D Fig.16E

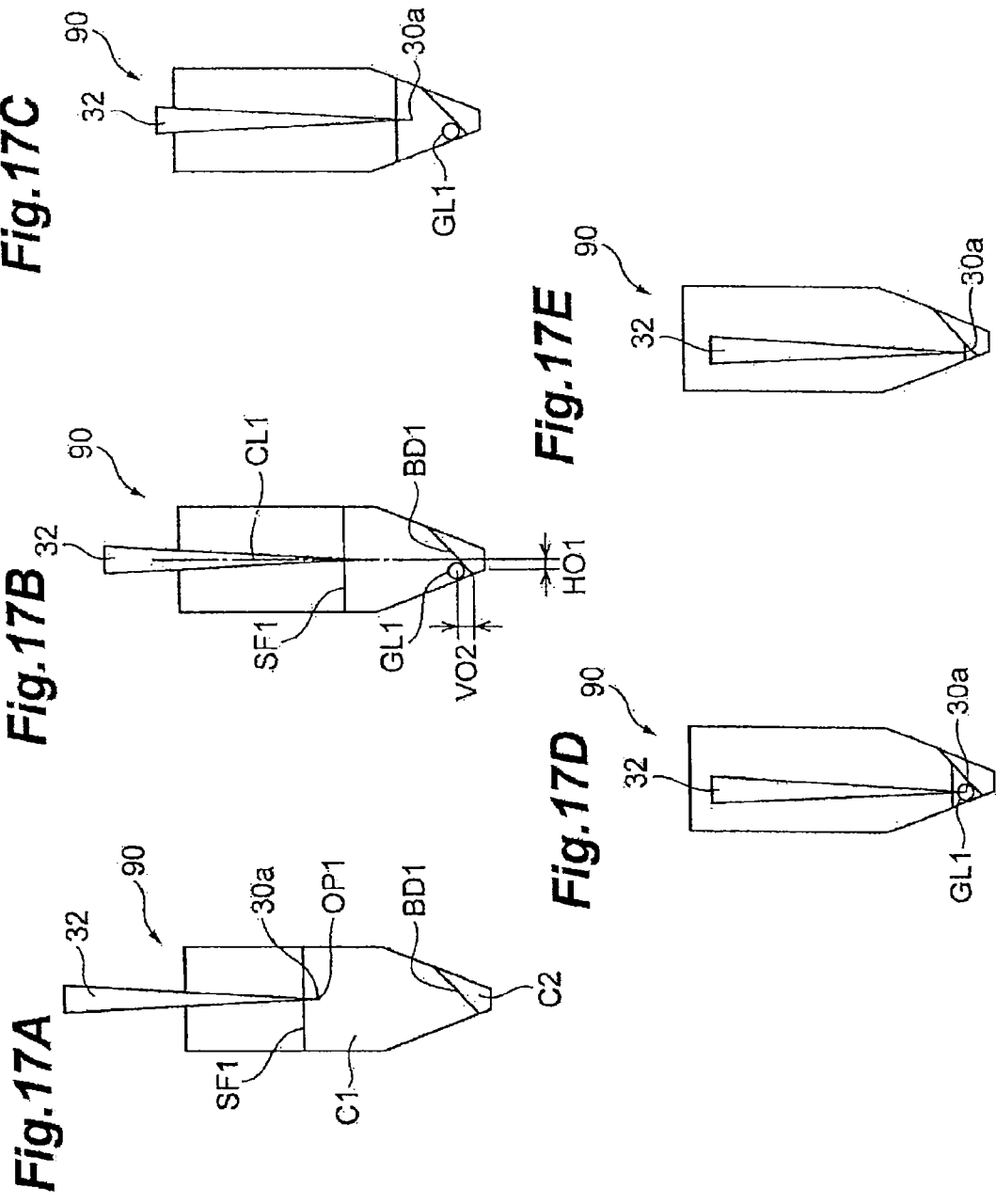

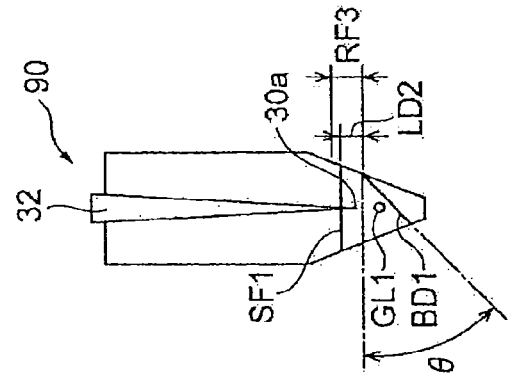
Fig.21A  Fig.21B  Fig.21C
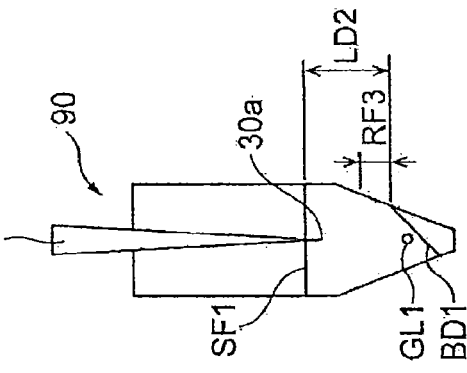
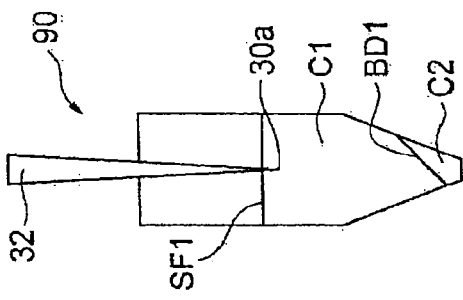
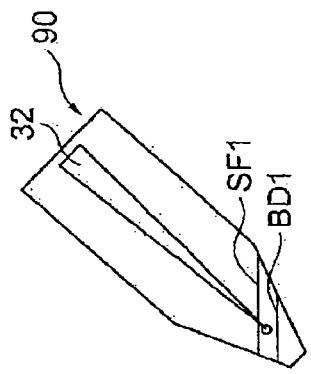
Fig.21D  Fig.21E

RACK FOR DISPENSING AND DISPENSING SYSTEM

CROSS-REFERENCE TO RELATED APPLICATION

This application is based upon and claims the benefit of priority from International Application No. PCT/JP2015/063515, filed on May 11, 2015, and Japanese Patent Application No. 2015-152910, filed on Jul. 31, 2015, the entire contents of which are incorporated herein by reference.

BACKGROUND

1. Field

The present disclosure relates to a rack for dispensing and a dispensing system.

2. Description of the Related Art

Japanese Unexamined Patent Publication No. 2005-304303 discloses a supply/discharge robot including a chip, a liquid transfer power apparatus that sucks a sample into the chip or discharges the sample in the chip, a chip transport mechanism, detection means for detecting the position of the liquid surface of the sample, and a control apparatus that controls, when the sample is sucked, the liquid transfer power apparatus and the chip transport mechanism on the basis of the position of the liquid surface of the sample in such a way that the contact between the front end of the chip and the liquid surface of the sample is maintained.

SUMMARY

A rack for dispensing according to the present disclosure comprises a container holder that is fixed to a stage and holds a container that contains a liquid to be dispensed and a camera that is fixed to the stage and located in a position where the camera is capable of capturing an image of the container held by the container holder.

A dispensing system according to the present disclosure comprises a rack for dispensing including a container holder that is fixed to a stage and holds a container that contains a liquid to be dispensed, and a camera that is fixed to the stage and located in a position where the camera is capable of capturing an image of the container held by the container holder, a robot, and a controller configured to control the robot so as to transport the container and cause the container holder to hold the container, acquire information on a position of a liquid surface of the liquid based on the image captured with the camera, control the robot so as to tilt the rack, and control the robot so as to cause a dispenser to descend based on the information on the position of the liquid surface when the liquid is sucked into the dispenser.

BRIEF DESCRIPTION OF THE DRAWINGS

FIGS. 2A and 2B are side views of a microtube;
FIG. 3 is a perspective view of a rack;
FIGS. 16A to 16E are side views diagrammatically showing the microtube at the time of sucking;
FIGS. 17A to 17E are side views diagrammatically showing the microtube at the time of sucking;
FIGS. 21A to 21E are side views diagrammatically showing the microtube at the time of sucking.

DETAILED DESCRIPTION

1. First Embodiment

1.1 Dispensing System

Figure 1:
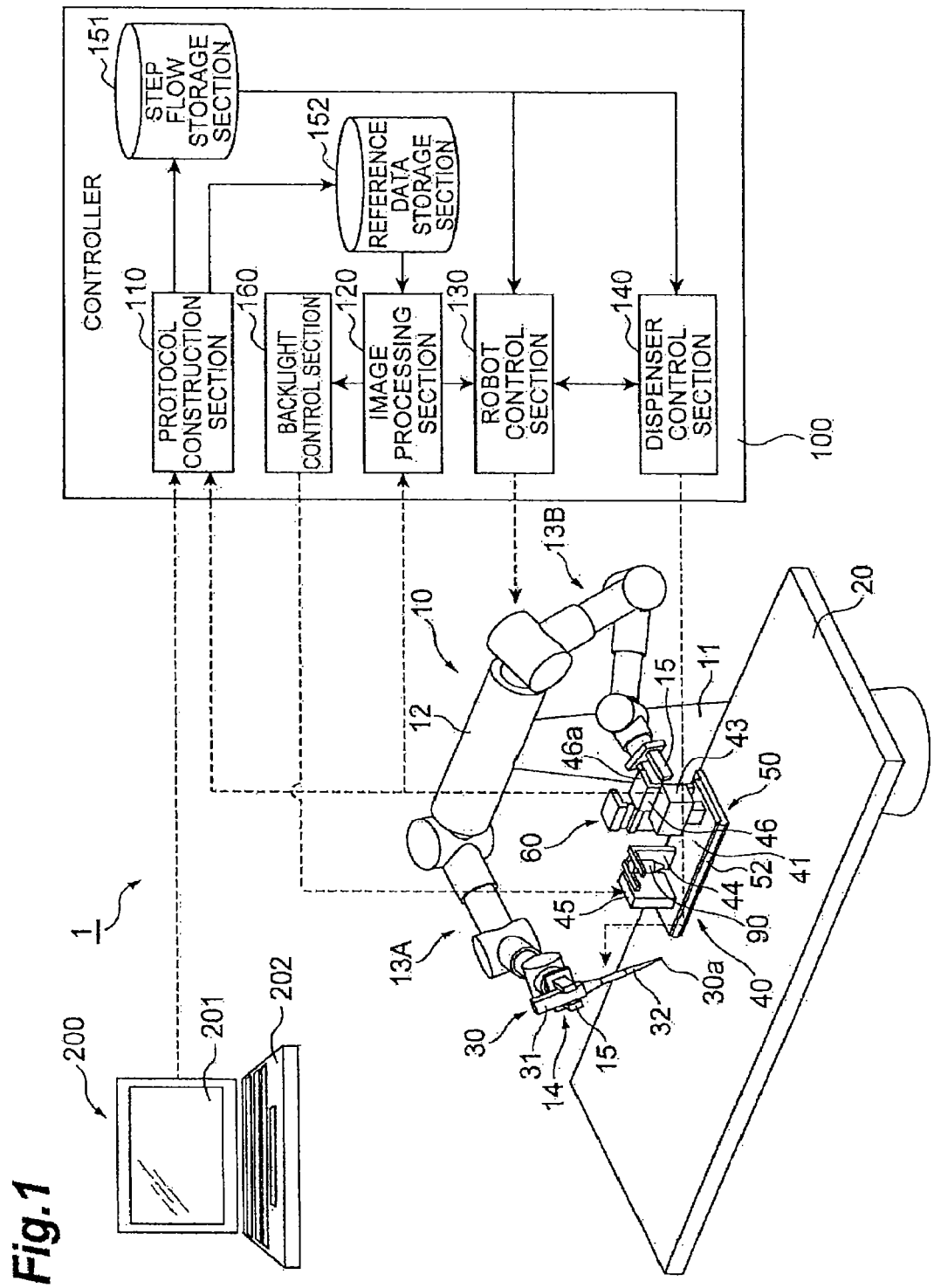
FIG. 1 is a diagrammatic view showing the configuration of a dispensing system according to a first embodiment.

A dispensing system 1 according to a first embodiment is a system for performing dispensing work in which liquid stored in a container 90 is selectively taken out. The container 90 contains an object of the work performed by the dispensing system 1. The container 90 is made of a material that allows transmission of visible light or light of a specific wavelength. The container 90 is, for example, a microtube and has a tubular sidewall 91 and a bottom 92 (see FIGS. 2A and 2B). A lower section 91a of the sidewall 91 has a tapered shape in which the lower section 91a tapers off toward the bottom 92. The container 90 is not limited to such a microtube and may have any shape that can contain an object and transmit visible light or light of a specific wavelength.

The object contained in the container 90 is separated, for example, in centrifugal separation into a liquid C1 to be dispensed and a non-dispensed object C2. The liquid C1 forms a liquid surface SF1, and the non-dispensed object C2 is located below the liquid surface SF1. Examples of the non-dispensed object C2 include solid precipitate and liquid separated from the liquid C1. When the non-dispensed object C2 is liquid, the boundary BD1 between the liquid C1 and the non-dispensed object C2 is parallel to the liquid surface SF1 (see FIG. 2B). When the non-dispensed object C2 is solid precipitate, the boundary BD1 may tilt with respect to the liquid surface SF1 in some cases (see FIG. 2A).

The boundary BD1 is visible from outside the container 90. For example, when the liquid C1 and the non-dispensed object C2 differ from each other in terms of transmissivity of light transmissible through the container 90, the boundary BD1 is visible. Further, when the liquid C1 and the non-dispensed object C2 differ from each other in terms of refractive index in accordance with which light transmissible through the container 90 is refracted, the boundary BD1 is also visible.

The dispensing system 1, for example, takes out the liquid C1 to be dispensed from the interior of the container 90 with the non-dispensed object C2 left in the container 90 and transfers the extracted liquid C1 into another container 90. The non-dispensed object C2 is merely "a non-dispensed target" in the step flow of dispensing the liquid C1. In a step flow after the liquid C1 is dispensed, the dispensing system 1 further dispenses the non-dispensed object C2 itself in some cases. Each component of the dispensing system 1 will be described below.

(1) Robot 10 and Camera 43

The dispensing system 1 includes a robot 10 and a camera 43, as shown in FIG. 1. The robot 10 is used to move a dispenser 30 and perform other types of work. The dispenser 30 sucks the liquid C1 to be dispensed. Examples of the dispenser 30 include a motorized pipette or syringe that automatically sucks and delivers liquid in response to a specific signal or specific operation. The dispenser 30 is not necessarily motorized and may instead, for example, be a manual syringe or pipette. In this case, the two arms of the double-arm robot 10 may be used to manipulate the dispenser 30, as will be described later. As described above, the dispenser 30 may be configured in any manner as long as the dispenser 30 is capable of sucking the liquid C1. The following description will be made with reference to a case where the dispenser 30 is a motorized pipette.

The dispenser 30 has a main body 31 and a chip 32. The main body 31 has, for example, a built-in motorized pump and operates in accordance with an instruction input. The chip 32 is removably attached to the main body 31. The chip 32 has, for example, a tubular shape with a tapered front portion and forms a front end section 30a of the dispenser 30. The dispenser 30 sucks the liquid through the front end section 30a when the main body 31 lowers the pressure in the chip 32 and delivers the liquid through the front end section 30a when the main body 31 raises the pressure in the chip 32.

The robot 10 may be any robot capable of moving the dispenser 30. The robot 10 may be a single-arm robot or a double-arm robot. The robot 10 shown in FIG. 1 is a double-arm robot by way of example. The robot 10 includes a body 11, a shoulder 12, a first arm 13A, and a second arm 13B. The body 11 stands from a floor surface. The shoulder 12 is attached to an upper portion of the body 11 and pivotable around a vertical axis. The arms 13A and 13B are each, for example, a serial-link multi joint arm and attached to opposite ends of the shoulder 12. A grip mechanism 14 is provided at the end of each of the arms 13A and 13B. The grip mechanism 14 is, for example, a robot hand having a plurality of fingers 15 and grips a variety of workpieces by opening and closing the fingers 15.

The camera 43 captures an image containing at least the front end section 30a of the dispenser 30, the liquid surface SF1 of the liquid C1, and the non-dispensed object C2. The camera 43 is, for example, a CCD (charge coupled device) image sensor, a CMOS (complementary metal oxide semiconductor) image sensor, or any other imaging element, captures an image in accordance with an instruction input, and outputs data on the image.

(2) Table

The dispensing system 1 may further include a table 20. The table 20 is combined with the robot 10 and supports a workpiece manipulated by the robot 10.

(3) Rack

The dispensing system 1 may further include a rack 40, which includes the camera 43 as a component of the rack 40. The rack 40 includes a stage 41, a container holder 44, and the camera 43, as shown, for example, in FIGS. 1 and 3. The stage 41 is, for example, a rectangular plate-shaped body (support plate) and is disposed on the table 20 in such a way as to be tiltable. The stage 41 may be any stage that is not substantially deformed (excluding minute deformation due, for example, to distortion of constituent material). For example, the stage 41 may be a block or a frame structure.

The container holder 44 is fixed to the stage 41 and holds the container 90. For example, the container holder 44 is provided on the upper surface of the plate-shaped stage 41 and holds the container 90 in such a way that the sidewall 91 is perpendicular to the upper surface.

The camera 43 is fixed to the stage 41 and located in a position where the camera 43 can capture an image of the container 90. For example, the camera 43 is disposed in such a way that a central axis CL2 thereof (optical axis of optical system) passes through the container 90 and is fixed to a column 42 (camera holder 41a), which protrudes from the upper surface of the stage 41. The camera holder 41a holds the camera 43 in a posture that allows the camera 43 to capture an image containing at least part of the liquid surface SF1 of the liquid C1 in the container 90, at least part of the non-dispensed object C2 in the container 90, and the front end section 30a inserted into the container 90.

The rack 40 may further include a stage holder 50. The stage holder 50 holds the stage 41 in such a way that the stage 41 is rotatable around an axis Ax1 (first axis) extending along the direction in which the container holder 44 and the camera 43 are aligned with each other. For example, the stage holder 50 includes a support plate 51 and a hinge 52.

The support plate 51 is, for example, a rectangular plate-shaped body. The hinge 52 links the stage 41 with the support plate 51 in such a way that the stage 41 and the support plate 51 are rotatable relative to each other around one side of the support plate 51 along the axis Ax1. The stage 41 is therefore rotatable around the axis Ax1. The support plate 51 is, for example, disposed on the table 20 in such a way that the stage 41 is layered on the support plate 51 and the hinge 52 is located on the side opposite the robot 10. The support plate 51 may be fixed to the table 20, for example, by using bolt fastening. Even when the support plate 51 is fixed to the table 20, the stage 41 is rotatable around the axis Ax1.

The rack 40 may further include a grip 46. The grip 46 is, for example, provided on the stage 41 and on the side opposite the hinge 52. When the hinge 52 is located on the side opposite the robot 10, the grip 46 is located on the side facing the robot 10. The grip 46 protrudes from the upper surface of the stage 41, and an upper portion 46a of the grip 46 overhangs toward the side opposite the hinge 52. Moving the upper portion 46a of the grip 46 upward and downward allows the stage 41 to rotate around the axis Ax1 and tilt the rack 40. The phrase "tilt the rack 40" means tilting part or entirety of the rack 40 to tilt an object held by the rack 40.

The rack 40 may further include an angle keeper 60. The angle keeper 60 maintains a tilt angle of the stage 41 having been tilted by the robot 10. The angle keeper 60 includes, for example, a stopper 61. The stopper 61 is provided on the support plate 51 and on the side opposite the hinge 52. The stopper 61 protrudes from the upper surface of the support plate 51, and an upper section 61a of the stopper 61 overhangs toward the side opposite the hinge 52. The stopper 61 has a groove 61b, which faces the hinge 52. An edge portion of the stage 41 can be fit into the groove 61b.

Figure 4B:
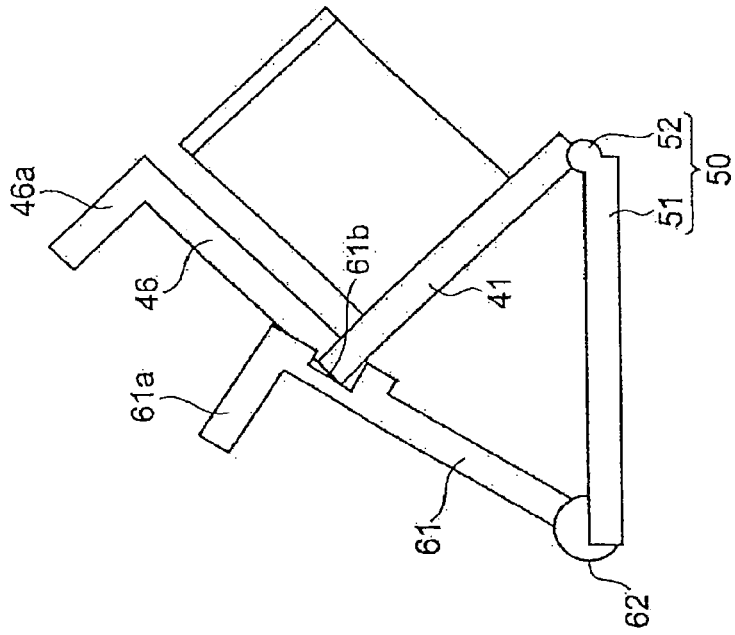
FIGS. 4A and 4B are side views of the rack.
Figure 4A:
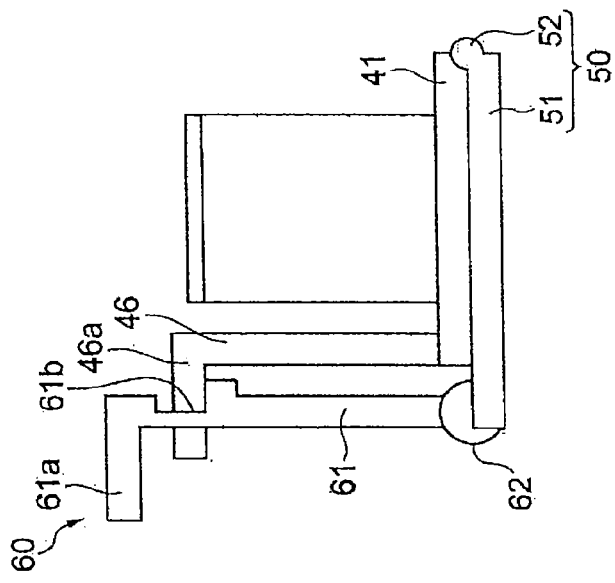

The stopper 61 is rotatable in such a way as to allow the groove 61b to approach and move away from the hinge 52. A base portion of the stopper 61 is connected to the support plate 51 via a hinge 62, which is parallel to the hinge 52, as shown, for example, in FIG. 4A. When the stopper 61 is inclined toward the hinge 52 with the stage 41 rotated and the edge portion of the stage 41 is fit into the groove 61b, the stage 41 is trapped, as shown in FIG. 4B. The tilt angle of the stage 41 is thus maintained.

(4) Light

The dispensing system 1 may further include a light 45. The light 45 radiates light toward the container 90 held by the container holder 44. The light 45 radiates light at least over the image capturing range of the camera 43. The light radiated by the light 45 only needs to be transmissible through the container 90 and detectable with the camera 43. For example, the light 45 may radiate red visible light. Examples of a light source of the light 45 include an LED (light emitting diode).

The light 45 may be fixed to the stage 41 to form part of the rack 40. That is, the rack 40 may further include the light 45. In this case, the light 45 may be fixed to the stage 41 in an arrangement in which the container 90 is sandwiched between the light 45 and the camera 43. That is, the container holder 44 may be located between the camera 43 and the light 45. For example, the light 45 is held by the stage 41, specifically, a portion (light holder 41b) that sandwiches, along with the camera holder 41a, the container holder 44. The light holder 41b holds the light 45 in a posture that allows the light to emit light toward the container 90.

(5) Controller

The dispensing system 1 further includes a controller 100. The controller 100 is configured at least to acquire information on the position of the liquid surface SF1, information on the position of the boundary BD1, and information on the position of the front end section 30a of the dispenser 30 on the basis of an image captured with the camera 43 and control the robot 10 when the liquid C1 is sucked into the dispenser 30 so as to cause the dispenser 30 to descend on the basis of the information on the position of the front end section 30a, the information on the position of the liquid surface SF1, and the information on the position of the boundary BD1.

The controller 100 may include a console 200 as a user interface. The console 200 includes a monitor 201 and an input device 202, such as a keyboard. The console 200 may be a touch panel formed of a monitor and an input device integrated with each other.

The controller 100 may be any component that performs the processes described above. In the following description, the configuration of the controller 100 will be described in detail with reference to FIG. 1 and FIGS. 5 to 7. The controller 100 includes the following functional modules: a protocol construction section 110; an image processing section 120; a backlight control section 160; a robot control section 130; a dispenser control section 140; a step flow storage section 151; and a reference data storage section 152.

The protocol construction section 110 sets step flows of a variety of types of work performed by the robot 10 including a plurality of types of dispensing work, registers the step flows in the step flow storage section 151, and registers reference data for dispensing work in the reference data storage section 152. The reference data is data required to control the robot 10 and contains data for image processing. Examples of the data for image processing include an image pattern for image recognition.

The image processing section 120 acquires the information on the position of the liquid surface SF1, the information on the position of the boundary BD1, and the information on the position of the front end section 30a on the basis of the image captured with the camera 43 and the reference data registered in the reference data storage section 152.

The backlight control section 160 switches the state of the light 45 between a light-on state and a light-off state. For example, the backlight control section 160 turns off the light 45 for at least part of a time frame for which the camera 43 performs no image capturing. The burden on an operator's eyes can therefore be reduced.

The robot control section 130 controls the robot 10 on the basis of the positional information acquired by the image processing section 120 and the work step flows registered in the step flow storage section 151.

The dispenser control section 140 controls the dispenser 30 in synchronization with the control of the robot 10 on the basis of the work step flows registered in the step flow storage section 151. For example, when the dispenser 30 is a motorized dispenser, the dispenser control section 140 enables and disables the suction performed by the dispenser 30. The dispenser control section 140 may control the robot 10 so as to operate an ON/OFF switch of the dispenser 30 instead of controlling the dispenser 30 itself. When the dispenser 30 is a manual dispenser, the dispenser control section 140 may control the robot 10 so as to manipulate the dispenser 30. For example, when the dispenser 30 is a manual syringe, the dispenser control section 140 may control the robot 10 in such a way that one of the arms 13A and 13B grips an outer tube of the syringe and the other one of the arms 13A and 13B pushes and pulls a plunger of the syringe.

Figure 5:
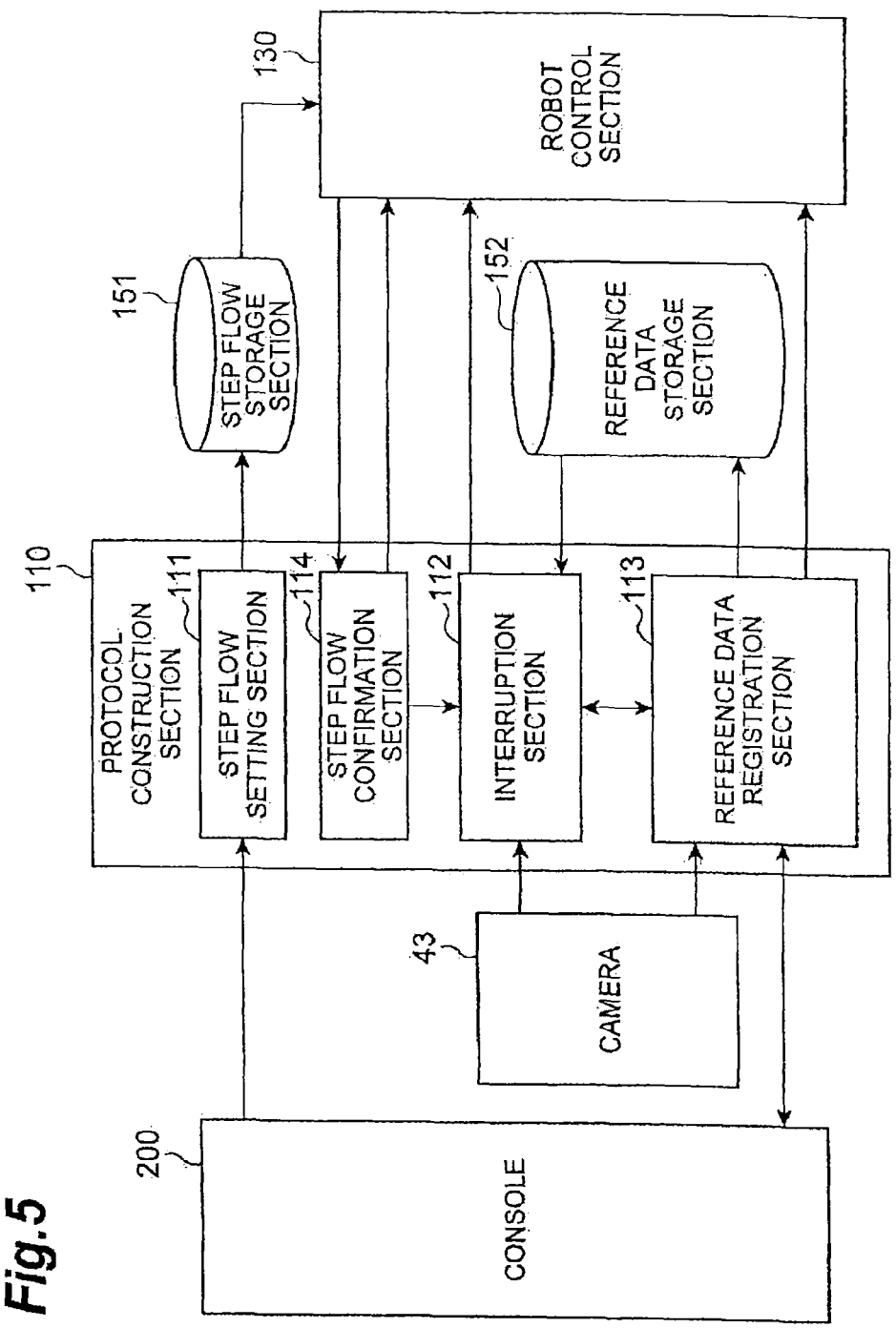
FIG. 5 is a functional block diagram of a protocol construction section.

The protocol construction section 110 includes a step flow setting section 111, a step flow confirmation section 114, an interruption section 112, and a reference data registration section 113, as shown in FIG. 5.

The step flow setting section 111 sets step flows of a variety of types of work performed by the robot 10 including a plurality of types of dispensing work. Specifically, the step flow setting section 111 acquires step flows of a variety of types of work performed by the robot 10 including a plurality of types of dispensing work through the console 200 and registers the step flows in the step flow storage section 151. The console 200 thus functions as a user interface for registering the work step flows.

The step flow confirmation section 114 confirms the content of work to be performed by the robot control section 130.

The interruption section 112 stops the robot 10 via the robot control section 130, when the robot 10 is about to perform dispensing work by using unregistered reference data, and resumes the action of the robot 10 after the reference data is registered.

The reference data registration section 113 displays a reference data setting screen on the console 200, when the interruption section 112 keeps stopping the robot 10, acquires reference data through the console 200, and registers the reference data. The console 200 thus functions also as a user interface for registering reference data.

Figure 6:
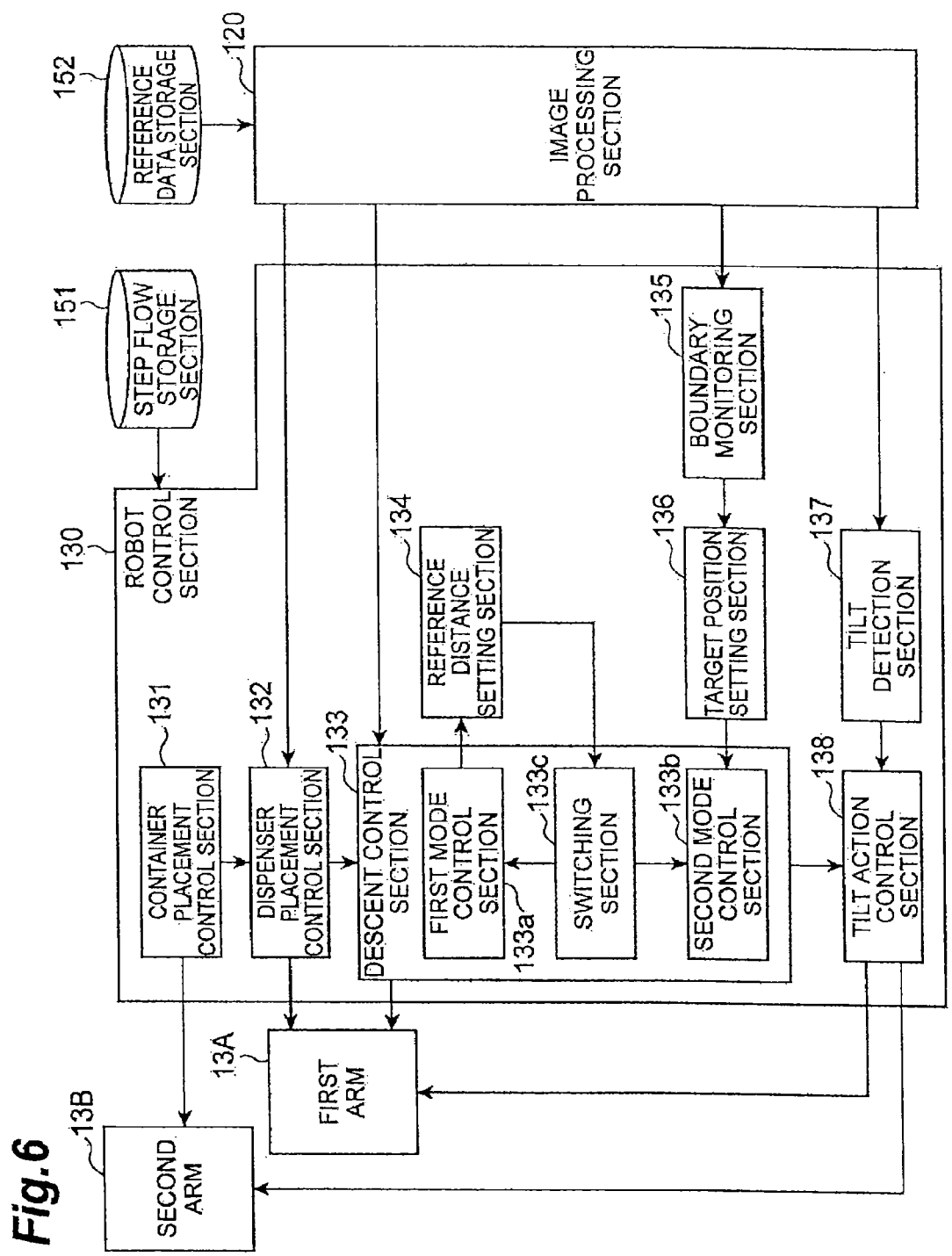
FIG. 6 is a functional block diagram of a robot control section.

The robot control section 130 includes a container placement control section 131, a dispenser placement control section 132, a descent control section 133, a reference distance setting section 134, a boundary monitoring section 135, a target position setting section 136, a tilt detection section 137, and a tilt action control section 138, as shown in FIG. 6.

The container placement control section 131 controls the robot 10 so as to place the container 90 in the field of view of the camera 43. As an example, the container placement control section 131 controls the arm 13B so as to place the container 90 in the container holder 44. The dispenser placement control section 132 controls the arm 13A so as to place the dispenser 30 in a sucking or delivery start position.

The descent control section 133 controls the robot 10 so as to cause the dispenser 30 to descend on the basis of the information on the position of the front end section 30a, the information on the position of the liquid surface SF1, and the information on the position of the boundary BD1 when the liquid C1 is sucked into the dispenser 30.

The descent control section 133 includes a first mode control section 133a, a second mode control section 133b, and a switching section 133c. The first mode control section 133a controls the robot 10 so as to cause the front end section 30a to descend in such a way that the front end section 30a follows the descent of the liquid C1. The second mode control section 133b controls the robot 10 so as to cause the front end section 30a to descend to a final target position. The final target position is set in advance on the basis of the information on the position of the boundary BD1. The switching section 133c switches the control performed by the first mode control section 133a to the control performed by the second mode control section 133b when the front end section 30a approaches the final target position. As an example, the switching section 133c switches the control performed by the first mode control section 133a to the control performed by the second mode control section 133b when the distance from the front end section 30a to the final target position becomes smaller than a reference distance set in advance.

The reference distance setting section 134 sets the reference distance described above. The boundary monitoring section 135 detects a change in the boundary BD1 on the basis of the image captured with the camera 43. The target position setting section 136 sets the final target position on the basis of the information on the position of the boundary BD1.

The tilt detection section 137 detects tilt of the boundary BD1 with respect to the liquid surface SF1 on the basis of the image captured with the camera 43. Tilt of the boundary BD1 with respect to the liquid surface SF1 may occur in a case where the boundary BD1 tilts with respect to the central axis of the container 90 and the container 90 stands upright and the central axis thereof is vertically oriented. The tilt control section 138 controls the robot 10 so as to tilt the container 90 in a direction in which the amount of tilt of the boundary BD1 with respect to the liquid surface SF1 decreases. The tilt control section 138 may instead control the robot 10, when tilt of the boundary BD1 is detected by the tilt detection section 137, so as to tilt the container 90 and the dispenser 30 in such a way that the amount of tilt of the boundary BD1 decreases when the front end section 30a approaches the final target position.

Figure 7:
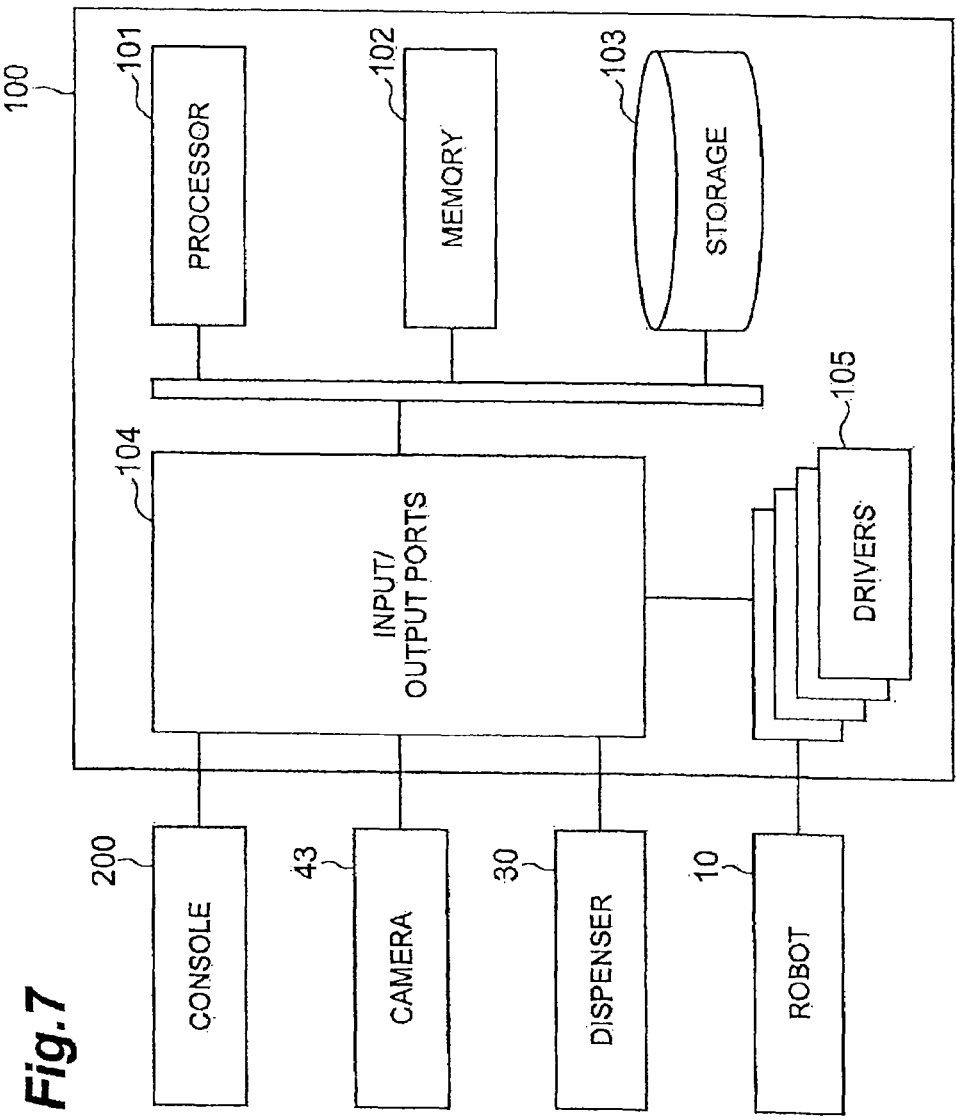
FIG. 7 is a hardware configuration diagram of a controller.

The hardware of the controller 100 is not necessarily divided into the functional blocks described above. Examples of the hardware configuration of the controller 100 include a circuitry including a processor 101, a memory 102, a storage 103, input/output ports 104, and drivers 105, as shown in FIG. 7. Each of the drivers 105 is a circuitry for controlling a corresponding actuator of the robot 10. The input/output ports 104 allow input and output of data from and to the camera 43 and the console 200, output of sucking or delivery on/off instructions to the dispenser 30, and output of instructions to drive the actuators of the robot 10 to the drivers 105. The processor 101 cooperates with at least one of the memory 102 and storage 103 to execute a program in such a way as to provide the above-mentioned functions of the controller 100. The console 200 and the controller 100 may be integrated with or separate from each other from a viewpoint of hardware. The controller 100 may instead be divided into a plurality of hardware sections. The divided hardware sections may be wired to each other, wirelessly connected to each other, or connected to each other in any connection method.

The circuitry of the controller 100 is therefore configured to acquire the information on the position of the liquid surface SF1, the information on the position of the boundary BD1, and the information on the position of the front end section 30a on the basis of the image captured with the camera 43 and control the robot 10 so as to cause the dispenser 30 to descend on the basis of the information on the position of the front end section 30a, the information on the position of the liquid surface SF1, and the information on the position of the boundary BD1 when the liquid C1 is sucked into the dispenser 30.

The hardware configuration of the controller 100 is not necessarily limited to hardware configuration in which the functional modules are provided by execution of a program. For example, the controller 100 may provide the functions by use of dedicated logic circuits or an ASIC (application specific integrated circuit) in which the circuit are integrated with one another.

1.2 Protocol Construction Procedure (1) Overall Configuration

As an example of a protocol construction method, a description will subsequently be made of a procedure in accordance with which the controller 100 performs protocol construction.

Figure 8:
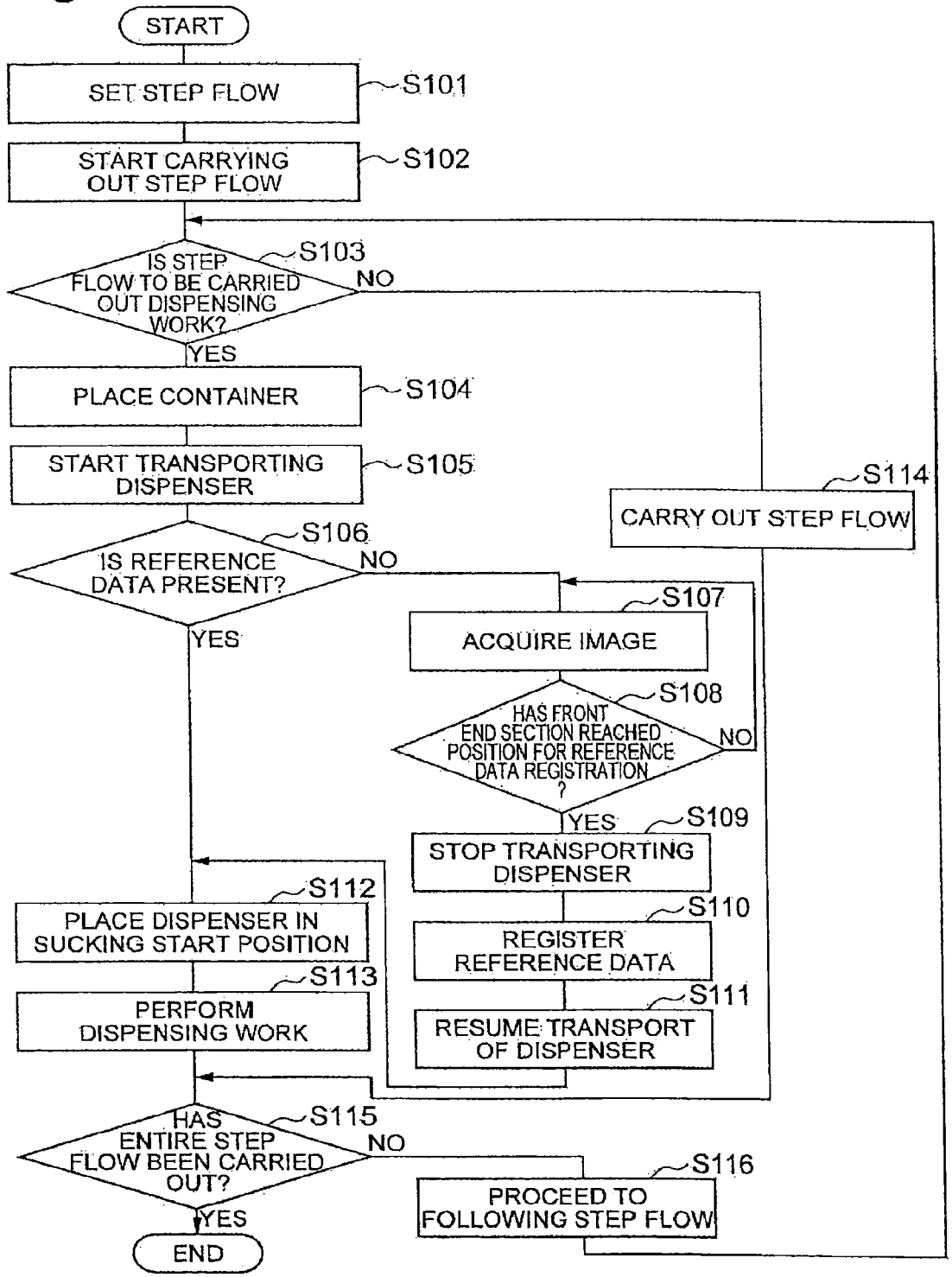
FIG. 8 is a flowchart showing a protocol construction procedure.

The controller 100 first carries out step S101, as shown in FIG. 8. In step S101, the step flow setting section 111 sets step flows of a variety of types of work performed by the robot 10 including a plurality of types of dispensing work.

The step flow setting section 111 acquires step flows of a variety of types of work performed by the robot 10 including a plurality of types of dispensing work through the console 200 and registers the step flows in the step flow storage section 151.

Figure 9:
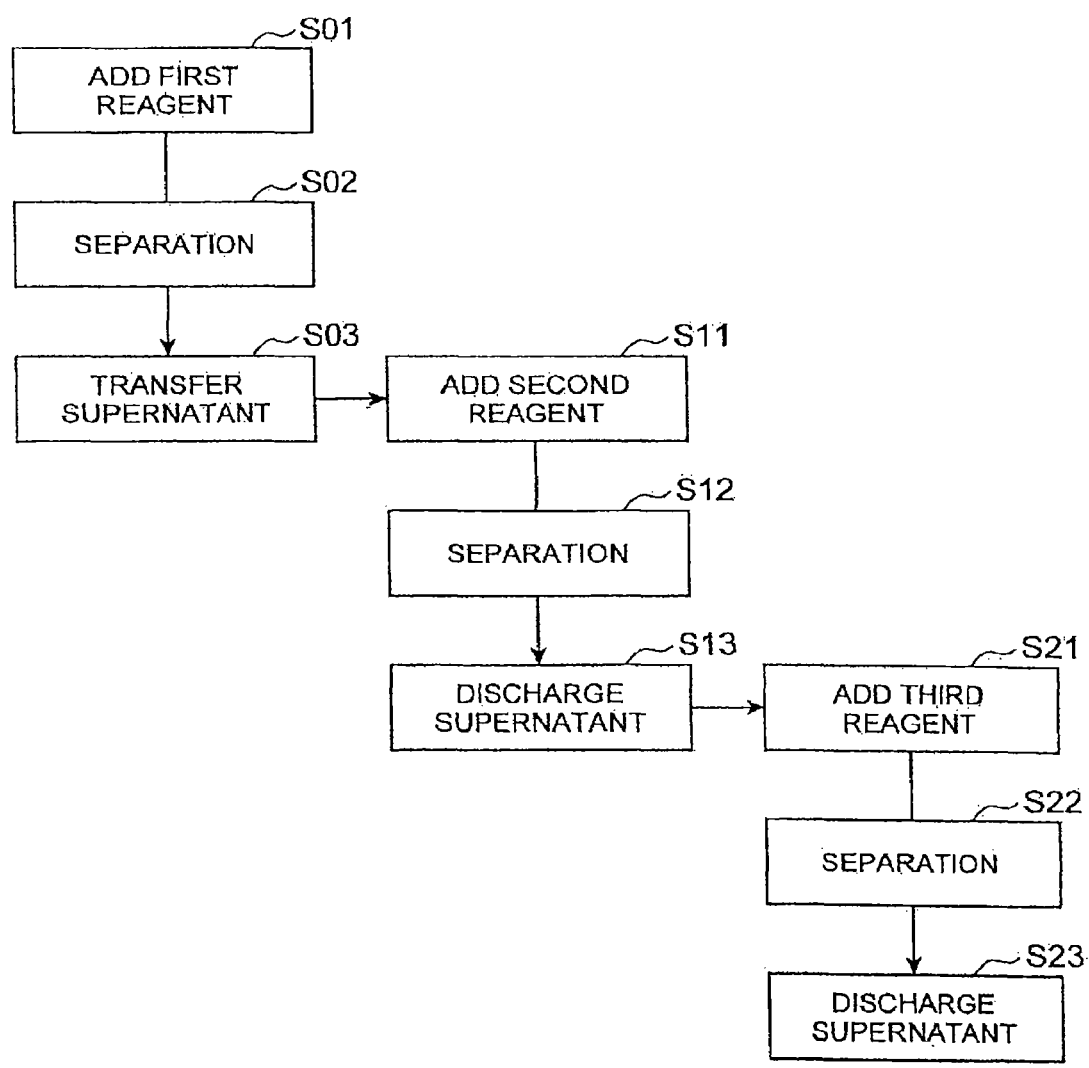
FIG. 9 shows an example of protocol setting.

FIG. 9 illustrates an example of setting a work step flow. The work step flow has steps S01 to S23. Step S01 is the step of injecting a first reagent into a first container 90 containing cells or any other sample and using a vortex mixer or any other tool to agitate the content in the container 90. Step S02 is the step of separating the content in the first container 90 into the liquid C1 to be dispensed and the non-dispensed object C2, for example, in centrifugal separation. Step S03 is the step of taking out the liquid C1 to be dispensed in the first container 90 and transferring the taken-out liquid C1 into a second container 90.

Step S11 is the step of injecting a second reagent into the second container 90 containing the liquid C1 and using a vortex mixer or any other tool to agitate the content in the container 90. Step S12 is the step of separating the content in the second container 90 into the liquid C1 to be dispensed and the non-dispensed object C2, for example, in centrifugal separation. Step S13 is the step of discharging the liquid C1 to be dispensed in the second container 90.

Step S21 is the step of injecting a third reagent into the second container 90 containing the left non-dispensed object C2 and using a vortex mixer or any other tool to agitate the content in the container 90. Step S22 is the step of separating the content in the second container 90 into the liquid C1 to be dispensed and the non-dispensed object C2, for example, in centrifugal separation. Step S23 is the step of discharging the liquid C1 to be dispensed in the second container 90 and recovering the non-dispensed object C2 left in the container 90. In the work step flow in FIG. 9, steps S03, S13, and S23 correspond to dispensing work.

Referring back to FIG. 8, the controller 100 then carries out step S102. In step S102, the robot control section 130 controls the robot 10 so as to start carrying out the step flow set in step S101. The robot control section 130 carries out step S102 in accordance, for example, with a user's instruction input.

The controller then carries out step S103. In step S103, the step flow confirmation section 114 confirms whether or not the step flow to be carried out is dispensing work. When the step flow to be carried out is not dispensing work, the controller 100 carries out step S114. In step S114, the robot control section 130 controls the robot 10 so as to carry out the step flow. The controller 100 then proceeds to the process in step S115, which will be described later.

When the step flow to be carried out is dispensing work, the controller 100 carries out steps S104 and S105. In step S104, the robot control section 130 controls the arm 13B so as to place the container 90 in the container holder 44. When the upper side of the container 90 is closed with a cap, the robot control section 130 further controls the arm 13B so as to remove the cap. In step S105, the robot control section 130 controls the arm 13A so as to start transporting the dispenser 30 toward the container 90.

The controller then carries out step S106. In step S106, the interruption section 112 checks whether or not reference data for dispensing work to be performed has been registered in the reference data storage section 152. When the interruption section 112 determines that the reference data has been registered, the controller 100 proceeds to the process in step S112, which will be described later.

When the interruption section 112 determines that the reference data has not been registered, the controller 100 carries out steps S107 and S108. In step S107, the interruption section 112 acquires an image from the camera 43. In step S108, the interruption section 112 determines whether or not the front end section 30a has reached a position for reference data registration on the basis of the image acquired in step S107. The position for reference data registration means a position that is above the liquid surface SF1 and falls within the field of view of the camera 43. The interruption section 112 repeats steps S107 and S108 until the front end section 30a reaches the position for reference data registration.

When the interruption section 112 determines in step S108 that the font end section 30a has reached the position for reference data registration, the controller 100 carries out step S109. In step S109, the interruption section 112 outputs an instruction to stop transporting the dispenser 30 to the robot control section 130. The robot control section 130 controls the robot 10 so as to stop transporting the dispenser 30 in response to the instruction from the interruption section 112. As described above, when the reference data has not been registered, the interruption section 112 stops the robot 10 after the front end section 30a enters the field of view of the camera 43.

The controller 100 then carries out steps S110 and S111. In step S110, the reference data registration section 113 registers the reference data. In step S111, the interruption section 112 outputs an instruction to resume the transport of the dispenser 30 to the robot control section 130. The robot control section 130 controls the robot 10 so as to resume the transport of the dispenser 30 in response to the instruction from the interruption section 112. As described above, the reference data registration section 113 registers the reference data during the period for which the interruption section 112 keeps the robot 10 stationary, and the interruption section 112 resumes the action of the robot 10 after registration of the reference data.

The controller 100 then carries out steps S112 and S113. In step S112, the robot control section 130 controls the arm 13A so as to place the dispenser 30 in the sucking start position. The sucking start position is set in advance, for example, to be a position at a predetermined depth from the liquid surface SF1. In step S113, the robot control section 130 and the dispenser control section 140 control the robot 10 and the dispenser 30 to perform dispensing work.

The controller 100 then carries out step S115. In step S115, the robot control section 130 evaluates whether or not the entire step flow has been carried out. When the robot control section 130 determines that the entire step flow set has not been carried out, the controller carries out step S116. In step S116, the reference data registration section 113 advances the step being carried out to the following step. The controller 100 then returns to the process in step S103. The interruption section 112 thus stops the robot on a dispensing work basis 10 when no reference data has been unregistered. Further, whenever the interruption section 112 stops the robot 10, the reference data registration section 113 registers reference data corresponding to dispensing work to be subsequently performed.

When the robot control section 130 determines in step S115 that the entire step flow has been carried out, the controller 100 terminates the protocol construction procedure. The protocol construction procedure is thus completed.

(2) Reference Data Registration Procedure

The procedure of the reference data registration in step S110 will be subsequently described in detail.

Figure 10:
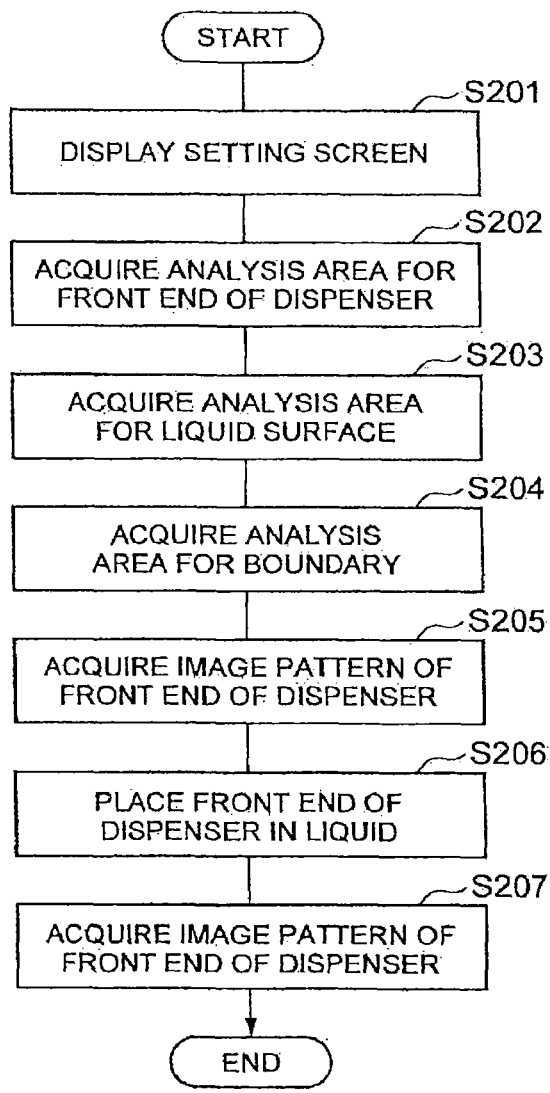
FIG. 10 is a flowchart showing a reference data acquisition procedure.

The controller 100 first carries out step S201, as shown in FIG. 10. In step S201, the backlight control section 160 turns on the light 45, and the reference data registration section 113 displays a screen for setting reference data on the monitor 201 of the console 200.

The controller 100 then carries out steps S202 to S204. In step S202, the reference data registration section 113 acquires, via the console 200, an analysis area (referred to as "first analysis area" in the present embodiment) for searching for the front end section 30a outside the liquid C1 in the image and registers the acquired analysis area as reference data in the reference data storage section 152. In step S203, the reference data registration section 113 acquires, via the console 200, an analysis area (referred to as "second analysis area" in the present embodiment) for searching for the liquid surface SF1 in the image and registers the acquired analysis area as the reference data in the reference data storage section 152. In step S204, the reference data registration section 113 acquires, via the console 200, an analysis area (referred to as "third analysis area" in the present embodiment) for searching for the boundary BD1 in the image and registers the acquired analysis area as the reference data in the reference data storage section 152. The order in which steps S202 to S204 are carried out can be changed as appropriate. For example, the reference data registration section 113 may sequentially perform the acquisition of the second analysis area, the acquisition of the third analysis area, and the acquisition of the first analysis area.

Figure 11:
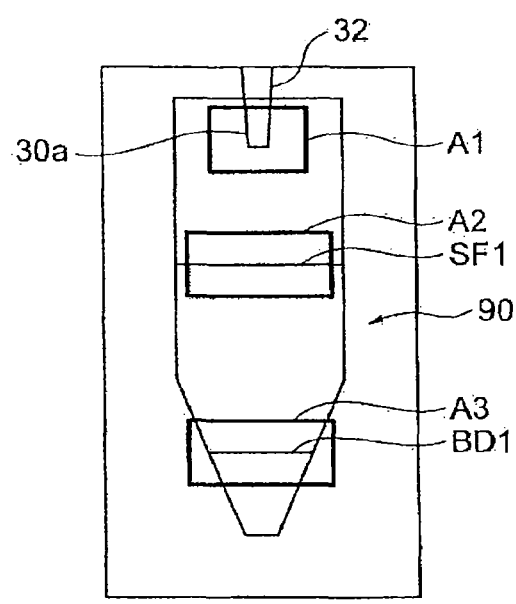
FIG. 11 illustrates an analysis area setting screen.

FIG. 11 illustrates an analysis area setting screen. The screen is displayed in such a way that an image captured with the camera 43 and an analysis area inputted by the user to the input device 202 are layered on each other. An analysis area A1 in FIG. 11 represents an area inputted for setting the first analysis area. The analysis area A1 is set in such a way as to contain the front end section 30a outside the liquid C1. An analysis area A2 represents an area inputted for setting the second analysis area. The analysis area A2 is set in such a way as to contain the liquid surface SF1. An analysis area A3 represents an area inputted for setting the third analysis area. The analysis area A3 is set in such a way as to contain the boundary BD1. The reference data registration section 113 registers the analysis area A1 as the first analysis area in the reference data storage section 152, registers the analysis area A2 as the second analysis area in the reference data storage section 152, and registers the analysis area A3 as the third analysis area in the reference data storage section 152.

Referring back to FIG. 10, the controller 100 then carries out step S205. In step S205, the reference data registration section 113 acquires an image pattern of the front end section 30a and registers the image pattern as the reference data in the reference data storage section 152.

Figure 12:
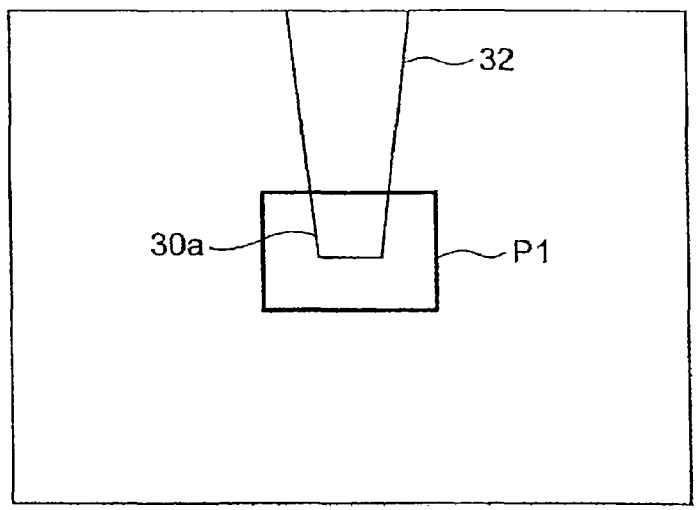
FIG. 12 illustrates an image pattern registration screen.

FIG. 12 illustrates an image pattern registration screen. The screen is displayed in such a way that an image of the front end section 30a and a portion therearound and a frame line P1 inputted by the user to the input device 202 are layered on each other. The screen may display an enlarged image of the analysis area A1 in FIG. 11. The frame line P1 specifies an area used as the image pattern. The reference data registration section 113 registers the image in the area enclosed by the frame line P1 as the image pattern of the front end section 30a in the reference data storage section 152.

Referring back to FIG. 10, the controller 100 then carries out step S206. In step S206, the reference data registration section 113 outputs an instruction to insert the front end section 30a into the liquid C1 to the robot control section 130. The robot control section 130 controls the robot 10 in response to the instruction from the reference data registration section 113 so as to cause the dispenser 30 to descend in such a way as to insert the front end section 30a into the liquid C1.

The controller 100 then carries out step S207. In step S207, the reference data registration section 113 acquires an image pattern of the front end section 30a and registers the image pattern as the reference data in the reference data storage section 152, as in step S205. As described above, the reference data registration section 113 registers the image pattern of the front end section 30a outside the liquid C1 and the image pattern of the front end section 30a in the liquid C1 as the reference data. The backlight control section 160 then turns off the light 45.

The reference data registration procedure is thus completed. The above description has been made with reference to the case where the reference data registration section 113 registers the first analysis area, the second analysis area, the third analysis area, and the image patterns of the front end section 30a inside and outside and the liquid C1, but the reference data registration section 113 does not necessarily perform the registration as described above. The reference data registration section 113 may register only part of the reference data described above. Further, since the reference data may be any data required to control the robot 10, the reference data registration section 113 may register reference data different from the reference data described above.

1.3 Dispensing Control Procedure (1) Overall Configuration

The procedure of dispensing control performed by the controller 100 will subsequently be described as an example of a control method.

Figure 13:
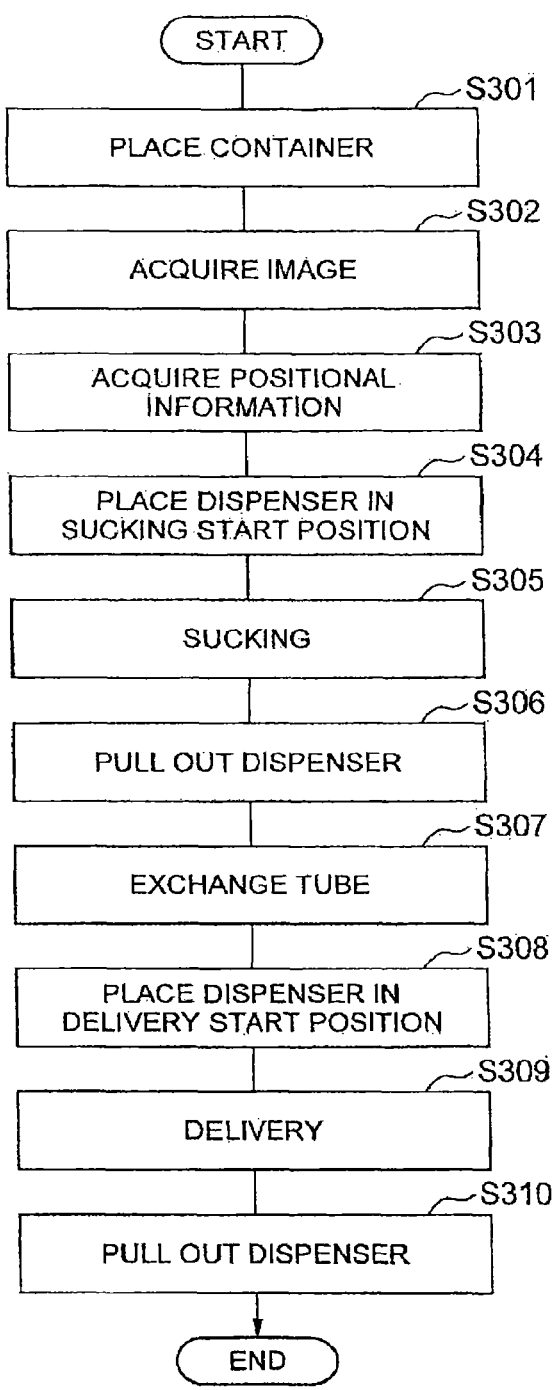
FIG. 13 is a flowchart showing an overview of a dispensing control procedure.

FIG. 13 shows a control procedure in accordance with which the liquid C1 in the container 90 is transferred into another container 90 as an example of the dispensing work. The controller 100 first carried out step S301, as shown in FIG. 13. In step S301, the container placement control section 131 controls the arm 13B so as to place the container 90 in the container holder 44. When the upper side of the container 90 is closed with a cap, the container placement control section 131 further controls the arm 13B so as to remove the cap.

The controller 100 then carries out steps S302 to S304. In step S302, the robot control section 130 controls the arm 13A so as to place the front end section 30a of the dispenser 30 in an image acquisition position. The image acquisition position means a position that is above the liquid surface SF1 and falls within the field of view of the camera 43. Thereafter, the backlight control section 160 turns on the light 45, and the image processing section 120 acquires an image from the camera 43. The image contains at least the front end section 30a, part of the liquid surface SF1, and part of the non-dispensed object C2.

In step S303, the image processing section 120 acquires the information on the position of the liquid surface SF1 and the information on the position of the front end section 30a on the basis of the image acquired in step S302. The image processing section 120 acquires the information on the second analysis area from the reference data storage section 152 and acquires the information on the position of the liquid surface SF1 from the contents in the second analysis area. As an example, the image processing section 120 detects a linear portion traversing the second analysis area and acquires the position of the linear portion as the information on the liquid surface SF1. The image processing section 120 acquires the information on the first analysis area and the image pattern of the front end section 30a outside the liquid C1 from the reference data storage section 152 and acquires the information on the position of the front end section 30a from the contents in the first analysis area on the basis of the image pattern. As an example, the image processing section 120 acquires the position of a portion that coincides with the image pattern of the front end section 30a in the first analysis area as the information on the position of the front end section 30a. The image processing section 120 may further acquire the information on the position of the boundary BD1. In this case, the image processing section 120 acquires the information on the third analysis area from the reference data storage section 152 and acquires the information on the position of the boundary BD1 from the contents in the third analysis area. As an example, the image processing section 120 detects a linear portion traversing the third analysis area and acquires the position of the linear portion as the information on the boundary BD1.

In step S304, the dispenser placement control section 132 controls the arm 13A so as to place the front end section 30a in a sucking start position OP1 (see FIG. 16A). Specifically, the dispenser placement control section 132 calculates the amount of movement required to place the front end section 30a in the start position OP1 on the basis of the information on the position of the front end section 30a and the information on the position of the liquid surface SF1 acquired in step S303 and controls the arm 13A so as to move the front end section 30a by the calculated amount of movement. The start position OP1 is set in advance, for example, to be a position at a predetermined depth (hereinafter referred to as "reference depth") DP1 from the liquid surface SF1. The reference depth DP1 is set in advance in such a way as to satisfy, for example, the following conditions:

Condition 1-1) The reference depth DP1 is much smaller than the depth from the liquid surface SF1 to the boundary BD1; and Condition 1-2) Even when an error in position control occurs, the front end section 30a can be retained in the liquid C1.

The controller 100 then carries out step S305. In Step S305, the dispenser control section 140 and the descent control section 133 control the dispenser 30 and the robot 10, respectively, in such a way that the liquid C1 is sucked. The dispenser control section 140 controls the dispenser 30 so as to suck the liquid C1 from the interior of the container 90. To suck the liquid into the dispenser 30, the descent control section 133 controls the robot 10 in such a way the robot 10 cause the dispenser 30 to descend on the basis of the information on the position of the front end section 30a, the information on the position of the liquid surface SF1, and the information on the position of the boundary BD1. When the descent of the dispenser 30 is completed, the backlight control section 160 turns off the light 45.

The controller 100 then carries out step S306. In step S306, the dispenser placement control section 132 controls the arm 13A so as to pull the front end section 30a out of the container 90.

The controller 100 then carries out step S307. In step S307, the container placement control section 131 controls the arm 13B so as to exchange the container 90 in the container holder 44 for another container 90.

The controller 100 then carries out step S308. In step S308, the dispenser placement control section 132 controls the arm 13A so as to place the front end section 30a in the delivery start position. The delivery start position is set in advance, for example, to be a position in the container 90.

The controller 100 then carries out step S309. In step S309, the dispenser control section 140 controls the dispenser 30 so as to deliver the liquid C1 into the container 90.

The controller 100 then carries out step S310. In step S310, the dispenser placement control section 132 controls the arm 13A so as to pull the front end section 30a out of the container 90. The dispensing work is thus completed.

(2) Sucking Control Procedure

The procedure of the sucking in step S305 will subsequently be described in detail.

Figure 14:
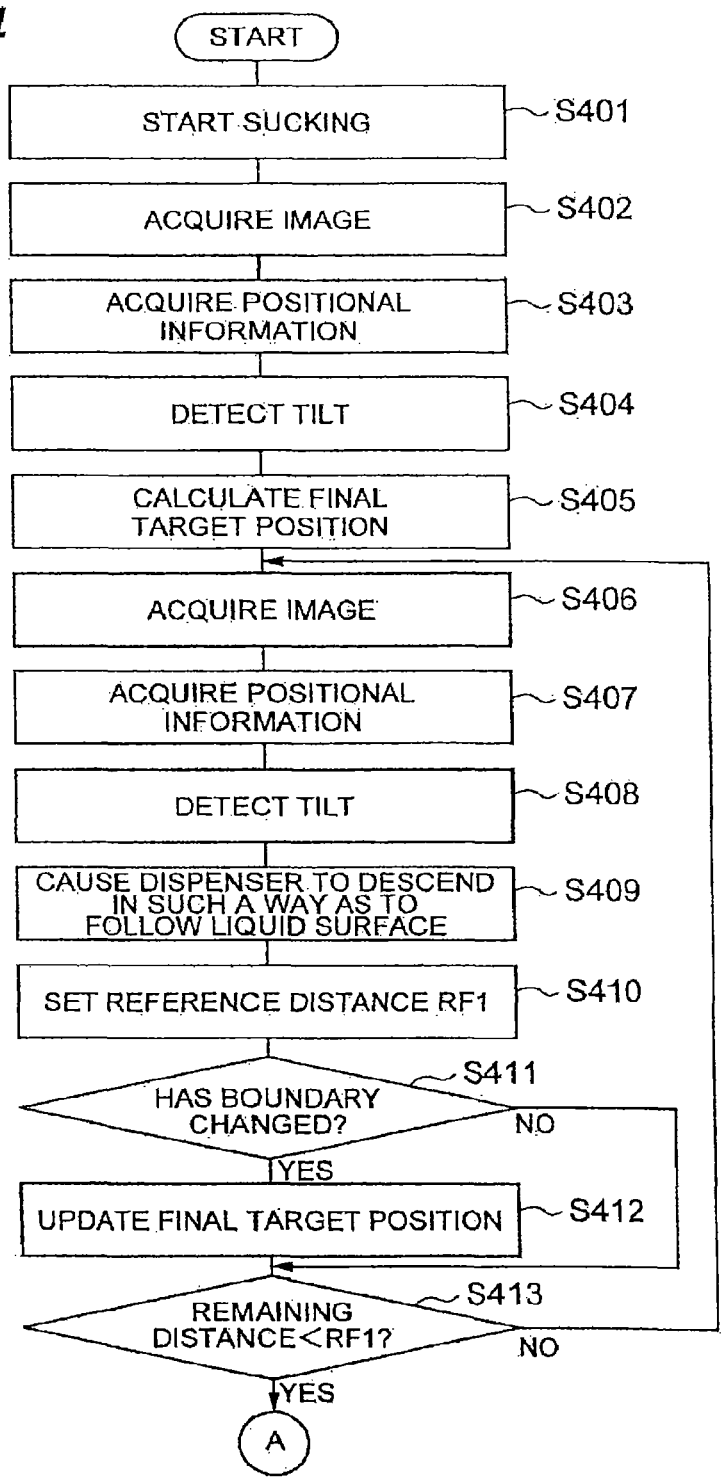
FIG. 14 is a flowchart showing a control procedure at the time of sucking.

The controller 100 first carries out step S401, as shown in FIG. 14. In step S401, the dispenser control section 140 controls the dispenser 30 so as to start sucking the liquid C1 in the container 90.

The controller 100 then carries out step S402. In step S402, the image processing section 120 acquires an image from the camera 43. The image contains at least the front end section 30a, part of the liquid surface SF1, and part of the non-dispensed object C2.

The controller 100 then carries out steps S403 and S404. In step S403, the image processing section 120 acquires the information on the position of the liquid surface SF1, the information on the position of the boundary BD1, and the information on the position of the front end section 30a on the basis of the image acquired in step S402. The image processing section 120 acquires the information on the second analysis area from the reference data storage section 152 and acquires the information on the position of the liquid surface SF1 from the contents in the second analysis area. As an example, the image processing section 120 detects a linear portion traversing the second analysis area and acquires the position of the linear portion as the information on the liquid surface SF1. The image processing section 120 acquires the information on the third analysis area from the reference data storage section 152 and acquires the information on the position of the boundary BD1 from the contents in the third analysis area. As an example, the image processing section 120 detects a linear portion traversing the third analysis area and acquires the position of the linear portion as the information on the boundary BD1. The image processing section 120 acquires the image pattern of the front end section 30a in the liquid C1 from the reference data storage section 152 and acquires the information on the position of the front end section 30a from the contents in the second analysis area on the basis of the image pattern of the front end section 30a. As an example, the image processing section 120 acquires the position of a portion that coincides with the image pattern of the front end section 30a in the second analysis area as the information on the position of the front end section 30a.

In step S404, the tilt detection section 137 detects tilt of the boundary BD1 on the basis of the image acquired in step S402. The tilt detection section 137 may instead detect tilt of the boundary BD1 on the basis of the information on the position of the boundary BD1 acquired by the image processing section 120.

The controller 100 then carries out step S405. In step S405, the target position setting section 136 sets a final target position GL1 (see FIG. 16B) on the basis of the information on the position of the boundary BD1 acquired in step S403. As an example, the target position setting section 136 sets the final target position GL1 to be a position above the position of the boundary BD1. The target position setting section 136 further sets the final target position GL1 in such a way that the vertical distance between the final target position GL1 and the boundary BD1 is equal to a predetermined vertical offset value VO1. The vertical offset value VO1 is set in advance, for example, in such a way as to satisfy the following conditions:

Condition 2-1) The vertical offset value VO1 is much smaller than the depth from the liquid surface SF1 to the boundary BD1; and Condition 2-2) Even when an error in position control occurs, the front end section 30a will not reach the boundary BD1.

When tilt of the boundary BD1 is detected by the tilt detection section 137 in step S404, the target position setting section 136 sets the final target position GL1 to be a position shifted downward along the tilt of the boundary BD1 with respect to the position of the center of the container 90 (for example, central axis CL1 of sidewall 91) (see FIG. 17B). As an example, the target position setting section 136 sets the final target position GL1 in such a way that the horizontal distance between the final target position GL1 and the central axis CL1 of the container 90 is equal to a predetermined horizontal offset value 1101. The horizontal offset value 1101 is set in advance, for example, in such a way as to satisfy the following conditions:

Condition 3-1) The dispenser 30 does not interfere with the sidewall 91 of the container 90. In this case, the target position setting section 136 sets the final target position GL1 in such a way that the vertical distance between the final target position GL1 and the boundary BD1 is equal to a predetermined vertical offset value VO2, as in the case described above. The vertical offset value VO2 is also set in advance in such a way as to satisfy the same conditions as those for the vertical offset value VO1.

The controller 100 then carries out steps S406 to S411. In step S406, the image processing section 120 acquires an image from the camera 43, as in step S402. In step S407, the image processing section 120 acquires the information on the position of the liquid surface SF1, the information on the position of the boundary BD1, and the information on the position of the front end section 30a, as in step S403. In step S408, the tilt detection section 137 detects tilt of the boundary BD1, as in step S404.

In step S409, the first mode control section 133a controls the robot 10 in such a way that the arm 13A causes the dispenser 30 to descend so that the front end section 30a descends in such a way that the front end section 30a follows the descent of the liquid surface SF1 (The control is hereinafter referred to as "first mode descent control"). The first mode control section 133a performs the first mode descent control on the basis of the information on the position of the liquid surface SF1 and the information on the position of the front end section 30a. Specifically, the first mode control section 133a performs the first mode descent control in such a way that the depth from the liquid surface SF1 to the front end section 30a is kept close to the reference depth DP1 (see FIG. 16B).

In step S410, the reference distance setting section 134 sets a reference distance RF1 (see FIG. 16B). The reference distance setting section 134 may be configured to increase the reference distance RF1 in accordance with an increase in the movement speed of the front end section 30a. As an example, the reference distance setting section 134 may be configured to set the reference distance RF1 to be a value proportional to the descent speed of the front end section 30a. The descent speed of the front end section 30a can be calculated, for example, on the basis of the difference between the currently acquired information on the position of the front end section 30a and the previously acquired information on the position of the front end section 30a. The descent speed can instead be calculated on the basis of the average of the differences described above calculated multiple times.

In step S411, the boundary monitoring section 135 evaluates whether or not the boundary BD1 has changed on the basis of the information on the position of the boundary BD1 acquired in step S407. When no change in the boundary has been detected in step S411, the controller 100 proceeds to the process in step S413.

When a change in the boundary BD1 has been detected in step S411, the controller 100 carries out step S412. In step S412, the target position setting section 136 sets the final target position GL1 on the basis of the position of the boundary BD1 acquired in step S407, as in step S405. That is, during the period for which the robot 10 causes the dispenser 30 to descend, the target position setting section 136 updates the final target position GL1 on the basis of the information on the position of the boundary BD1. Further, the target position setting section 136 updates the final target position GL1 when the boundary monitoring section 135 detects that the boundary BD1 has changed.

The controller 100 then carries out step S413. In step S413, the switching section 133c determines whether or not a distance LD1 from the front end section 30a to the final target position GL1 (hereinafter referred to as "first remaining distance") is smaller than the reference distance RF1 set in advance in step S410. When the switching section 133c determines that the first remaining distance LD1 is greater than or equal to the reference distance RF1 (see FIG. 16B), the controller 100 returns to the process in step S406. As a result, the control performed by the first mode control section 133a continues.

Figure 15:
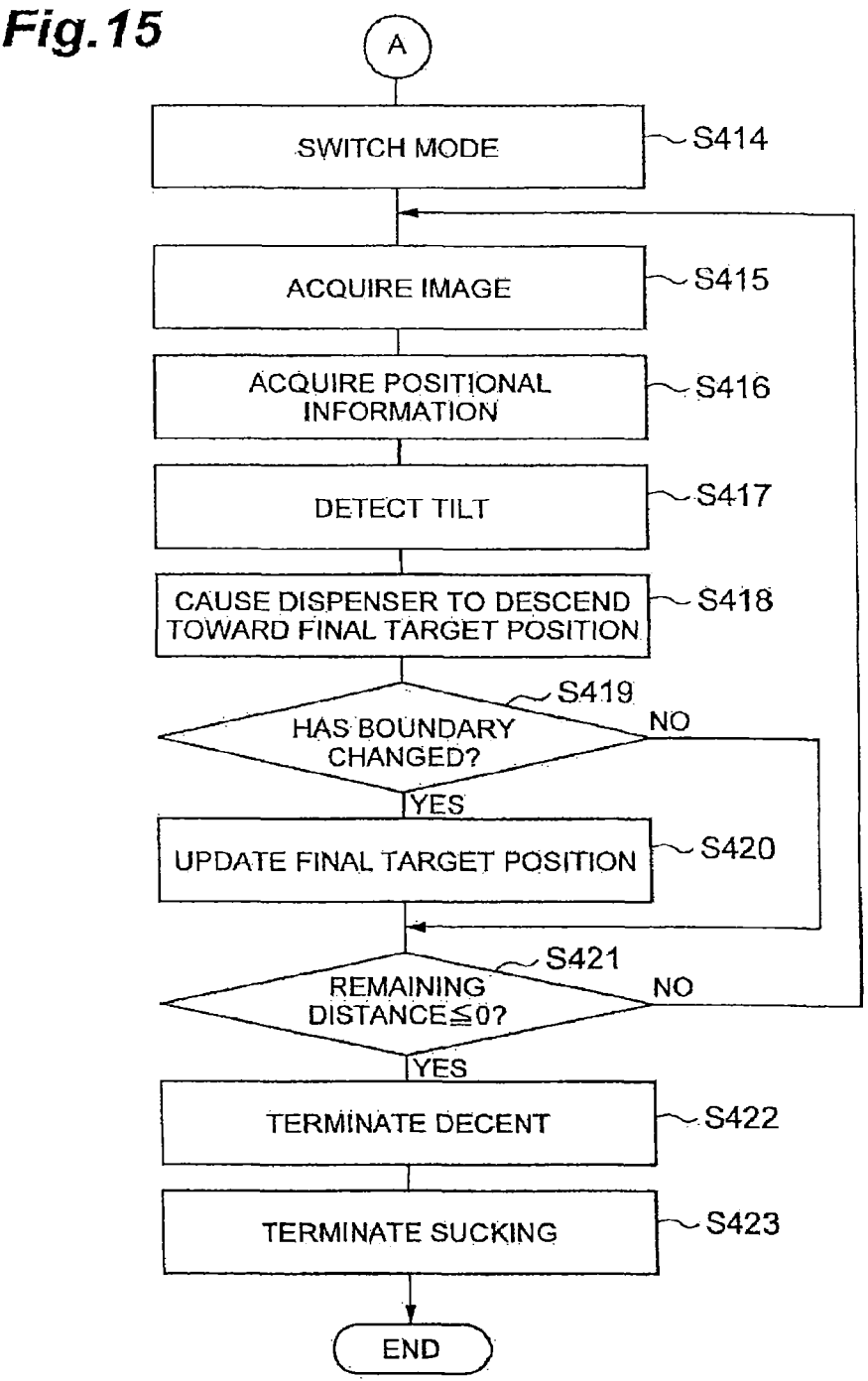
FIG. 15 is another flowchart showing the control procedure at the time of sucking.

When the switching section 133c determines that the first remaining distance LD1 is smaller than the reference distance RF1 (see FIG. 16C), the controller 100 proceeds to the process in step S414. In step S414, the switching section 133c switches the control performed by the first mode control section 133a to the control performed by the second mode control section 133b, as shown in FIG. 15. As illustrated in steps S413 and S414, the switching section 133c switches the control performed by the first mode control section 133a to the control performed by the second mode control section 133b when the front end section 30a approaches the final target position GL1.

The controller 100 then carries out steps S415 to S418. In step S415, the image processing section 120 acquires an image from the camera 43, as in step S402. In step S416, the image processing section 120 acquires the information on the position of the liquid surface SF1, the information on the position of the boundary BD1, and the information on the position of the front end section 30a, as in step S403. In step S417, the tilt detection section 137 detects tilt of the boundary BD1, as in step S404.

In step S418, the second mode control section 133b controls the robot 10 so as to cause the front end section 30a to approach the final target position GL1 by using the arm 13A to cause the dispenser 30 to descend (The control is hereinafter referred to as "second mode descent control").

It is noted that the second mode control section 133b may perform the control in such a way that the amount of overshoot is suppressed as compared with the control performed by the first mode control section 133a. On the other hand, the first mode control section 133a may perform the control in such a way that responsiveness is increased as compared with the control performed by the second mode control section 133b. Examples of the configuration described above include a configuration in which feedforward control in which delay due to image processing is compensated is performed in the control performed by the first mode control section 133a, whereas no feedforward control is performed in the control performed by the second mode control section 133b. Another example of the configuration described above may be a configuration in which gain for the deviation from the final target position is set at a higher value in the control performed by the first mode control section 133a than in the control performed by the second mode control section 133b.

The controller 100 then carries out step S419, which is the same as step S411. In step S419, the boundary monitoring section 135 evaluates whether or not the boundary BD1 has changed on the basis of the information on the position of the boundary BD1 acquired in step S416. When no change in the boundary BD1 has been detected in step S419, the controller 100 proceeds to the process in step S421.

When a change in the boundary BD1 has been detected in step S419, the controller 100 carries out step S420, which is the same as step S412. In step S420, the target position setting section 136 updates the final target position GL1 on the basis of the information on the position of the boundary BD1 acquired in step S416.

The controller 100 then carries out step S421. In step S421, the second mode control section 133b detects whether or not the first remaining distance LD1 is zero or smaller. When the second mode control section 133b determines that the first remaining distance LD1 is greater than zero (see FIG. 16C), the controller 100 returns to the process in step S415. As a result, the control performed by the second mode control section 133b continues.

When the second mode control section 133b determines that the first remaining distance LD1 is smaller than or equal to zero (see FIG. 16D), the controller 100 carries out step S422. In step S422, the second mode control section 133b controls the robot 10 so as to stop the dispenser 30 descending. The descent control performed by the descent control section 133 in which the dispenser 30 is caused to descend is thus completed. As illustrated in steps S406 to S422, the descent control section 133 controls the robot 10 so as to cause the front end section 30a to descend in such a way that the front end section 30a follows the descent of the liquid surface SF1 and further causes the front end section 30a to descend to the final target position GL1.

The controller 100 then carries out step S423. In step S423, the dispenser control section 140 controls the dispenser 30 so as to stop sucking the liquid C1 (see FIG. 16E). The backlight control section 160 then turns off the light 45. The sucking procedure is thus completed.

(3) Variation of Sucking Control Procedure

When the boundary BD1 may tilt with respect to the liquid surface SF1 (for example, when the boundary BD1 tilts with respect to the central axis CIA of the container 90), the controller 100 may perform the sucking procedure in step S305 with the container 90 tilted in the direction in which the tilt of the boundary BD1 with respect to the liquid surface SF1 decreases. In this case, in step S305, the descent control section 133 controls the robot 10 so as to cause the front end section 30a of the dispenser 30 to descend in the oblique direction in correspondence with the tilt of the container 90 (see FIGS. 19A to 19D). Causing the front end section 30a to descend in the oblique direction in correspondence with the tilt of the container 90 means causing the front end section 30a to descend in such a way as not to come into contact with the sidewall 91 of the container 90. For example, the descent control section 133 may control the robot 10 so as to cause the front end section 30a to descend along the tilting central axis CL1 of the container 90.

The controller 100 may be configured to perform only one of setting the final target position GL1 to be a position shifted to the direction downward along the tilt of the boundary BD1 with respect to the central axis CL1 of the container 90 and tilting the container 90 with respect to the direction in which the tilt of the boundary BD1 with respect to the liquid surface SF1 decreases or may be configured to perform the combination of the two operations.

The timing at which the container 90 is tilted with respect to the direction in which the tilt of the boundary BD1 with respect to the liquid surface SF1 decreases and a method for tilting the container 90 are not particularly limited to specific timing or a specific method. For example, the container placement control section 131 may control the robot 10 so as to place the container 90 in the container holder 44, and then the tilt control section 138 may control the robot 10 so as to tilt the rack 40 so that the container 90 is tilted.

Instead, the tilt control section 138 may control the robot 10 so as to tilt the rack 40, and then the container placement control section 131 may control the robot 10 so as to place the container 90 in the container holder 44.

Before transported from a position outside the field of view of the camera 43 into the field of view, the container 90 have been placed in some cases in such a way as to tilt with respect to the direction in which the tilt of the boundary BD1 with respect to the liquid surface SF1 decreases. For example, in a case where a tilted container 90 is placed in a centrifugal separator, the tilt of the boundary BD1 with respect to the liquid surface SF1 decreases in the container 90 having undergone centrifugal separation, as compared with a case where the container 90 is placed in the centrifugal separator with the container 90 is in the upright position. In this case, the container placement control section 131 may control the robot 10 so as to transport the container 90 from a position outside the field of view of the camera 43 and place the container 90 in the container holder 44 with the tilt of the container 90 maintained.

Figure 20:
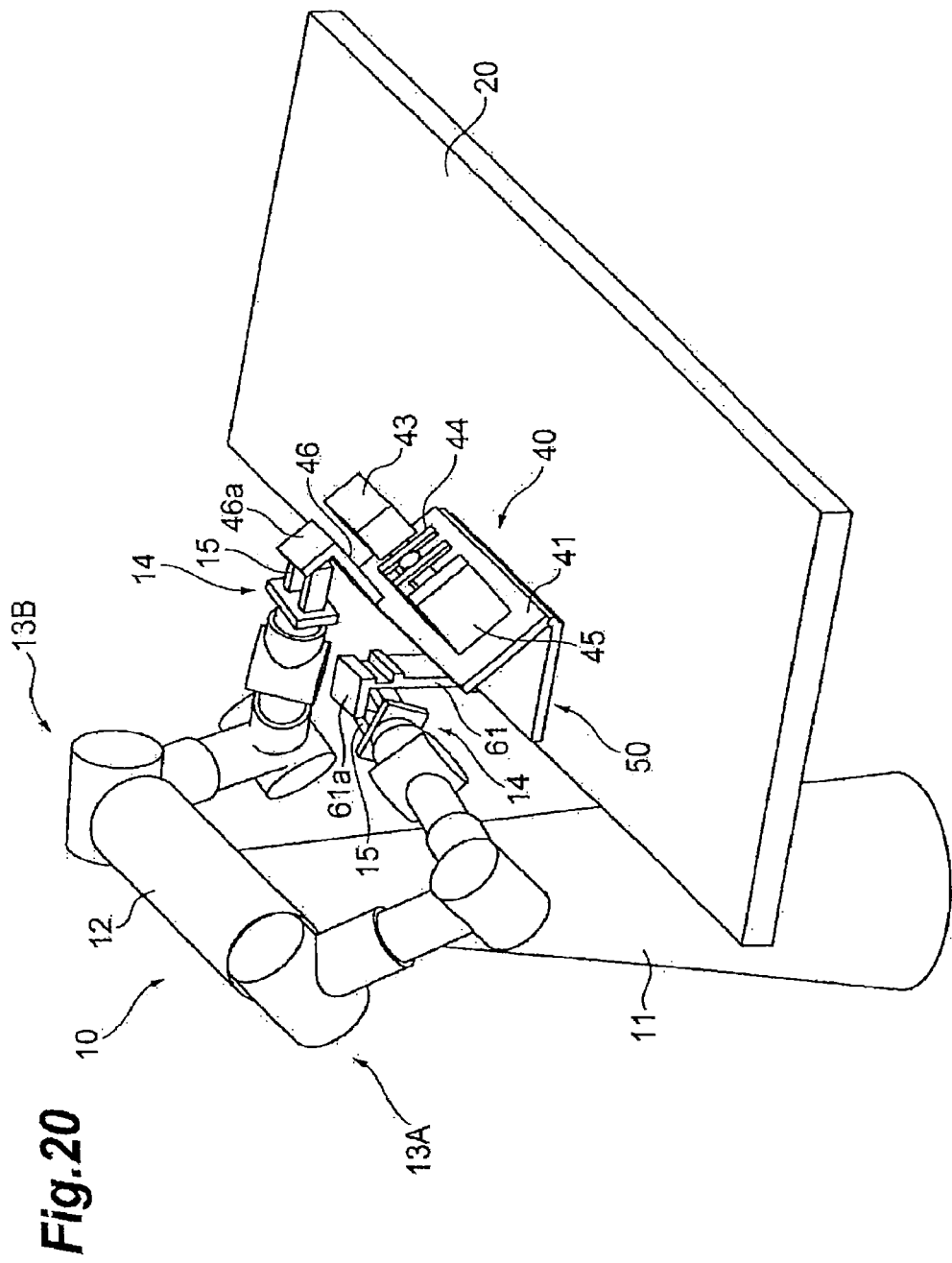
FIG. 20 is a perspective view showing a robot tilting a tube rack.

To tilt the container 90 in the direction in which the tilt of the boundary BD1 with respect to the liquid surface SF1 decreases before step S305, the controller 100 may control the robot 10 so as to use the stopper 61 to keep the tilt of the rack 40 fixed. For example, the controller 100 may control the robot 10 in such a way that the arm 13A inclines the stopper 61 toward the hinge 52 while the arm 13B lifts the upper portion 46a of the grip 46 to tilt the stage 41 so that the edge portion of the stage 41 is fit into the groove 61b (see FIG. 20).

When the edge portion of the stage 41 is fit into the groove 61b, the tilt of the rack 40 is kept by the stopper 61, and the arms 13A and 13B are therefore allowed to release the grip 46 and the stopper 61. The arm 13A can therefore place the dispenser 30 in the image acquisition position. Further, when the upper side of the container 90 is closed with a cap, the arm 13B can further remove the cap. Moreover, when the dispenser 30 is a manual dispenser, the arms 13A and 13B can cooperate with each other to manipulate the dispenser 30. Using the stopper 61 as described above allows the arms 13A and 13B to be used in a variety of types of work.

The controller 100 may achieve the state in which the container 90 tilts in the direction in which the tilt of the boundary BD1 with respect to the liquid surface SF1 decreases in the course of step S305. For example, the tilt action control section 138 may control the robot 10 so as to tilt the rack 40 to tile the container 90 in the course of the descent of the front end section 30a performed by the robot 10 (hereinafter referred to as "tilt action control"). As an example, the tilt action control section 138 may control the robot 10 so as to tilt the container 90 when the front end section 30a approaches the final target position GL1.

Figure 18:
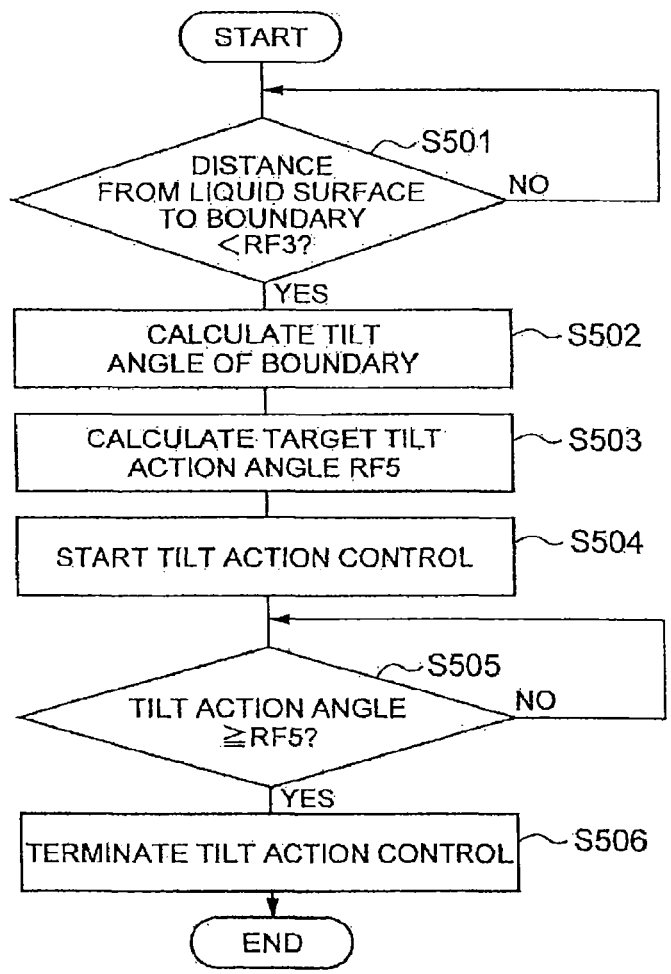
FIG. 18 is a flowchart showing a tilt action control procedure.
Figure 19:
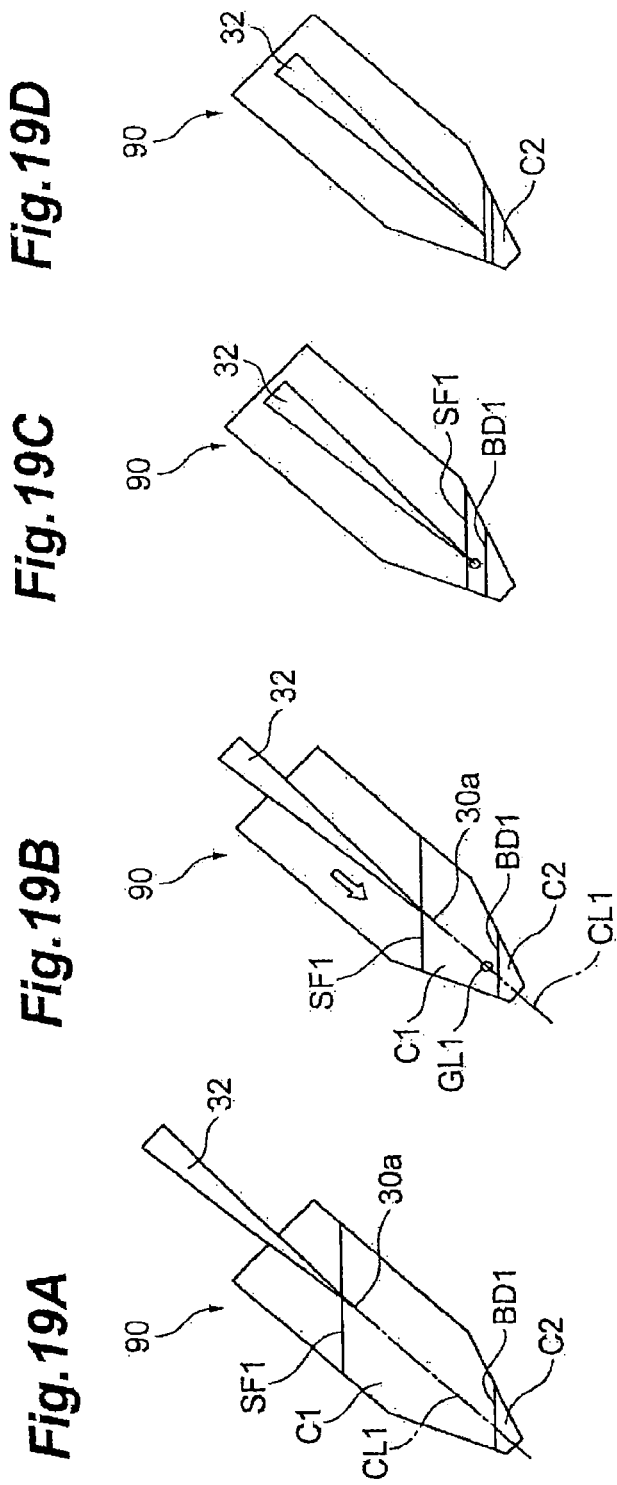
FIGS. 19A to 19D are side views diagrammatically showing the microtube at the time of sucking.

FIG. 18 is a flowchart illustrating the procedure of the tilt action control. The controller 100 first carries out step S501, as shown in FIG. 18. In step S501, the tilt action control section 138 waits until a distance LD2 from the liquid surface SF1 to the boundary BD1 (hereinafter referred to as "second remaining distance") becomes smaller than a reference distance RF3 on the basis of the positional information acquired in any of steps S403, S407, and S416 (see FIGS. 21A and 21B). The reference distance RF3 is set in advance in such a way that the robot 10 starts tilting the container 90 and the dispenser 30 before the liquid surface SF1 reaches the boundary BD1.

When the second remaining distance LD2 becomes smaller than the reference distance RF3 (see FIG. 21C), the controller 100 carries out steps S502 to S506. In step S502, the tilt detection section 137 detects a tilt angle θ of the boundary BD1 with respect to the liquid surface SF1 on the basis of the image acquired in any of steps S402, S406, and S415 (see FIG. 21C). The tilt angle θ can be calculated, for example, by linear interpolation of the shape of the boundary BD1.

In step S503, the tilt action control section 138 sets a target tilt action angle RF5 corresponding to the tilt angle θ. As an example, the tilt action control section 138 sets the target tilt action angle RF5 at a value equal to the tilt angle θ.

Figure 22:
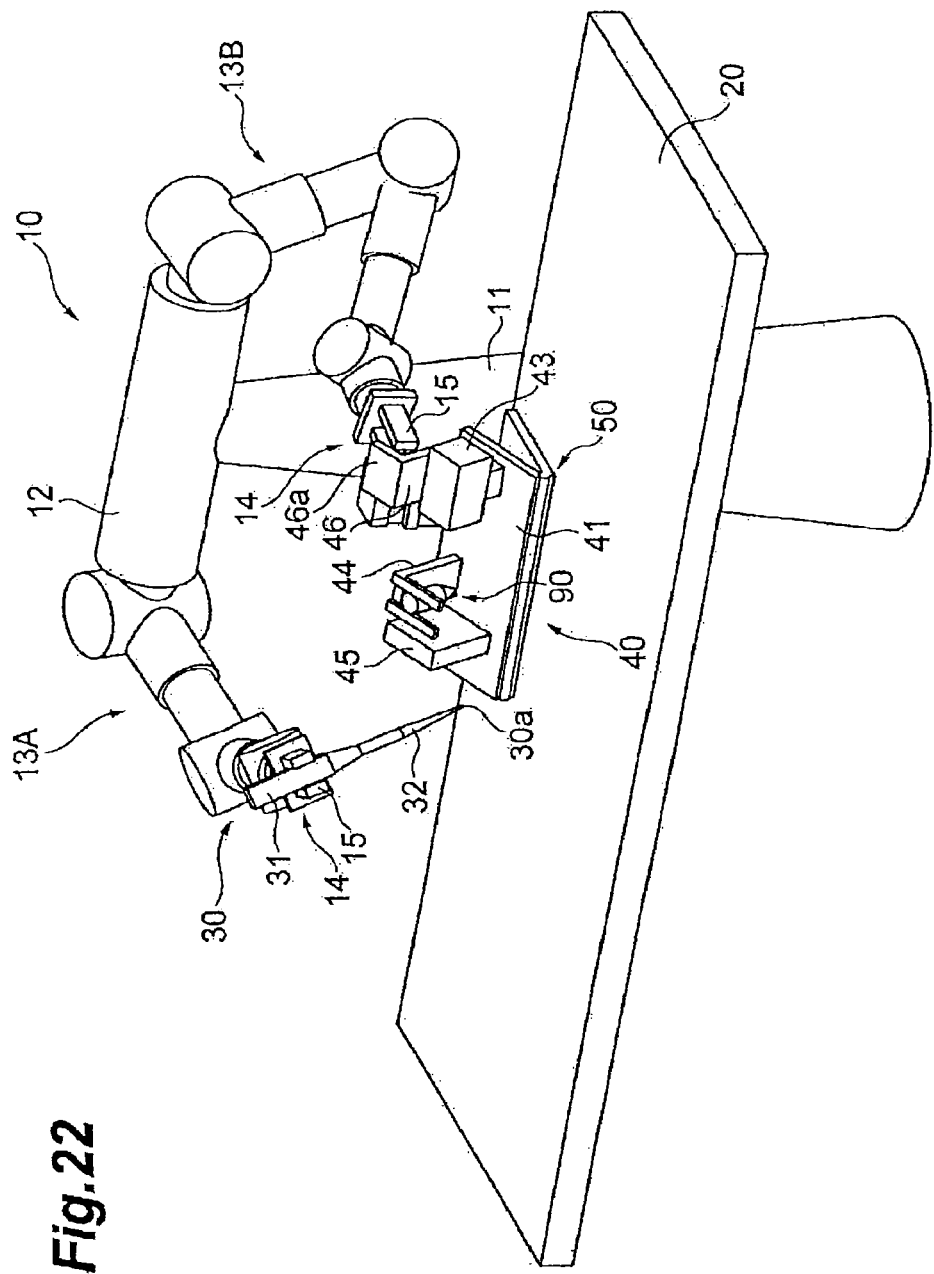
FIG. 22 is a perspective view showing the robot tilting the tube rack.

In step S504, the tilt action control section 138 controls the robot 10 so as to start tilting the container 90 and the dispenser 30 (see FIGS. 21D and 21E). As an example, the tilt action control section 138 controls the robot 10 in such a way that the arm 13B lifts the upper portion 46a of the grip 46 to tilt the rack 40 so that the container 90 is tilted (see FIG. 22). As a result, the rack 40 is tilted around the axis along the direction in which the camera 43, the container 90, and the light 45 are aligned with one another. Further, the tilt action control section 138 controls the robot 10 in such a way that the arm 13A tilts the dispenser 30 in accordance with the tilted container 90.

In step S505, the tilt action control section 138 waits until the tilt action angle by which the container 90 and the dispenser 30 are tilted becomes greater than or equal to the target tilt action angle RF5. In step S506, the tilt action control section 138 controls the robot 10 so as to stop tilting the container 90 and the dispenser 30.

The tilt action control procedure is thus completed. It is noted that the tilt angle θ is determined as a roughly fixed value in accordance with the characteristics of the centrifugal separator and other factors and can therefore be handled as a constant in some cases. In such cases, step S502, in which the tilt angle θ is detected, may be omitted.

In the configuration in which the rack 40 is tilted so that the container 90 is tilted, the camera 43 is also tilted along with the container 90. Therefore, the container 90 does not tilt but only the liquid surface SF1 tilts in an image. On the assumption that the liquid surface SF1 tilts, the image processing section 120 may search for a linear pattern the tilt of which is specified in advance, extract the linear pattern from an image, and acquire information on the position of the liquid surface on the basis of a result of the extraction. The image processing section 120 may specify the tilt of the linear pattern to be searched for in accordance with the tilt of the container 90.

Figure 23A:
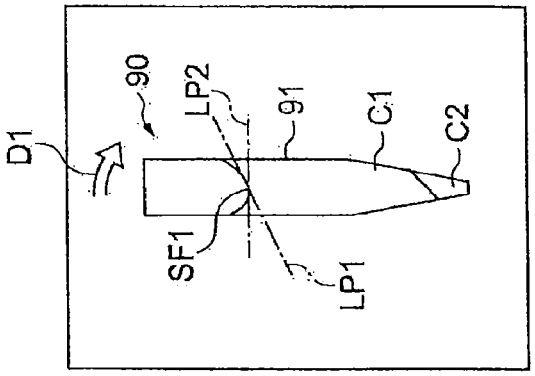
FIGS. 23A and 23B are diagrammatic views showing the relationship between a linear pattern of an object to be extracted and a liquid surface.
Figure 23B:
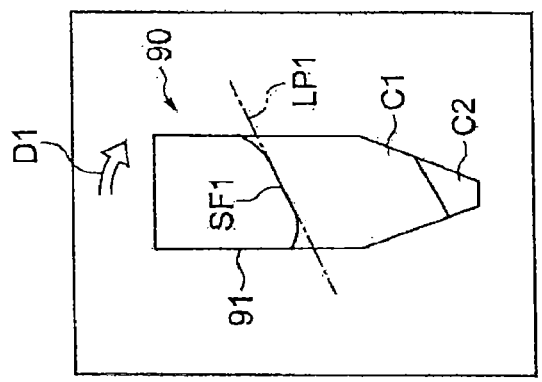
Figure 24:
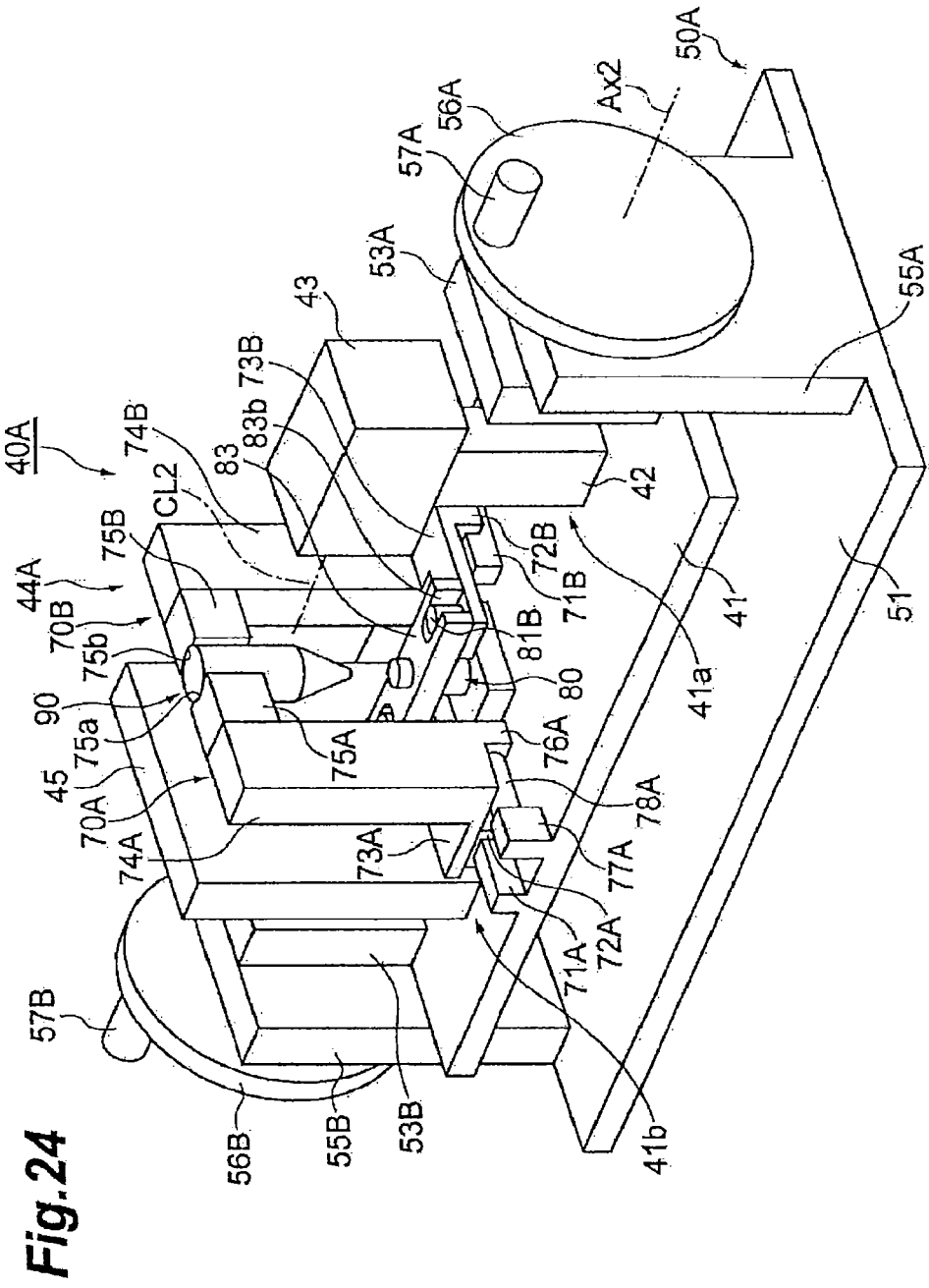
FIG. 24 is a perspective view showing a variation of the rack.
Figure 25:
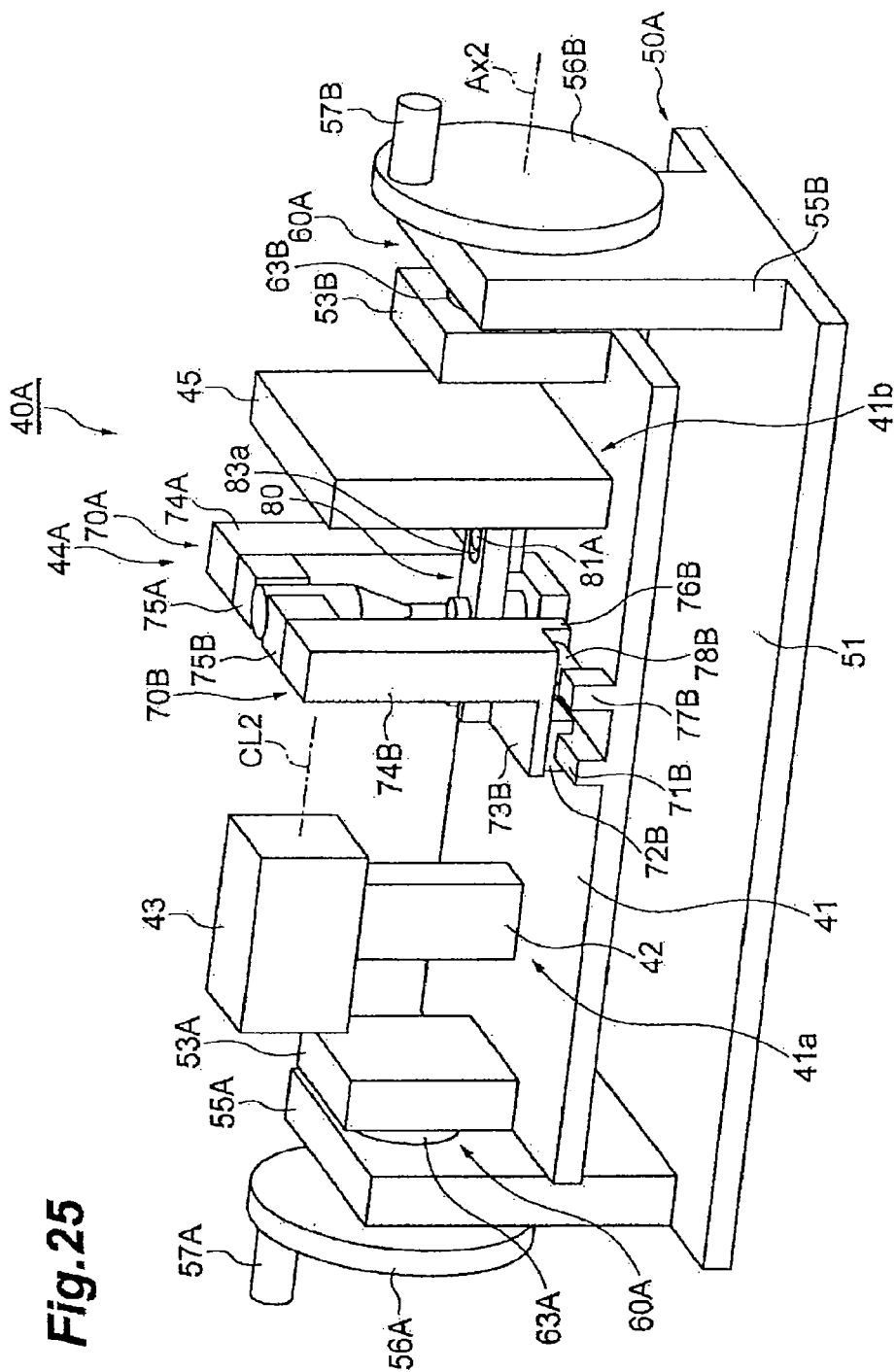
FIG. 25 is a perspective view of the rack shown in FIG. 24 viewed along another direction.

FIGS. 23A and 23B shows images captured with the camera 43 in the configuration including the rack 40. As shown in FIG. 23A, the image processing section 120 may search for a linear pattern LP1 tilting at an angle roughly equal to the angle by which the container 90 and the camera 43 are tilted but in the direction opposite a direction D1 in which the container 90 and the camera 43 are tilted, extract the linear pattern LP1 from the image, and acquire information on the position of the liquid surface SF1 on the basis of a result of the extraction. The image processing section 120 may set the tilt angle of the linear pattern LP1 at a single value or may set upper and lower limits of the tilt angle of the linear pattern LP1 so that the tilt angle has a certain range.

The image processing section 120 may specify the tilt of a linear pattern to be searched for in accordance with the thickness of the container 90 (inner diameter of sidewall 91). For example, the image processing section 120 may specify the tilt of a linear pattern to be searched for in accordance with a decrease in the thickness of the container 90 (decrease in inner diameter of sidewall 91).

The circumferential edge of the liquid surface SF1 gradually rises with distance to the inner surface of the sidewall 91 due to the surface tension of the liquid C1 (the portion that gradually rises is hereinafter referred to as "gradually rising portion"). In a thin container 90, the ratio of the gradually rising portion to the entire liquid surface SF1 increases, as shown in FIG. 23B. In this case, setting the tilt of the linear pattern to be searched for at a large value is likely to undesirably result in extraction of only the gradually rising portion. When only the gradually rising portion is extracted, the information on the position of the liquid surface SF1 is acquired as if the entire liquid surface tilted as much as the gradually rising portion, resulting in a decrease in accuracy of the information on the position of the liquid surface SF1 (see linear pattern LP1 in FIG. 23B). In this case, searching for a linear pattern LP2 the tilt of which is smaller than that of the linear pattern LP1 (for example, horizontal linear pattern LP2) allows extraction of the liquid surface SF1 in the vicinity of the center of the sidewall 91 where the degree of the gradual rise is small. As a result, a decrease in the accuracy of the information on the position of the liquid surface SF1 can be suppressed.

1.4 Advantageous Effects of First Embodiment

As described above, the dispensing system 1 includes the robot 10, which moves the dispenser 30 for sucking the liquid C1 to be dispensed, the camera 43, which captures an image containing at least the front end section 30a of the dispenser 30, the liquid surface SF1 of the liquid C1, and the non-dispensed object C2 located below the liquid surface SF1, the image processing section 120, which acquires information on the position of the liquid surface SF1, information on the position of the boundary BD1 between the liquid C1 and the non-dispensed object C2, and information on the position of the front end section 30a of the dispenser 30 on the basis of the image, and the descent control section 133, which controls the robot 10 so as to cause the dispenser 30 to descend on the basis of the information on the position of the front end section 30a, the information on the position of the liquid surface SF1, and the information on the position of the boundary BD1 when the liquid C1 is sucked into the dispenser 30.

According to the dispensing system 1, in which the front end section 30a is caused to descend on the basis of the positional relationship between the liquid surface SF1 and the front end section 30a, the front end section 30a can be kept in a shallow position from the liquid surface SF1. As a result, the amount of liquid that undesirably adheres to the outer circumference of the front end section 30a is reduced. Causing the front end section 30a to descend on the basis of the positional relationship between the boundary BD1 and the front end section 30a allows the front end section 30a to approach the boundary BD1. As a result, a sufficient amount of the liquid C1 is sucked. Further, moving the front end section 30a in accordance with the liquid surface SF1 and the boundary BD1 allows the front end section 30a to be maintained in the liquid and prevents idle sucking (sucking gas). More reliable dispensing work can therefore be performed.

The information on the position of the front end section 30a, the information on the position of the liquid surface SF1, and the information on the position of the boundary BD1 are acquired on the basis of image information on a dispensing work basis. Since the information on the position of the liquid surface SF1 and the information on the position of the boundary BD1 tend to vary, acquisition of the information on a dispensing work basis allows further more reliable dispensing work to be performed.

In the present embodiment, since the chip 32 is removably attached to the main body 31, the position of the front end section 30a with respect to the main body 31 also tends to vary. Therefore, the advantageous effect provided by the acquisition of the information on the position of the front end section 30a, the information on the position of the liquid surface SF1, and the information on the position of the boundary BD1 on a dispensing work basis is enhanced.

The dispensing system 1 may further include the target position setting section 136, which sets the final target position GL1 on the basis of the information on the position of the boundary BD1, and the descent control section 133 may control the robot 10 so as to cause the front end section 30a of the dispenser 30 to descend in such a way that the front end section 30a follows the descent of the liquid surface SF1 and further causes the front end section 30a of the dispenser 30 to descend to the final target position GL1. Causing the front end section 30a in such a way as to follow the descent of the liquid surface SF1 more reliably allows the front end section 30a to be kept in a shallow position from the liquid surface SF1. Further, determining the final target position GL1 from the boundary BD1 more reliably allows the front end section 30a to approach the boundary BD1. More reliable dispensing work can therefore be performed. It is, however, noted that since the dispensing system 1 only needs to cause the dispenser 30 to descend on the basis of the information on the position of the front end section 30a, the information on the position of the liquid surface SF1, and the information on the position of the boundary BD1, it is not essential to further provide the target position setting section 136, cause the front end section 30a in such a way as to follow the descent of the liquid surface SF1, and cause the front end section 30a to descend to the final target position GL1.

The target position setting section 136 may update the final target position GL1 on the basis of the information on the position of the boundary BD1 during the period for which the robot 10 causes the dispenser 30 to descend. In this case, even when the position of the boundary BD1 varies, the final target position GL1 can be updated in accordance with the movement of the boundary BD1, whereby the front end section 30a is more reliably allowed to approach the boundary BD1. More reliable dispensing work can therefore be performed. It is, however, not essential to update the final target position GL1 by using the target position setting section 136.

The dispensing system 1 may further include the boundary monitoring section 135, which detects a change in the boundary BD1, and the target position setting section 136 may update the final target position GL1 on the basis of the information on the position of the boundary BD1 when a change in the boundary BD1 is detected by the boundary monitoring section 135. In this case, updating the final target position GL1 only when a change in the boundary BD1 is detected allows reduction in computation burden. It is, however, not essential to update the final target position GL1 only when a change in the boundary BD1 is detected. The target position setting section 136 may be configured to update the final target position GL1 whenever the information on the position of the boundary BD1 is acquired.

The descent control section 133 may include the first mode control section 133a, which controls the robot 10 so as to cause the front end section 30a of the dispenser 30 to descend in such a way that the front end section 30a follows the descent of the liquid surface SF1, the second mode control section 133b, which controls the robot 10 so as to cause the front end section 30a of the dispenser 30 to descend to the final target position GL1, and the switching section 133c, which switches the control performed by the first mode control section 133a to the control performed by the second mode control section 133b when the front end section 30a of the dispenser 30 approaches the final target position GL1. In this case, in the descent control performed by the first mode control section 133a, in which priority is placed to the follow of the liquid surface SF1, the front end section 30a can be more reliably kept in a shallow position from the liquid surface SF1. In the descent control performed by the second mode control section 133b, in which priority is placed to the decent to the final target position GL1, the front end section 30a is more reliably allowed to approach the boundary BD1. More reliable dispensing work can therefore be performed. It is, however, not essential to divide the control performed by the descent control section 133 into the two stages, the control performed by the first mode control section 133a and the control performed by the second mode control section 133b.

The first mode control section 133a may perform the control in such a way that responsiveness is increased as compared with the control performed by the second mode control section 133b, and the second mode control section 133b may perform the control in such a way that the amount of overshoot is suppressed as compared with the control performed by the first mode control section 133a. In this case, in the descent control performed by the first mode control section 133a, delay of the decent of the front end section 30a relative to the decent of the liquid surface SF1 is reduced, whereby the position of the front end section 30a can be kept in a shallow position from the liquid surface SF1. In the descent control performed by the second mode control section 133b, the amount of overshoot of the front end section 30a beyond the final target position GL1 is reduced, whereby the front end section 30a is more reliably allowed to approach the boundary BD1. More reliable dispensing work can therefore be performed. It is, however, not essential to make the responsiveness and other types of performance in the control performed by the first mode control section 133a different from those in the control performed by the second mode control section 133b.

The switching section 133c may switch the control performed by the first mode control section 133a to the control performed by the second mode control section 133b when the remaining distance LD1 becomes smaller than the reference distance RF1 set in advance. In this case, the simplification of the criterion in accordance with which the switching is performed allows the control performed by the first mode control section 133a to be more reliably switched to the control performed by the second mode control section 133b. It is, however, noted that the switching criterion is not limited to the criterion described above.

The dispensing system 1 may further include the reference distance setting section 134, which increases the reference distance RF1 in accordance with an increase in the movement speed of the front end section 30a of the dispenser 30. In this case, bringing the timing at which the control performed by the first mode control section 133a is switched to the control performed by the second mode control section 133b forward in accordance with an increase in the movement speed of the front end section 30a allows the front end section 30a to more reliably stop at the final target position GL1. More reliable dispensing work can therefore be performed. In the present embodiment, since the lower section 91a of the sidewall 91 has a tapered shape that tapers off toward the front end, the descent speed of the liquid surface SF1 increases as the liquid surface SF1 approaches the bottom 92. Therefore, the effect provided by the configuration in which the reference distance RF1 is increased in accordance with an increase in the movement speed is more enhanced. It is, however, not essential to increase the reference distance RF1 in accordance with an increase in the movement speed of the front end section 30a.

In a state in which the liquid C1 and the non-dispensed object C2 are contained in the container 90 that tilts in the field of view of the camera 43, the descent control section 133 may control the robot 10 in such a way the robot 10 causes the front end section 30a of the dispenser 30 to descend in an oblique direction in correspondence with the tilt of the container 90. In this case, the liquid C1 can be sucked in with the container 90 tilted in such a way that the tilt of the boundary BD1 with respect to the liquid surface SF1 decreases as compared with a case where the container 90 stands in an upright position. When the tilt of the boundary BD1 with respect to the liquid surface SF1 decreases, an upper portion of the tilted boundary BD1 is unlikely to come into contact with the liquid surface SF1, whereby variation in the boundary BD1 is suppressed. As a result, the final target position GL1 is stabilized, whereby the front end section 30a is more reliably allowed to approach the boundary BD1. More reliable dispensing work can therefore be performed. It is, however, not essential to tilt the container 90 in sucking work.

The dispensing system 1 may further include the container placement control section 131, which controls the robot 10 in such a way as to maintain the container 90 tilted in the direction in which the tilt of the boundary BD1 with respect to the liquid surface SF1 decreases and transport the container 90 from a position outside the field of view of the camera 43 into the field of view of the camera 43. In this case, variation in the boundary BD1 can be more reliably suppressed.

The dispensing system 1 may further include the tilt action control section 138, which controls the robot 10 in such a way as to tilt the container 90 in the field of view of the camera 43 in the direction in which the tilt of the boundary BD1 with respect to the liquid surface SF1 decreases. In this case, the container 90 can be tilted in accordance with the state of the boundary BD1.

The dispensing system 1 may further include the tilt detection section 137, which detects the tilt of the boundary BD1 with respect to the liquid surface SF1 on the basis of the image described above, and the tilt action control section 138 may control the robot 10 in such a way that when tilt of the boundary BD1 is detected by the tilt detection section 137, the robot 10 tilts the container 90 and the dispenser 30 in the direction in which the tilt of the boundary BD1 decreases as the front end section 30a of the dispenser 30 approaches the final target position GL1. In this case, since the container 90 is tilted after the amount of the liquid C1 in the container 90 decreases due to the sucking, leakage of the liquid C1 due to the tilted container 90 can be more reliably avoided.

The tilt action control section 138 may control the robot 10 in such a way as to tilt the container 90 and the dispenser 30 before the liquid surface SF1 reaches the boundary BD1. In this case, variation in the boundary BD1 can be more reliably suppressed. As a result, the final target position GL1 is further stabilized, whereby the front end section 30a is more reliably allowed to approach the boundary BD1.

The dispensing system 1 may include the double-arm robot 10 having the first and second arms 13A, 13B. The descent control section 133 may control the robot 10 in such a way that the first arm 13A causes the dispenser 30 to descend, and the tilt action control section 138 may control the robot 10 in such a way that the first arm 13A tilts the dispenser 30 and the second arm 13B tilts the container 90. In this case, the double-arm robot 10 can be effectively used in such a way that the sucking procedure accompanied by operation of tilting the container 90 and the dispenser 30 can be performed in a more efficient manner. It is, however, not essential to configure the robot 10 to be double-armed. For example, the dispensing system 1 may include an apparatus for tilting the container 90 separately from the robot 10.

The tilt detection section 137 may detect the tilt angle θ of the boundary BD1 with respect to the liquid surface SF1 on the basis of the image described above. The tilt action control section 138 may control the robot 10 in such a way as to tilt the container 90 and the dispenser 30 by the target tilt action angle RF5 corresponding to the tilt angle θ. In this case, variation in the boundary BD1 can be more reliably suppressed. As a result, the final target position GL1 can be further stabilized, whereby the front end section 30a is more reliably allowed to approach the boundary BD1. More reliable dispensing work can therefore be performed. It is, however, not essential to set the target tilt action angle RF5 in such a way as to correspond to the tilt angle θ.

When tilt of the boundary BD1 is detected by the tilt detection section 137, the target position setting section 136 may set the final target position GL1 to be a position shifted downward along the tilt of the boundary BD1 with respect to the position of the center of the container 90. In this case, the front end section 30a is allowed to penetrate into the container 90 to a deeper position therein, whereby a larger amount of the liquid C1 can be sucked (see FIGS. 17B to 17E). More reliable dispensing work can therefore be performed. It is, however, not essential to set the final target position GL1 to be a position shifted downward along the tilt of the boundary BD1 with respect to the center position.

The dispensing system 1 may further include the rack 40, which holds the camera 43 and the container 90 together. The descent control section 133 may control the robot 10 in so as to cause the front end section 30a of the dispenser 30 to descend in an oblique direction with the tilt of the container 90 maintained by the rack 40. In this case, since the positional relationship between the container 90 and the camera 43 is stabilized, the container 90 is more reliably kept in the field of view of the camera 43 even in the state in which the container 90 is tilted. Further, since the distance between the camera 43 and the container 90 is stabilized, the amount of defocus of an image is suppressed. The variety of pieces of positional information based on an image can therefore be more reliably acquired, whereby more reliable dispensing work can be performed. It is, however, not essential to provide the rack 40.

The dispensing system 1 may further include the rack 40, which holds the camera 43 and the container 90 together. The tilt action control section 138 may control the robot 10 in such a way as to tilt the rack 40 so that the container 90 is tilted. In this case, since the camera 43 is tilted along with the container 90, the container 90 is more reliably kept in the field of view of the camera 43. Further, since the distance between the camera 43 and the container 90 is stabilized, the amount of defocus of an image is suppressed. The variety of pieces of positional information based on an image can therefore be more reliably acquired, whereby more reliable dispensing work can be performed. It is, however, not essential to provide the rack 40.

The dispensing system 1 may further include the light 45, which radiates light toward the container 90. The light 45 may be held by the rack 40 along with the camera 43 and the container 90 in an arrangement in which the container 90 is sandwiched between the light 45 and the camera 43. In this case, since the light 45 is also tilted along with the container 90, the variety of pieces of positional information based on an image can be more reliably acquired. More reliable dispensing work can therefore be performed. It is, however, not essential to provide the light 45.

The light 45 may radiate red visible light. In this case, the sensitivity at which the liquid surface SF1 and the boundary BD1 are detected in image processing can be increased.

The backlight control section 160, which turns off the light 45 for at least part of the time frame for which the camera 43 performs no image capturing, may be further provided. In this case, the period for which the light 45 radiates light can be shortened, and the burden on an operator's eyes can be lowered.

The image processing section 120 may search for a linear pattern the tilt of which is specified in advance, extract the linear pattern from the contents in an image, and acquire the information on the position of the liquid surface SF1 on the basis of a result of the extraction. A large number of pieces of noise information, such as water droplets, are present around the liquid surface SF1. Specifying in advance a linear pattern to be searched for allows removal of the noise information and accurate acquisition of the information on the position of the liquid surface SF1.

The image processing section 120 may specify the tilt of the linear pattern to be searched for in accordance with the tilt of the container 90. The tilt of the liquid surface SF1 correlates with the tilt of the container 90. Therefore, specifying the tilt of the linear pattern to be searched for in accordance with the tilt of the container 90 allows accurate acquisition of the information on the position of the liquid surface SF1.

The image processing section 120 may specify the tilt of the linear pattern to be searched for in accordance with the thickness of the container 90. The tilt of a linear pattern appropriate for acquisition of the information on the position of the liquid surface SF1 tends to vary depending on the thickness of the container 90. For example, the thinner the container 90, the greater the ratio of the gradually rising portion described above (portion that is present along the circumferential edge of the liquid surface SF1 and gradually rises due to the surface tension of the liquid C1) to the liquid surface SF1. In this case, setting the tilt of the linear pattern at a large value undesirably results in extraction of only the gradually rising portion, possibly resulting in a decrease in accuracy of the information on the position of the liquid surface SF1. Therefore, specifying the tilt of the linear pattern in accordance with the thickness of the container 90 allows more accurate acquisition of the information on the position of the liquid surface.

The dispensing system 1 may further include the console 200 for registering reference data for dispensing work performed by the robot 10, the interruption section 112, which stops, when the reference data has not been registered, the robot 10 after the front end section 30a of the dispenser 30 enters the field of view of the camera 43 and resumes the action of the robot 10 after the reference data is registered, the reference data registration section 113, which displays the reference data setting screen during the period for which the interruption section 112 kept the robot 10 stationary, acquires reference data via the console 200, and registers the reference data. In this case, in a case where reference data for dispensing work to be subsequently performed has not been registered even when the robot 10 is in operation, the interruption section 112 suspends the action of the robot 10 and resumes the action of the robot 10 after the reference data is registered by the reference data registration section 113. Therefore, reference data that has not been registered in advance can be registered as appropriate during the action of the robot 10. A program in accordance with which the robot 10 operates can therefore be readily constructed. It is, however, not essential to provide the registration function described above.

The dispensing system 1 may further include the step flow setting section 111, which sets step flows of a variety of types of work performed by the robot 10 including a plurality of types of dispensing work. The interruption section 112 may stop the robot 10 on a dispensing work basis when reference data has not been registered, and the reference data registration section 113 may acquire and register reference data corresponding to dispensing work to be subsequently performed whenever the interruption section 112 stops the robot 10. In this case, even when an action program including a plurality of types of dispensing work is constructed, reference data on a dispensing work basis can be set as appropriate during the action of the robot 10.

The reference data registration section 113 may register an image pattern of the front end section 30a of the dispenser 30, and the image processing section 120 may acquire the information on the position of the front end section 30a of the dispenser 30 on the basis of the image pattern of the front end section 30a of the dispenser 30. In this case, pattern matching allows the information on the position of the front end section 30a to be readily and quickly acquired.

The reference data registration section 113 may register an image pattern of the front end section 30a of the dispenser 30 outside the liquid C1 and an image pattern of the front end section 30a of the dispenser 30 inside the liquid C1. In this case, the accuracy of the information on the position of the front end section 30a can be improved by proper use of the image pattern of the front end section 30a outside the liquid C1 and the image pattern of the front end section 30a inside the liquid C1.

The reference data registration section 113 may further register the first analysis area for searching for the front end section 30a of the dispenser 30 outside the liquid C1 in the image described above, the second analysis area for searching for the liquid surface SF1 in the image described above, and the third analysis area for searching for the boundary BD1 in the image described above. The image processing section 120 may acquire the information on the position of the front end section 30a of the dispenser 30 from the contents in the first or second analysis area, acquire the information on the position of the liquid surface SF1 from the contents in the second analysis area, and acquire the information on the position of the boundary BD1 from the contents in the third analysis area. In this case, limiting the area over which the positional information is searched for allows the searching process to be carried out more quickly and the positional information to be more accurately acquired.

The rack 40 includes the container holder 44, which is fixed to the stage 41 and holds the container 90, and the camera 43, which is fixed to the stage 41 and located in a position where the camera 43 can capture an image of the container 90.

According to the thus configured rack 40, tilting the stage 41 allows both the container 90 and the camera 43 to be tilted. The placement of the container 90 in the field of view can therefore be fixed also in dispensing work accompanied by work of tilting the container 90. Further, since the distance between the container 90 and the camera 43 is stabilized, the amount of defocus of an image is suppressed. According to the advantageous effects described above, when information necessary for dispensing is acquired by using image processing, reliability of a result of the acquisition is increased. Information obtained by processing an image obtained by using the rack 40 can therefore be used to control an apparatus for dispensing work (robot 10 and dispenser 30, for example), whereby a dispensing system capable of performing more reliable dispensing work can be constructed.

The rack 40 may further include the stage holder 50, which holds the stage 41 in such a way that the stage 41 is rotatable around the first axis along which the container holder 44 and the camera 43 are aligned with each other. In this case, an image containing the container 90 tilting around the first axis is captured along a line of sight extending along the first axis. Therefore, since an image of the liquid surface SF1 is kept roughly linear even in a state in which the container 90 tilts, recognition of the liquid surface SF1 by using image recognition is readily performed. Therefore, since reliability of a result of the image-processing-based information acquisition is further increased, a dispensing system capable of performing more reliable dispensing work can be constructed.

The rack 40 may further include the light 45 fixed to the stage 41 and located in a position where the light 45 can radiate light toward the container 90. In this case, tilting the stage 41 allows the light 45 to be tilted along with the container 90 and the camera 43. The state of the illuminated container 90 can therefore be kept fixed even in dispensing work accompanied by work of tilting the container 90. Further, since the placement of the light 45 with respect to the container 90 and the camera 43 is stabilized, the brightness distribution in an image is stabilized. The advantageous effects described above further increase the reliability of a result of the image-processing-based information acquisition. A dispensing system capable of performing more reliable dispensing work can therefore be constructed.

The container holder 44 may be located between the camera 43 and the light 45. In this case, since influence of the light reflected off the outer surface of the container 90 is suppressed, the reliability of a result of the image-processing-based information acquisition is further increased. A dispensing system capable of performing more reliable dispensing work can therefore be constructed.

A dispensing system for which the rack 40 is useful is not necessarily limited to the dispensing system 1 described above. The rack 40 can be effectively used with any dispensing system including at least the rack 40, the robot, and the controller configured to control the robot 10 so as to transport the container 90 and causes the container holder 44 to hold the container 90, acquire the information on the position of the liquid surface SF1 on the basis of an image captured with the camera 43, control the robot 10 so as to tilt the rack 40, and control the robot 10 so as to cause the dispenser 30 to descend on the basis of the information on the position of the liquid surface SF1 when the liquid C1 is sucked into the dispenser 30.

When the rack 40 has the stage holder 50, the controller allows the rack 40 to be further effectively used by controlling the robot 10 so as to tilt the rack 40 around the first axis.

2. Variation of Rack

Since the rack may be any rack fixed to the stage and including the container holder that holds a container containing liquid to be dispensed and the camera that is fixed to the stage and located in a position where the camera can capture an image of the container, the specific configuration of the rack is not limited to the configuration of the rack 40 illustrated and described above. A variation of the rack will be described below with reference to FIGS. 24 to 27.

A rack 40A shown in FIGS. 24 to 27 is configured in such a way that the container holder 44, the stage holder 50, and the angle keeper 60 of the rack 40 are replaced with a container holder 44A, a stage holder 50A, and an angle keeper 60A.

2.1 Container Holder

The container holder 44A includes a first part 70A, a second part 70B, and elastic members 78A and 78B. In the following description of the first part 70A, the second part 70B, and the elastic members 78A and 78B, the term "upper, lower" means "upper, lower" in a case where the upper surface of the stage 41 is assumed to be a horizontal surface.

(1) First Part and Second Part

The first part 70A and the second part 70B are positioned in such a way as to sandwich the central axis CL2 of the camera 43 and configured in such a way as to approach each other to sandwich the container 90. For example, two guides 71A and 71B are provided above the upper surface of the stage 41. The first part 70A is attached to the guide 71A, and the second part 70B is attached to the guide 71B. The guides 71A and 71B are arranged side by side in the direction along the central axis CL2 and extend in the direction perpendicular to the central axis CL2. The guide 71A is located on one side of the central axis CL2, and the guide 71B is located on the other side of the central axis CL2 when viewed from above in the vertical direction.

The first part 70A includes a slide block 72A, a slide plate 73A, a column 74A, and a contact section 75A. The slide block 72A is provided on the guide 71A and movable along the guide 71A. The slide block 72A is attached to the guide 71A, for example, via a plurality of balls. The slide plate 73A is provided on the slide block 72A and overhangs toward the guide 71B in the direction along the central axis CL2.

The column 74A protrudes from the upper surface of the slide plate 73A. For example, the column 74A protrudes to a position higher than the central axis CL2. The column 74A is located on the slide plate 73A, specifically, on a portion that overhangs toward the guide 71B.

The contact section 75A is provided at an upper portion of the column 74A. The contact section 75A protrudes from the upper portion of the column 74A toward the central axis CL2. Among the outer surfaces of the contact section 75A, in the surface facing the central axis CL2 is formed a groove 75a along the vertical direction.

The second part 70B includes a slide block 72B, a slide plate 73B, a column 74B, and a contact section 75B. The slide block 72B is provided on the guide 71B and movable along the guide 71B. The slide block 72B is attached to the guide 71B, for example, via a plurality of balls. The slide plate 73B is provided on the slide block 72B and overhangs toward the guide 71A in the direction along the central axis CL2.

The column 74B protrudes from the upper surface of the slide plate 73B. For example, the column 74B protrudes to a position higher than the central axis CL2. The column 74B is located on the slide plate 73B, specifically, on a portion that overhangs toward the guide 71A and faces the column 74A with the central axis CL2 interposed therebetween.

The contact section 75B is provided at an upper portion of the column 74B. The contact section 75B protrudes from the upper portion of the column 74B toward the central axis CL2. Among the outer surfaces of the contact section 75B, in the surface facing the central axis CL2 is formed a groove 75b along the vertical direction.

According to the configuration described above, the first part 70A can approach or move away from the central axis CL2 on one side thereof, and the second part 70B can approach or move away from the central axis CL2 from the other side thereof. When the first part 70A and the second part 70B approach or move away from the central axis CL2, the contact sections 75A and 75B approach or move away from each other. As a result, the contact sections 75A and 75B can sandwich the container 90. The sidewall 91 of the container 90 sandwiched between the contact sections 75A and 75B extends along the grooves 75a and 75b. The sidewall 91 is therefore perpendicular to the upper surface of the stage 41.

The contact sections 75A and 75B may be integrated with the columns 74A and 74B, respectively, or may be formed separately from each other and fixed to the columns 74A and 74B, respectively. From a viewpoint of reliable prevention of damage to the container 90, the contact sections 75A and 75B may be made of a material softer than the material of the columns 74A and 74B. For example, when the columns 74A and 74B are made of a metal material, the contact sections 75A and 75B may be made of a resin material.

According to the container holder 44A described above, the container 90 can be properly retained in the field of view of the camera 43 in the simple procedure. For example, in a state in which the contact sections 75A and 75B approach each other under repulsive force produced by the elastic member 78A and 78B, the bottom 92 of the container 90 is simply inserted from above into the space between the grooves 75a and 75b, and the thus inserted container 90 is pushed downward so that the sidewall 91 is placed between the contact sections 75A and 75B, whereby the container 90 can be held by the container holder 44A.

(2) Elastic Members

The elastic members 78A and 78B produce repulsive force that causes the first part 70A and the second part 70B to approach each other. A protrusion 76A is formed in such a way as to protrude toward the stage 41 from the slide plate 73A of the first part 70A, specifically, from a portion that overhangs toward the guide 71B. A protrusion 77A, which is located on the side opposite the second part 70B in the direction perpendicular to the central axis CL2, is formed in such a way as to protrude from the upper surface of the stage 41 and face the protrusion 76A. The elastic member 78A is, for example, a coil spring and compressed and disposed between the protrusions 76A and 77A. As a result, the repulsive force produced by the elastic member 78A acts on the first part 70A toward the second part 70B.

A protrusion 76B is formed in such a way as to protrude toward the stage 41 from the slide plate 73B of the second part 70B, specifically, from a portion that overhangs toward the guide 71A. A protrusion 77B, which is located on the side opposite the first part 70A in the direction perpendicular to the central axis CL2, is formed in such a way as to protrude from the upper surface of the stage 41 and faces the protrusion 76B. The elastic member 78B is, for example, a coil spring and compressed and disposed between the protrusions 76B and 77B. As a result, the repulsive force produced by the elastic member 78B acts on the second part 70B toward the first part 70A.

(3) Linkage

The rack 40A may further include a Linkage 80. The Linkage 80 causes the first part 70A and the second part 70B to synchronously move in such a way that the first part 70A and the second part 70B move by the same amount when they approach or move away from each other. For example, the Linkage 80 has pins 81A and 81B and a link 83.

To provide the pins 81A and 81B, the slide plates 73A and 73B described above further overhang toward the central axis CL2. The pin 81A protrudes from the upper surface of the slide plate 73A, specifically, the upper surface of a portion that overhangs toward the central axis CL2. The pin 81A is located in a position shifted from the column 74A toward the guide 71A. The pin 81B protrudes from the upper surface of the slide plate 73B, specifically, the upper surface of a portion that overhangs toward the central axis CL2. The pin 81B is located in a position shifted from the column 74B toward the guide 71B.

The link 83 is attached onto the stage 41 in such a way as to be rotatable around a vertical axis. The center of rotation of the link 83 passes through a position equidistant from the pins 81A and 81B and intersects the central axis CL2. The link 83 spans the space between the pins 81A and 81B. Specifically, recesses 83a and 83b, each of which has a U-like shape when viewed from above in the vertical direction, are formed at opposite end portions of the link 83. The pin 81A is contained in the recess 83a, and the pin 81B is contained in the recess 83b.

According to the mechanism, when one of the first part 70A and the second part 70B moves in such a way as to approach or move away from the central axis CL2, the link 83 rotates in response to the movement, and the other one of the first part 70A and the second part 70B moves in the opposite direction in response to the rotation of the link 83. Since the center of rotation of the link 83 passes through the position equidistant from the pins 81A and 81B, the amount of movement of the one of the first part 70A and the second part 70B is equal to the amount of movement of the other one of the first part 70A and the second part 70B.

2.2 Stage Holder

The stage holder 50A holds the stage 41 in such a way that the stage 41 is rotatable around an axis Ax2 (first axis) along the direction in which the container holder 44 and the camera 43 are aligned with each other. The axis Ax2 may be parallel to the central axis CL2 of the camera 43 and may be positioned between the central axis CL2 and the stage 41

Figure 27:
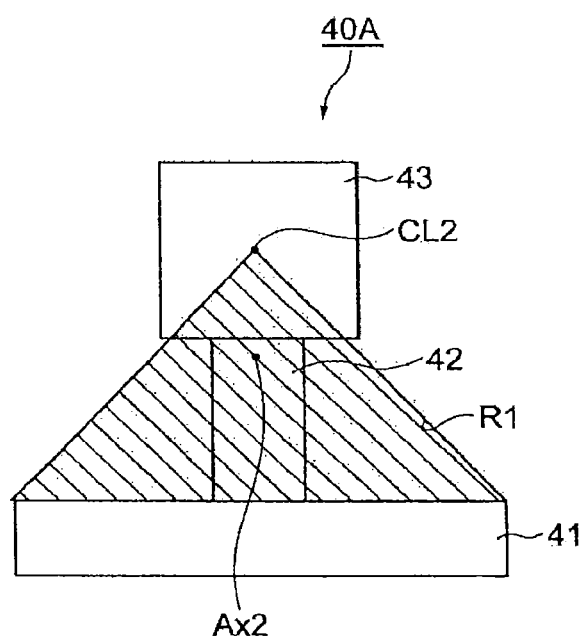
FIG. 27 shows the arrangement of the center of rotation of a stage.

(see area R1 in FIG. 27). The axis Ax2 may be positioned in such a way as to coincide with the central axis CL2 when viewed from above in the vertical direction.

For example, the stage holder 50A includes a support plate 51, brackets 53A and 53B, shafts 54A and 54B, and brackets 55A and 55B.

The brackets 53A and 53B are provided at opposite ends of the stage 41 in the direction in which the axis Ax2 extends. The brackets 53A and 53B protrude from the upper surface of the stage 41. The shaft 54A protrudes from the bracket 53A toward the side opposite the bracket 53B. The shaft 54B protrudes from the bracket 53B toward the side opposite the bracket 53A. That is, the shafts 54A and 54B protrude in opposite directions. The shafts 54A and 54B are coaxially with each other, and the central axes thereof coincide with the axis Ax2.

Figure 26:
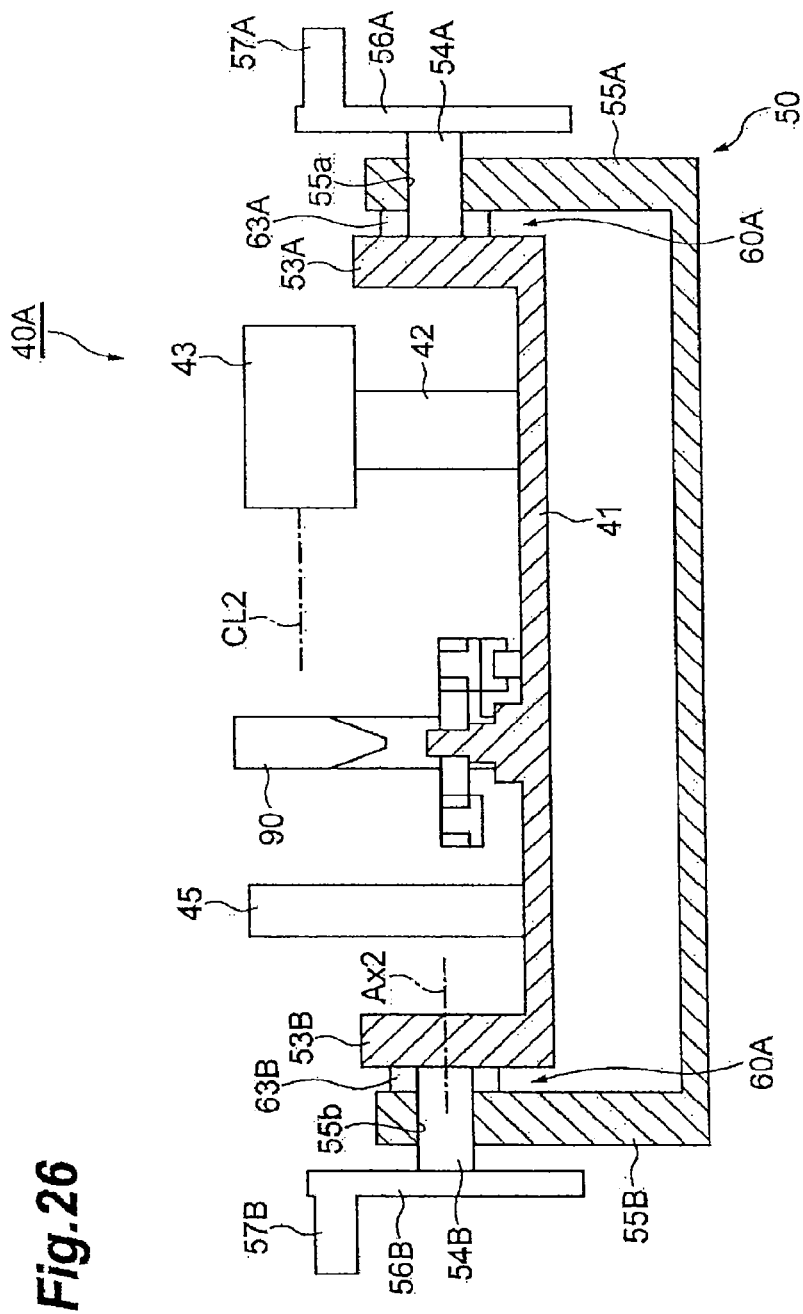
FIG. 26 is a cross-sectional view of the rack shown in FIG. 24.

The brackets 55A and 55B are provided at opposite ends of the support plate 51 in the direction in which the axis Ax2 extends. The brackets 55A and 55B protrude from the upper surface of the support plate 51. The brackets 55A and 55B rotatably hold the shafts 54A and 54B, respectively. For example, the brackets 55A and 55B have shaft receiving holes 55a and 55b, respectively, as shown in FIG. 26. The bracket 55A faces the bracket 53A, and the shaft receiving hole 55a of the bracket 55A receives the shaft 54A. The bracket 55B faces the bracket 53B, and the shaft receiving hole 55b of the bracket 55B receives the shaft 54B. As a result, the stage 41 is held in such a way as to be rotatable around the axis Ax2.

2.3 Angle Keeper

The angle keeper 60A allows rotation of the stage 41 when torque resulting from external force acts on the stage 41 but restricts rotation of the stage 41 when no torque resulting from external force acts on the stage 41. The angle keeper 60A, for example, has frictional loads 63A and 63B. The frictional load 63A is disposed around the shaft 54A and interposed between the brackets 53A and 55A and produces frictional torque therebetween. The frictional load 63B is disposed around the shaft 54B and interposed between the brackets 53B and 55B and produces frictional torque therebetween. The static frictional torque produced by the frictional loads 63A and 63B are set in such a way that the total value of the static frictional torque is greater than the torque produced by the weight of portions of the frictional loads 63A and 63B that are allowed to rotate around the axis Ax2.

The angle keeper 60A may be any mechanism that allows rotation of the stage 41 when torque resulting from external force acts on the stage 41 but restricts rotation of the stage 41 when no torque resulting from external force acts on the stage 41, and the specific configuration of the angle keeper 60A is not limited to the frictional loads 63A and 63B. For example, the angle keeper 60A may be formed of a torque diode (registered trademark).

2.4 Handles

The rack 40A may further include a first handle 56A and a second handle 56B. The first handle 56A is provided on one end side of the stage 41 in the direction in which the axis Ax2 extends and is capable of transmitting torque to the stage 41. The second handle 56B is provided on the other end side of the stage 41 in the direction in which the axis Ax2 extends and is capable of transmitting torque to the stage 41.

For example, the first handle 56A is disposed in such a way that the first handle 56A and the bracket 53A sandwich the bracket 55A and is fixed to the end of the shaft 54A that passes through and comes out of the bracket 55A. The first handle 56A is provided with a protrusion 57A, which protrudes toward the side opposite the bracket 55A. The central axis of the protrusion 57A is shifted from the central axis of the shaft 54A (axis Ax2).

The second handle 56B is in such a way disposed that the second handle 56B and the bracket 53B sandwich the bracket 55B and is fixed to the end of the shaft 54B that passes through and comes out of the bracket 55B. The second handle 56B is provided with a protrusion 57B, which protrudes toward the side opposite the bracket 55B. The central axis of the protrusion 57B is shifted from the central axis of the shaft 54B (axis Ax2).

Figure 28:
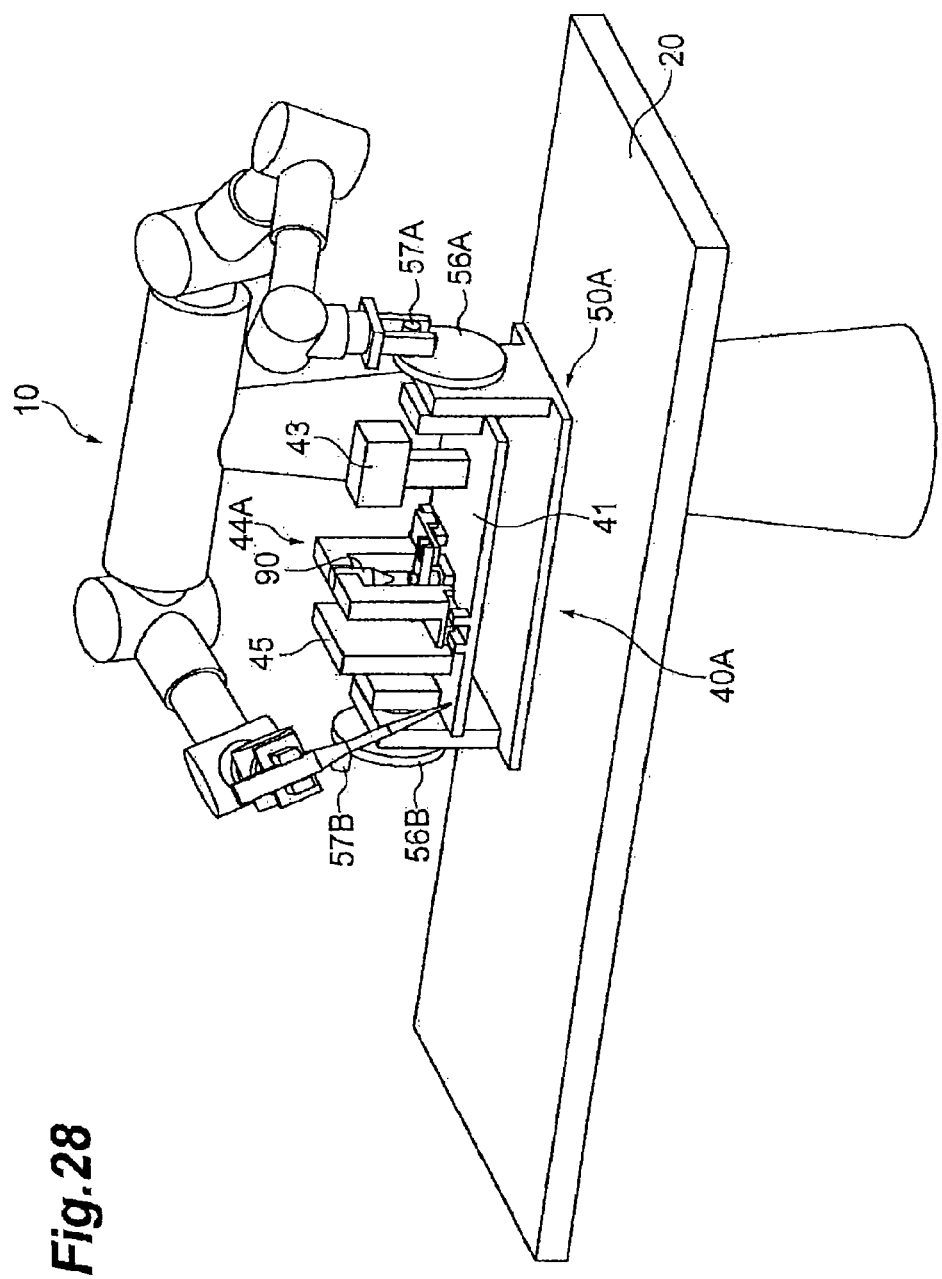
FIG. 28 is a perspective view illustrating a state in which the robot manipulates the rack shown in FIG. 24.

According to the configuration described above, controlling the robot 10 so as to grip one of the protrusions 57A and 57B and rotates the protrusion around the axis Ax2, as shown in FIG. 28, allows the torque to be transmitted to the stage 41.

2.5 Advantageous Effects of Variation of Rack

As described above, in the illustrated rack 40A, the first axis (axis Ax2) of the rack 40A may be parallel to the central axis CL2 of the camera 43 and may be positioned between the central axis CL2 of the camera 43 and the stage 41. In this case, the radius of rotation of the portion that rotates around the first axis decreases as compared with a case where the first axis extends along an outer edge of the rack 40A. The footprint of the rack can therefore be reduced.

The rack 40A may further include the angle keeper 60A, which allows rotation of the stage 41 when torque resulting from external force acts on the stage 41 but restricts rotation of the stage 41 when no torque resulting from external force acts on the stage 41. In this case, the tilt of the stage 41 can be retained at an arbitrary angle. As a result, the tilt angle of the container at the time of dispensing can be adjusted in a finer manner, whereby more reliable dispensing work can be performed.

Employing the angle keeper 60A in the configuration in which the first axis is positioned between the central axis CL2 of the camera 43 and the stage 41 allows the following advantageous effects to be further provided: That is, when the first axis is positioned between the central axis CL2 of the camera 43 and the stage 41, the moment resulting from the weight of the portion that rotates around the first axis decreases as compared with a case where the first axis extends along an outer edge of the rack 40A. As a result, holding force required to restrict the rotation of the stage 41 decreases in the case where no torque resulting from external force acts on the stage 41, whereby the size of the angle keeper 60A can be reduced.

The rack 40A may further include the first handle 56A, which is provided at one end side of the stage 41 in the direction in which the first axis extends and is capable of transmitting torque to the stage 41, and the second handle 56B, which is provided at the other end side of the stage 41 in the direction in which the first axis extends and is capable of transmitting torque to the stage 41. In this case, torque can be applied to the stage 41 from opposite sides in the direction in which the first axis extends. As a result, when an apparatus for dispensing work (robot 10, for example) tilts the stage 41, the amount of action of the apparatus can be reduced, whereby the efficiency of the dispensing work can be increased.

The container holder 44A may further include the first part 70A and the second part 70B, which are located in such a way as to sandwich the central axis CL2 of the camera 43 and configured in such a way as to approach each other to sandwich the container, and the elastic members 78A and 78B, which produce repulsive force that causes the first part 70A and the second part 70B to approach each other. In this case, containers 90 having a variety of thicknesses can be held by the common container holder 44A. Further, sandwiching the container 90 under the repulsive force produced by the elastic members allows the position of the container 90 in the field of view of the camera 43 to be stabilized irrespective of the thickness of the container 90. The versatility of the dispensing system can therefore be enhanced without loss of reliability of a result of the image-processing-based information acquisition.

The rack 40A may further include the linkage 80, which causes the first part 70A and the second part 70B to synchronously move in such a way that the first part 70A and the second part 70B move by the same amount when they approach or move away from each other. In this case, the position of the container 90 in the field of view of the camera 43 can be further stabilized. The reliability of a result of the image-processing-based information acquisition can be further enhanced.

3. Second Embodiment

A dispensing system 1A according to a second embodiment is the dispensing system 1 with the controller 100 thereof replaced with a controller 100A.

3.1 Controller

Figure 29:
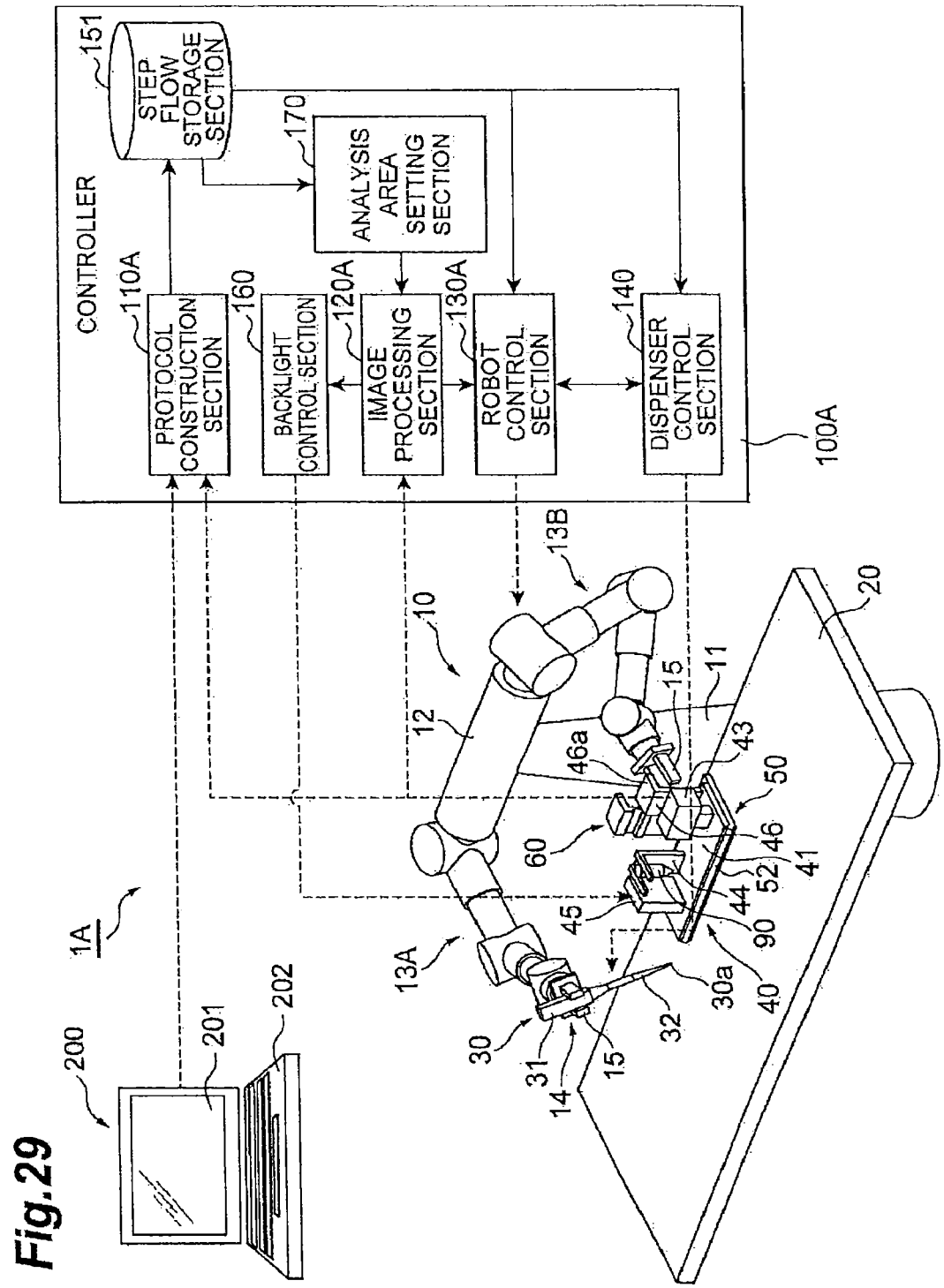
FIG. 29 is a diagrammatic view showing the configuration of a dispensing system according to a second embodiment.

The controller 100A is the controller 100 with the protocol construction section 110, the image processing section 120, and the robot control section 130 thereof replaced with a protocol construction section 110A, an image processing section 120A, and a robot control section 130A and an analysis area setting section 170 added, as shown in FIG. 29. The controller 100A can be configured by using the same hardware illustrated in the controller 100. The hardware configuration will therefore not be described, and only functional modules will be described.

(1) Protocol Construction Section

The protocol construction section 110A sets step flows of a variety of types of work performed by the robot 10 including a plurality of types of dispensing work and registers the step flows in the step flow storage section 151. For example, the protocol construction section 110A has the same process flow setting section 111 as in the protocol construction section 110 but does not have the interruption section 112, the step flow confirmation section 114, or the reference data registration section 113. The protocol construction section 110A therefore does not perform the reference data registration described above.

(2) Analysis Area Setting Section

The analysis area setting section 170 sets an analysis area (referred to as "first analysis area" in the present embodiment) for searching for the liquid C1 in an image on the basis of information representing the amounts of the liquid C1 and the non-dispensed object C2 contained in the container 90.

The analysis area setting section 170 may further set an analysis area (referred to as "second analysis area" in the present embodiment) for searching for the boundary BD1 in an image on the basis of information representing the amount of the non-dispensed object C2.

(3) Image Processing Section

Figure 30:
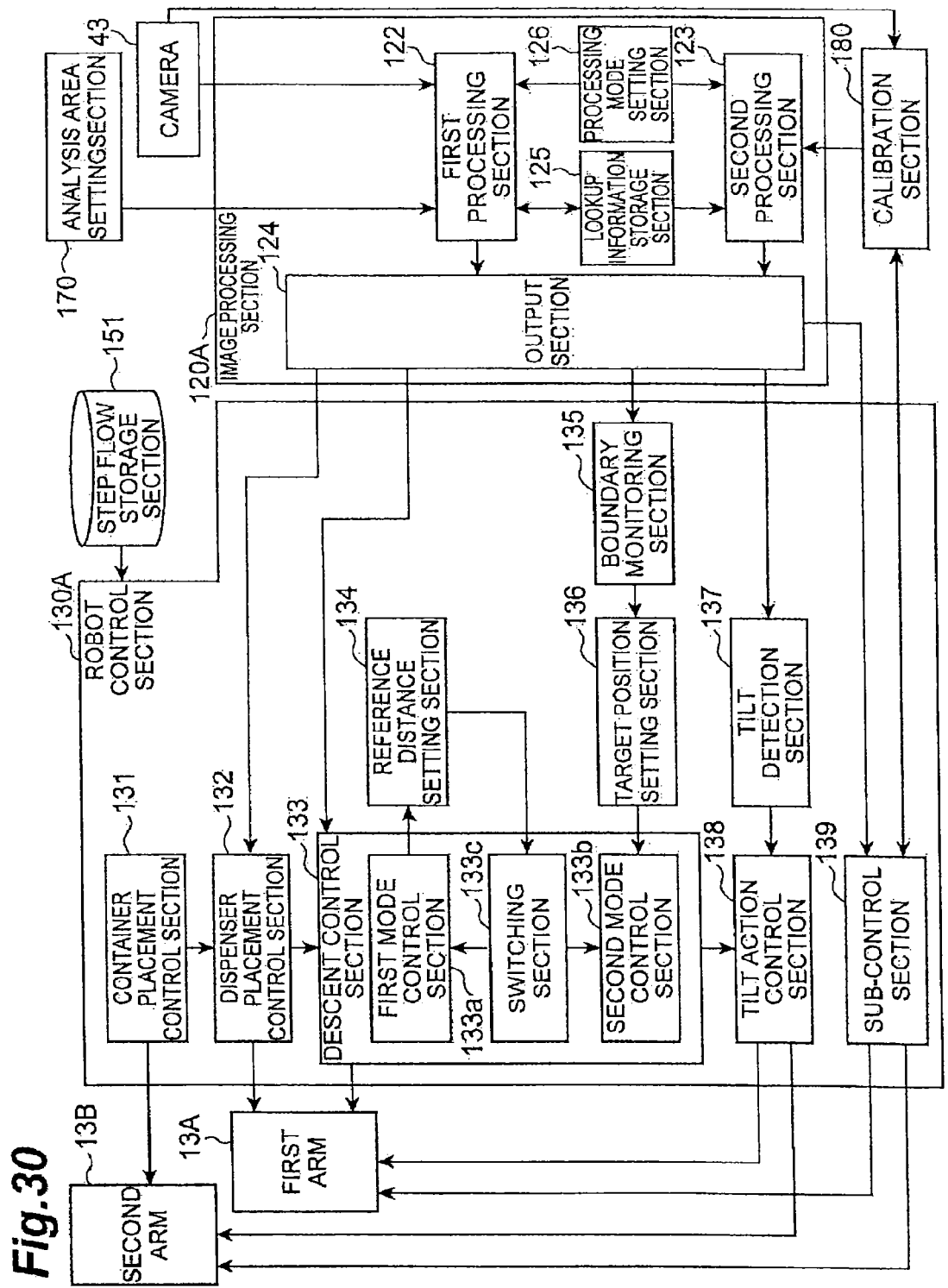
FIG. 30 is a functional block diagram of a robot control section and an image processing section.

The image processing section 120A acquires information on the position of the liquid surface SF1, information on the position of the boundary BD1, and information on the position of the front end section 30a on the basis of an image captured with the camera 43, as shown in FIG. 30. For example, the image processing section 120A includes an image acquisition section 121, a first processing section 122, a second processing section 123, an output section 124, and a lookup information storage section 125.

The image acquisition section 121 acquires an image captured with the camera 43.

The first processing section 122 acquires the information on the position of the liquid surface SF1, the information on the position of the boundary BD1, and information on the position of the front end section 30a on the basis of the image acquired by the image acquisition section 121. For example, the first processing section 122 acquires the information on the position of the liquid surface SF1 from the contents in the first analysis area set by the analysis area setting section 170 and acquires the information on the position of the boundary BD1 from the contents in the second analysis area set by the analysis area setting section 170.

The first processing section 122 may update the information on the position of the liquid surface SF1 on the basis of an image after the acquisition of the information on the position of the liquid surface SF1. For example, the first processing section 122 acquires images from the image acquisition section 121 at a predetermined cycle and updates the information on the position of the liquid surface SF1 on the basis of newly acquired images.

The first processing section 122 may update the information on the position of the boundary BD1 on the basis of an image after the acquisition of the information on the position of the boundary BD1. For example, the first processing section 122 acquires images from the image acquisition section 121 at a predetermined cycle and updates the information on the position of the boundary BD1 on the basis of newly acquired images.

The first processing section 122 may acquire the information on the position of the front end section 30a on the basis of the difference between an image that does not contain the front end section 30a (hereinafter referred to as "first image") and an image that contains the front end section 30a (hereinafter referred to as "second image").

The first processing section 122 may update the information on the position of the front end section 30a on the basis of an image after the acquisition of the information on the position of the front end section 30a. For example, the first processing section 122 acquires images from the image acquisition section 121 at a predetermined cycle and updates the information on the position of the front end section 30a on the basis of newly acquired images.

In this case, the first processing section 122 may acquire an image pattern of the front end section 30a on the basis of the difference between the first image and the second image and acquire the information on the position of the front end section 30a after the acquisition on the basis of the image pattern.

The second processing section 123 estimates a change in the position of the front end section 30a after the information on the position of the front end section 30a is acquired by the first processing section 122 and updates the information on the position of the front end section 30a on the basis of the change in the position.

When the front end section 30a is located above the liquid surface SF1, the first processing section 122 may acquire the information on the position of the front end section 30a on the basis of an image acquired by the image acquisition section 121, and the second processing section 123 may estimate the change in the position after the information on the position is acquired by the first processing section 122.

The second processing section 123 may estimate a change in the position of the liquid surface SF1 after the information on the position of the liquid surface SF1 is acquired by the first processing section 122 and update the information on the position of the liquid surface SF1 on the basis of the change in the position.

The output section 124 acquires the information on the latest positions of the liquid surface SF1, the boundary BD1, and the front end section 30a from the first processing section 122 and the second processing section 123 and outputs the information.

The lookup information storage section 125 stores data to be used in the following processes among the data obtained by the processes carried out by the first processing section 122.

The image processing section 120A may further include a processing mode setting section 126. The processing mode setting section 126 sets whether the first processing section 122 updates the information on the position of the front end section 30a (hereinafter referred to as "first processing mode") or the second processing section 123 updates the information on the position of the front end section 30a (hereinafter referred to as "second processing mode") in accordance with the type of the liquid C1. That is, the image processing section 120A may choose the update of the information on the position of the front end section 30a on the basis of an image after the acquisition of the information on the position of the front end section 30a or the update of the information on the position of the front end section 30a on the basis of the change in the position described above in accordance with the type of the liquid C1 and performs the chosen update.

The processing mode setting section 126 may set whether the first processing section 122 updates the information on the position of the liquid surface SF1 or the second processing section 123 updates the information on the position of the liquid surface SF1. That is, the image processing section 120A may choose the update of the information on the position of the liquid surface SF1 on the basis of an image after the acquisition of the information on the position of the liquid surface SF1 or the update of the information on the position of the liquid surface SF1 on the basis of the change in the position described above in accordance with the type of the liquid C1 and performs the chosen update.

The processing mode setting section 126 may further set whether or not the first processing section 122 updates the information on the position of the boundary BD1 in accordance with the type of the liquid C1. That is, the image processing section 120A may choose whether or not the information on the position of the boundary BD1 is updated on the basis of an image after the acquisition of the information on the position of the boundary BD1 in accordance with the type of the liquid C1.

(4) Robot Control Section

The robot control section 130A is the robot control section 130 to which a sub-control section 139 is added. The sub-control section 139 controls the robot 10 on the basis of a pattern set in advance in place of the descent control section 133 when the information on the position of at least one of the front end section 30a, the liquid surface SF1, and the boundary BD1 is not provided from the image processing section 120A.

3.2 Dispensing Control Procedure (1) Overall Configuration

A dispensing control procedure performed by the controller 100A will be subsequently described as an example of a control method.

Figure 31:
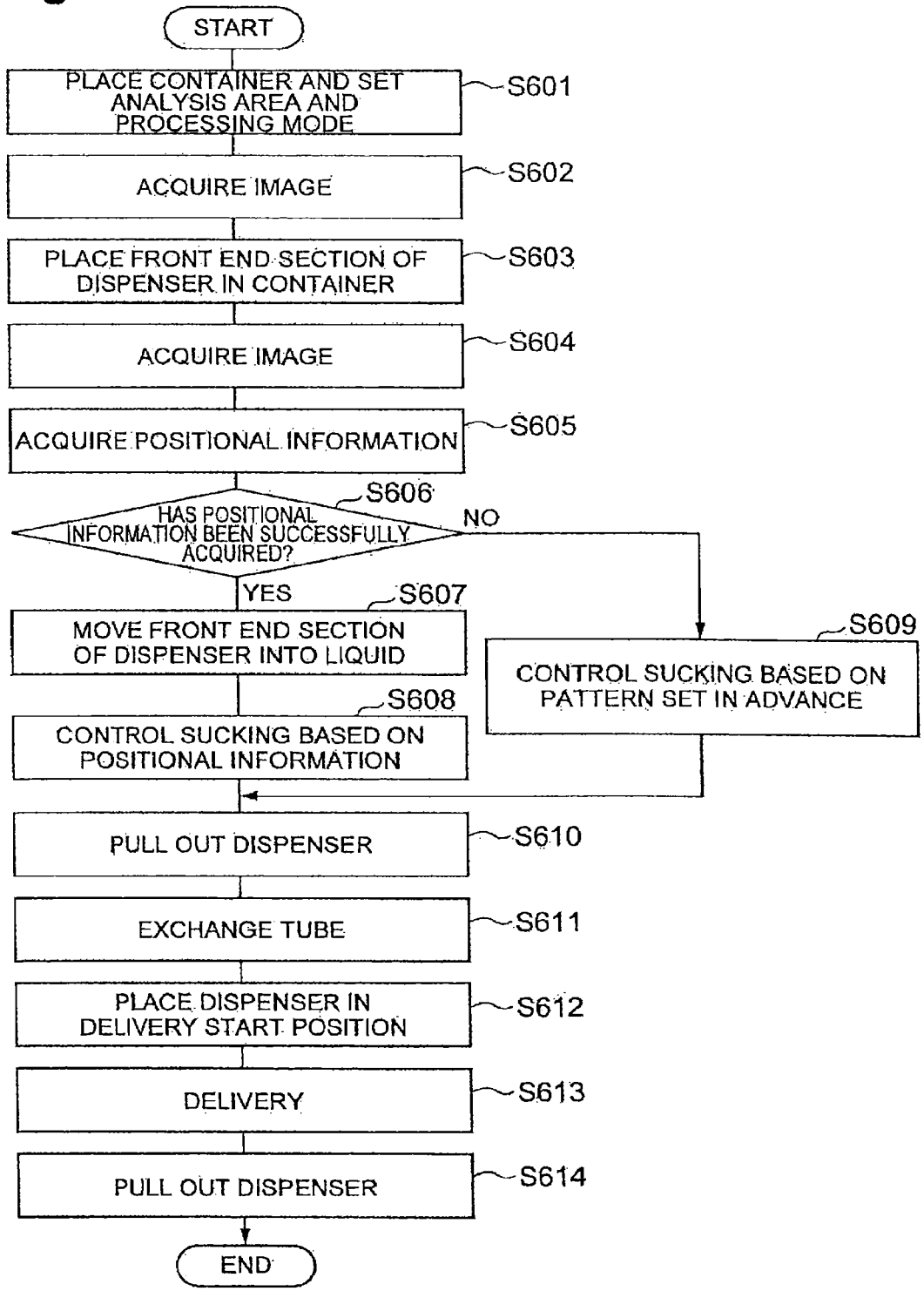
FIG. 31 is a flowchart showing an overview of a dispensing control procedure.

FIG. 31 shows, as an example of dispensing work, a control procedure In accordance with which the liquid C1 in the container 90 is transferred to another container 90. The controller 100A first carries out step S601, as shown in FIG. 31. In step S601, the container placement control section 131 controls the arm 13B so as to place the container 90 in the container holder 44, as in step S301. Further, in step S601, the analysis area setting section 170 acquires the first and second analysis areas, and the processing mode setting section 126 chooses one of the first processing mode and the second processing mode.

The analysis area setting section 170 sets the first analysis area on the basis of information representing the amounts of the liquid C1 and the non-dispensed object C2 contained in the container 90. For example, the information representing the amounts of the liquid C1 and the non-dispensed object C2 is registered in advance by the step flow setting section 111 along with the size and shape of the container 90 in the step flow storage section 151. The analysis area setting section 170 acquires the information on the size and shape of the container 90 and the information representing the amounts of the liquid C1 and non-dispensed object C2 from the step flow storage section 151, calculates the position of the liquid surface SF1 in the container 90 on the basis of the information, and sets the first analysis area in such a way that it contains the position.

The analysis area setting section 170 sets the second analysis area on the basis of the information representing the amount of the non-dispensed object C2. For example, the analysis area setting section 170 acquires the information on the size and shape of the container 90 and the information representing the amount of the non-dispensed object C2 from the step flow storage section 151, calculates the position of the boundary BD1 in the container 90 on the basis of the information, and sets the second analysis area in such a way that it contains the position.

The processing mode setting section 126 chooses one of the first processing mode and the second processing mode in accordance with the type of the liquid C1. For example, the processing mode setting section 126 evaluates whether or not the liquid C1 is a liquid that allows the front end section 30a in the liquid to be recognized by image recognition and chooses the first processing mode when the liquid C1 is a liquid that allows the front end section 30a in the liquid to be recognized by image recognition or otherwise chooses the second processing mode. Whether or not the front end section 30a in the liquid is recognizable by image recognition can be determined, for example, on the basis of the color, light transmissivity, and other factors of the liquid C1. A table that lists whether the front end section 30a located in a variety of liquids C1 is recognizable by image recognition on a liquid basis may be created in advance and referred to.

The controller 100A then carries out steps S602 to S605. In step S602, the backlight control section 160 turns on the light 45, and the image acquisition section 121 acquires an image from the camera 43. The first image described above containing no front end section 30a is thus acquired.

In step S603, the robot control section 130A controls the arm 13A so as to place the front end section 30a of the dispenser 30 in the image acquisition position, as in step S302.

In step S604, the image acquisition section 121 acquires an image from the camera 43. The second image described above containing the front end section 30a is thus acquired.

In step S605, the first processing section 122 acquires the information on the position of the liquid surface SF1, the information on the position of the boundary BD1, and the information on the position of the front end section 30a on the basis of the image acquired by the image acquisition section 121 and stores the acquired information in the lookup information storage section 125.

The first processing section 122 acquires the information on the position of the liquid surface SF1 from the contents in the first analysis area set by the analysis area setting section 170 and acquires the information on the position of the boundary BD1 from the contents in the second analysis area set by the analysis area setting section 170. For example, the first processing section 122 detects a linear portion traversing the first analysis area and acquires the position of the linear portion as the information on the position of the liquid surface SF1. The first processing section 122 detects a linear portion traversing the second analysis area and acquires the position of the linear portion as the information on the position of the boundary BD1.

The first processing section 122 acquires the information on the position of the front end section 30a on the basis of the difference between the first image and the second image. For example, the first processing section 122 calculates the difference between the first image and the second image on pixel basis, extracts an area where the difference is greater than a threshold, and acquires the information on the position of the front end section 30a on the basis of the position of the area. The first processing section 122 stores the acquired information on the position of the front end section 30a in the lookup information storage section 125.

The controller 100A then carries out step S606. In step S606, the output section 124 checks whether or not the information on the positions of all the liquid surface SF1, the boundary BD1, and the front end section 30a has been successfully acquired.

When the output section 124 determines in step S606 that all the pieces of positional information have been successfully acquired, the controller 100A carries out steps S607 and S608. In step S607, the dispenser placement control section 132 controls the arm 13A so as to place the front end section 30a in the sucking start position OP1, as in step S304.

When the first processing mode described above has been chosen in step S601, the first processing section 122 acquires an image from the image acquisition section 121 in the state in which the front end section 30a has been placed in the start position OP1, sets the acquired image to be the second image, acquires an image pattern of the front end section 30a on the basis of the difference between the thus set second image and the first image described above, and registers the image pattern in the lookup information storage section 125.

For example, the first processing section 122 calculates the difference between the first image and the second image on a pixel basis, extracts an area where the difference is greater than a threshold, and cuts out an image pattern corresponding to the area from the second image. The first processing section 122 registers the cut-out image pattern in the lookup information storage section 125.

In step S608, the dispenser control section 140 and the descent control section 133 control the dispenser 30 and the robot 10, respectively, in such a way that the liquid C1 is sucked. The dispenser control section 140 controls the dispenser 30 so as to suck the liquid C1 from the interior of the container 90. When the liquid is sucked into the dispenser 30, the descent control section 133 controls the robot 10 so as to cause the dispenser 30 to descend on the basis of the information on the position of the front end section 30a, the information on the position of the liquid surface SF1, and the information on the position of the boundary BD1. When the descent of the dispenser 30 is completed, the backlight control section 160 turns off the light 45.

When the output section 124 determines in step S606 that any of the pieces of positional information has not been acquired, the controller 100A carries out step S609 instead of steps S607 and S608. In step S609, the dispenser control section 140 and the sub-control section 139 control the dispenser 30 and the robot 10, respectively, in such a way that the liquid C1 is sucked. The dispenser control section 140 controls the dispenser 30 so as to suck the liquid C1 from the interior of the container 90. The sub-control section 139 controls the robot 10 on the basis of a pattern set in advance so as to cause the dispenser 30 to descend.

The controller 100A then carries out steps S610 to S614, which are the same as steps S306 to S310. The dispensing work is thus completed.

(2) Sucking Control Procedure

The sucking procedure in step S608 will subsequently be described in detail.

Figure 32:
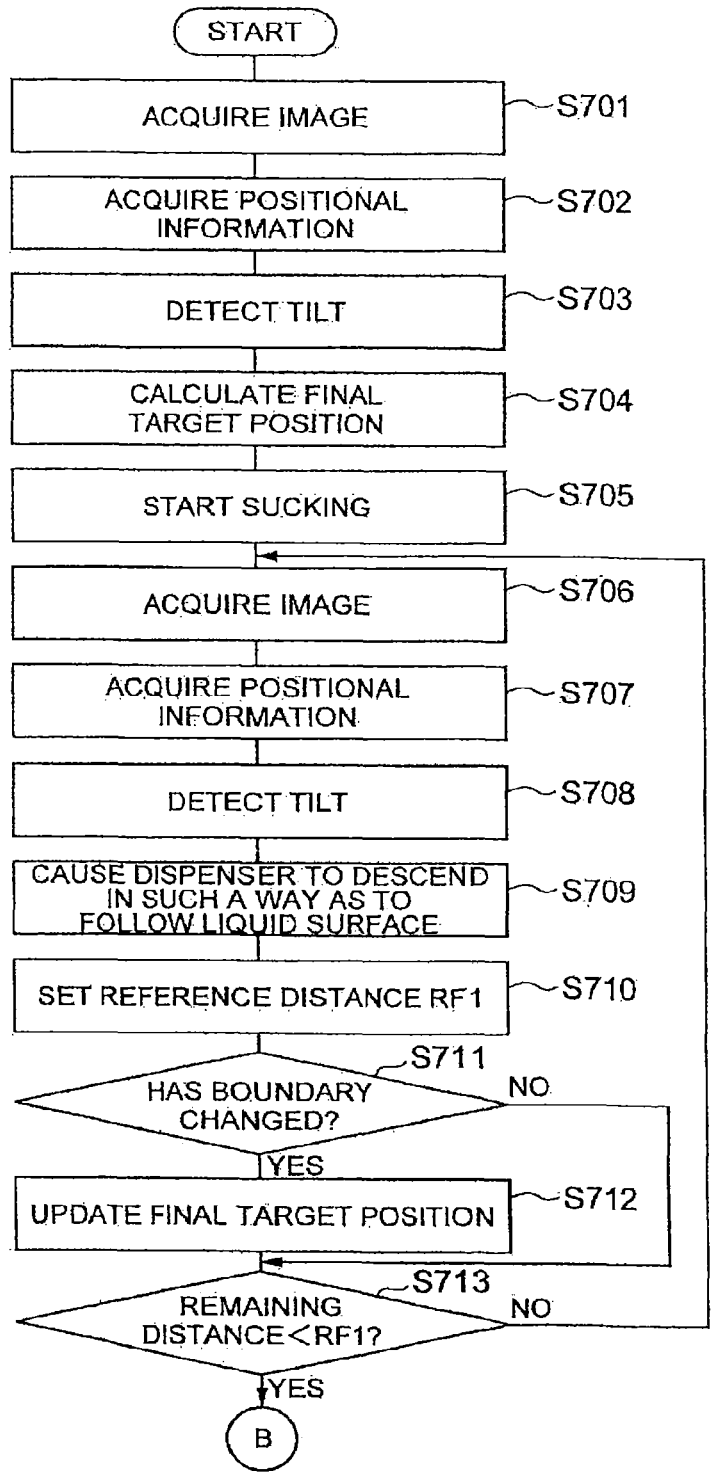
FIG. 32 is a flowchart showing a control procedure at the time of sucking.

The controller 100A first carries out step S701, as shown in FIG. 32. In step S701, the image acquisition section 121 acquires an image from the camera 43.

The controller 100A then carries out step S702. In step S702, at least one of the first processing section 122 and the second processing section 123 updates the information on the positions of the liquid surface SF1, the boundary BD1, and the front end section 30a.

Figure 34:
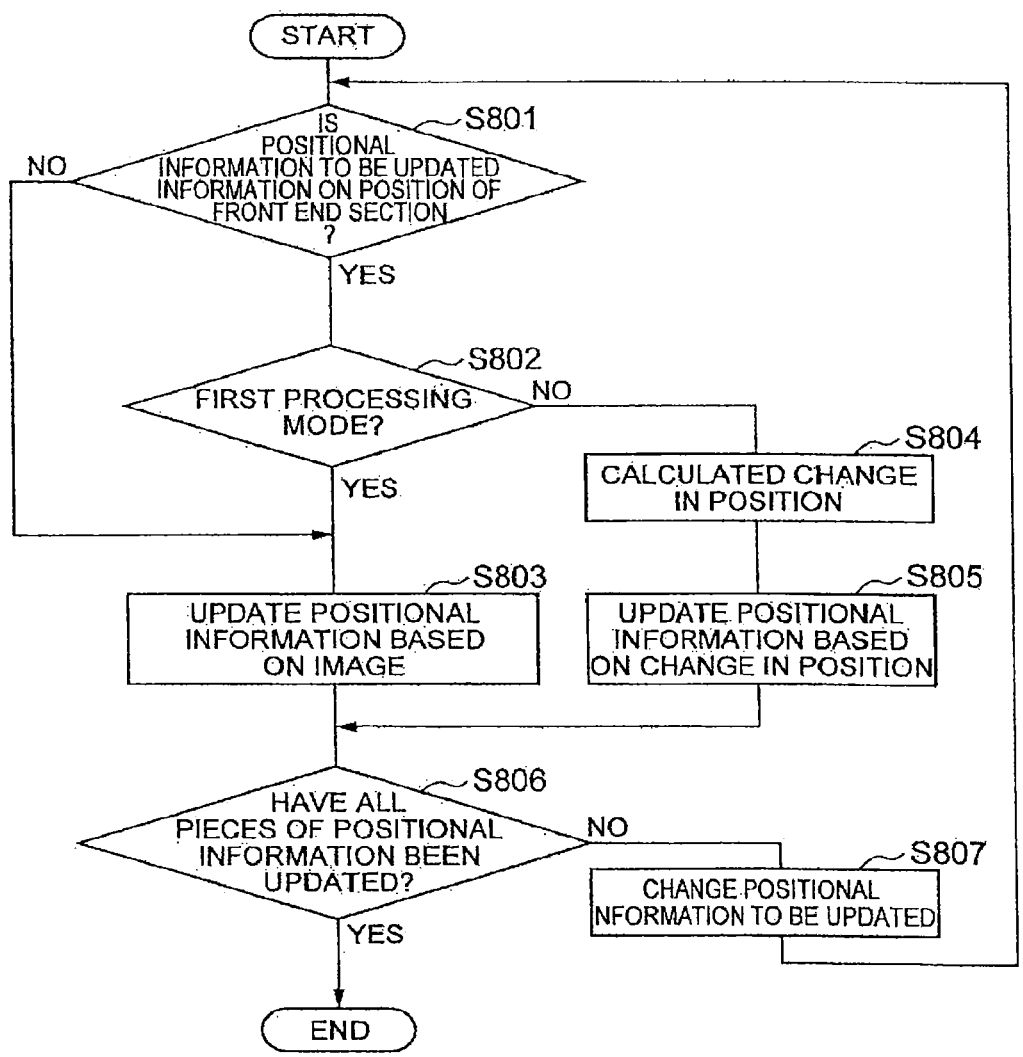
FIG. 34 is a flowchart showing a positional information update procedure.

An example of the positional information update procedure will be shown with reference to FIG. 34. The controller 100A first carries out step S801. In step S801, the first processing section 122 checks whether or not the positional information to be updated is the information on the position of the front end section 30a.

When the first processing section 122 determines in step S801 that the positional information to be updated is the information on the position of the front end section 30a, the controller 100A carries out step S802. In step S802, the first processing section 122 checks whether or not the first processing mode has been chosen in step S601.

When the first processing section 122 determines in step S802 that the first processing mode has been chosen, the controller 100A carries out step S803. In step S803, the first processing section 122 updates the information on the position of the front end section 30a on the basis of the latest image. For example, the first processing section 122 extracts a portion that coincides with the image pattern registered in the lookup information storage section 125 in step S607 from the contents in the latest image and updates the information on the position of the front end section 30a on the basis of the position of the extracted portion.

When the first processing section 122 determines in step S802 that the second processing mode has been chosen, the controller 100A carries out steps S804 and S805 instead of step S803. In step S804, the second processing section 123 estimates a change in the position of the front end section 30a after step S605 is carried out.

For example, the second processing section 123 acquires, from the robot control section 130A, information representing the amount by which all actuators that affect the position of the front end section 30a among the actuators of the robot 10 are driven after step S605 is carried out. The second processing section 123 then performs quasi-kinematic operation on the basis of the amounts of drive operation described above to estimate a change in the position of the front end section 30a.

In step S805, the second processing section 123 updates the information on the position of the front end section 30a on the basis of the change in the position estimated in step S804. For example, the second processing section 123 adds the change in the position estimated in step S804 to the information on the position of the front end section 30*a* stored in the lookup information storage section 125 in step S605 to update the information on the position of the front end section 30*a*.

When the first processing section 122 determines in step S801 that the positional information to be updated is the information on the position of the liquid surface SF1 or the boundary BD1, the controller 100A proceeds to the process in step S803 without carrying out step S802.

When the positional information to be updated is the information on the position of the liquid surface SF1, the first processing section 122, in step S803, newly acquires the information on the position of the liquid surface SF1 from the contents in the first analysis area in the latest image and updates the information on the position of the liquid surface SF1 to the newly acquired information.

When the positional information to be updated is the information on the position of the boundary BD1, the first processing section 122, in step S803, newly acquires the information on the position of the boundary BD1 from the contents in the second analysis area in the latest image and updates the information on the position of the boundary BD1 to the newly acquired information.

The controller 100A then carries out step S806. In step S806, the output section 124 checks whether or not the information on the positions of all the liquid surface SF1, the boundary BD1, and the front end section 30*a* has been updated.

When the output section 124 determines in step S806 that all the pieces of positional information have not been updated, the controller 100A changes the positional information to be updated (step S807) and returns to the process in step S801. The positional information update is thus repeated until all the pieces of positional information have been updated.

When the output section 124 determines in step S806 that all the pieces of positional information have been updated, the controller 100A completes step S702 described above.

FIG. 34 shows the case where only the procedure of updating the information on the position of the front end section 30*a* is switched in accordance with which of the first processing mode and the second processing mode has been chosen, but the update procedure is not limited thereto. For example, when the second processing mode has been chosen in step S601, the second processing section 123 may estimate a change in the position of the liquid surface SF1 after step S605 is carried out and update the information on the position of the liquid surface SF1 on the basis of the change in the position.

For example, the second processing section 123 estimates a change in the position of the liquid surface SF1 on the basis of information representing the sucking speed of the dispenser 30 and information on the size and shape of the container 90. The second processing section 123 then adds a result of the estimation of a change in the position to the information on the position of the liquid surface SF1 stored in the lookup information storage section 125 in step S605 to update the information on the position of the liquid surface SF1. The information representing the sucking speed of the dispenser 30 can be acquired, for example, from the dispenser control section 140. The information on the size and shape of the container 90 can be acquired from the step flow storage section 151, as described above.

When the second processing mode has been chosen in step S601, the second processing section 123 does not need to update the information on the position of the boundary BD1.

Referring back to FIG. 32, the controller 100A carries out step S703. In step S703, the tilt detection section 137 detects tilt of the boundary BD1 on the basis of the latest image, as in step S404. In step S703, the tilt of the boundary BD1 may instead be detected on the basis of the information on the latest position of the boundary BD1.

The controller 100A then carries out step S704. In step S704, the target position setting section 136 sets the final target position GL1 on the basis of the information on the latest position of the boundary BD1, as in step S405.

The controller 100A then carries out step S705. In step S705, the dispenser control section 140 controls the dispenser 30 so as to start sucking the liquid C1 in the container 90.

The controller 100A then carries out steps S706 to S708, which are the same as steps S701 to S703.

The controller 100A then carries out step S709. In step S709, the first mode control section 133*a* performs the descent control in the first mode described above, as in step S409.

The controller 100A then carries out step S710. In step S710, the reference distance setting section 134 sets the reference distance RF1, as in step S410.

The controller 100A then carries out step S711. In step S711, the boundary monitoring section 135 evaluates whether or not the boundary BD1 has changed on the basis of the information on the latest position of the boundary BD1, as in step S411. When no change in the boundary has been detected in step S711, the controller 100A proceeds to the process in step S713.

When a change in the boundary BD1 has been detected in step S711, the controller 100A carries out step S712. In step S712, the target position setting section 136 updates the final target position GL1 on the basis of the information on the latest position of the boundary BD1, as in step S412.

The controller 100A then carries out step S713. In step S713, the switching section 133*c* evaluates whether or not the first remaining distance LD1 is smaller than the reference distance RF1, as in step S413. When the switching section 133*c* determines that the first remaining distance LD1 is greater than or equal to the reference distance RF1, the controller 100A returns to the process in step S706. The control performed by the first mode control section 133*a* thus continues.

Figure 33:
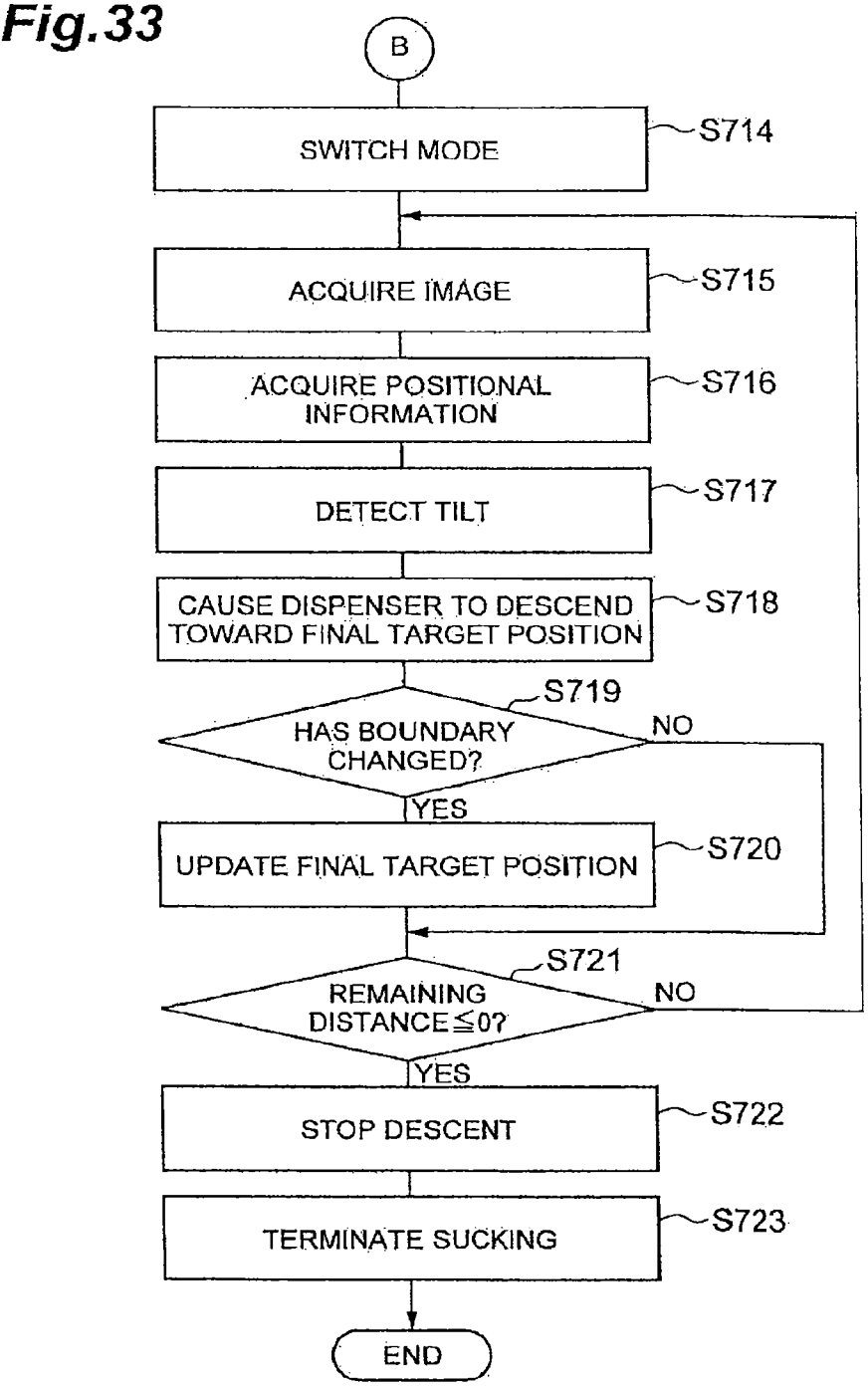
FIG. 33 is a flowchart showing the control procedure at the time of sucking.

When the switching section 133*c* determines that the first remaining distance LD1 is smaller than the reference distance RF1, the controller 100A proceeds to the process in step S714. In step S714, the switching section 133*c* switches the control performed by the first mode control section 133*a* to the control performed by the second mode control section 133*b*, as in step S414, as shown in FIG. 33.

The controller 100A then carries out steps S715 to S717, which are the same as steps S701 to S703.

The controller 100A then carries out step S718. In step S718, the second mode control section 133*b* performs the descent control in the second mode described above, as in step S418.

The controller 100A then carries out step S719, which is the same as step S711. When a change in the boundary BD1 is detected in step S719, the controller 100A carries out step S720, which is the same as step S712.

The controller 100A then carries out step S721. In step S721, the second mode control section 133*b* detects whether or not the first remaining distance LD1 is zero or smaller, as in step S421. When the second mode control section 133b determines that the first remaining distance LD1 is greater than zero, the controller 100A returns to the process in step S715. The control performed by the second mode control section 133b thus continues.

When the second mode control section 133b determines that the first remaining distance LD1 is smaller than or equal to zero, the controller 100A carries out steps S722 and S723, which are the same as steps S422 and S423. The sucking procedure is thus completed.

3.3 Advantageous Effects of Second Embodiment

As illustrated above in the second embodiment, the image processing section 120A may estimate a change in the position of the front end section 30a after the acquisition of the information on the position of the front end section 30a and update the information on the position of the front end section 30a on the basis of the change in the position. It is likely to be difficult to recognize the front end section 30a, when it is located in the liquid C1, by image recognition as compared with the recognition of the liquid surface SF1 and the boundary BD1, whereas a change in the position of the front end section 30a is readily estimated from the state of the robot 10. Therefore, estimating the information on the position of the front end section 30a from a change in the position allows an increase in reliability of the control performed by the descent control section.

The image processing section 120A may update the information on the position of the liquid surface SF1 and the information on the position of the boundary BD1 on the basis of an image after the acquisition of the information on the position of the liquid surface SF1 and the information on the position of the boundary BD1. It is difficult to estimate changes in the positions of the liquid surface SF1 and the boundary BD1 from the state of the robot, whereas the liquid surface SF1 and the boundary BD1 tend to be readily recognized by image recognition as compared with the front end section 30a located in the liquid C1. Therefore, updating the information on the position of the front end section 30a by using estimation of the positional information and updating the information on the positions of the liquid surface SF1 and the boundary BD1 on the basis of images allow a further increased in the reliability of the control performed by the descent control section.

The image processing section 120A may acquire the information on the position of the front end section 30a on the basis of an image when the front end section 30a is located above the liquid surface SF1 and estimate a change in the position after the acquisition of the information. The contrast of the front end section 30a and portions thereabout in an image tends to be higher when the front end section 30a is present outside the liquid than inside the liquid. Therefore, when the front end section 30a is located above the liquid surface SF1, acquiring the information on the position of the front end section 30a on the basis of an image and estimating a change in the position afterward to update the information on the position of the front end section 30a also allows highly accurate acquisition of the information on the position of the front end section 30a located in the liquid C1.

The image processing section 120A may choose update of the information on the position of the front end section 30a on the basis of an image after acquisition of the information on the position of the front end section 30a (first processing mode) or update of the information on the position of the front end section 30a on the basis of a change in the position (second processing mode) in accordance with the type of the liquid C1 and perform the chosen update. The type of the liquid C1 greatly affects the visibility of an object in the liquid. When the visibility of an object in the liquid C1 is high, updating the information on the position of the front end section 30a on the basis of an image allows an increase in adaptability to disturbance. When the visibility of an object in the liquid C1 is low, updating the information on the position of the front end section 30a on the basis of an image undesirably lowers the reliability of the control. To overcome the problem, the first processing mode and the second processing mode are switched from one to the other in accordance with the type of the liquid C1 to increase the adaptability to disturbance with the reliability of the control maintained.

The sub-control section 139, which controls the robot 10 in place of the descent control section 133 on the basis of a pattern set in advance when at least one of the information on the position of the liquid surface SF1 and the information on the position of the boundary BD1 cannot be obtained, may be further provided. In this case, even when no positional information is obtained, the robot 10 can be controlled continuously, whereby delay in the following processes can be avoided.

The image processing section 120A may acquire the information on the position of the front end section 30a on the basis of the difference between an image that does not contain the front end section 30a and an image that contains the front end section 30a. In this case, the information on the position of the front end section 30a can be acquired in simple computation. Further, since no image pattern for pattern matching is required to be registered in advance, work of registering the image pattern can be omitted so that the operation procedure can be simplified. Moreover, variation in, the image pattern registered by registration operators can be lowered, whereby variation in the accuracy in acquisition of the positional information performed by the image processing section can be suppressed.

The image processing section 120A may acquire an image pattern of the front end section 30a on the basis of the difference between an image that does not contain the front end section 30a and an image that contains the front end section 30a and the positional information of front end section 30a based on this image pattern. In this case, after the acquisition of the image pattern on the basis of the difference between the images, the position of the front end section 30a can be tracked by pattern matching even when the front end section 30a moves in the images.

The controller 100A may further include the analysis area setting section 170, which sets the first analysis area, which is an area for searching for the liquid surface SF1 in an image, on the basis of the information representing the amounts of the liquid C1 and the non-dispensed object C2 contained in the container 90. The image processing section 120A may acquire the information on the position of the liquid surface SF1 from the contents in the first analysis area.

The position of the liquid surface SF1 can be roughly estimated on the basis of information representing the amounts of the liquid C1 and the non-dispensed object C2 contained in the container 90. The first analysis area can therefore be correctly set on the basis of the information. Correctly setting the first analysis area to limit the range over which the liquid surface SF1 is searched for in an image allows suppression of wrong recognition of the liquid surface SF1 for an increase in the accuracy in acquisition of the information on the position of the liquid surface SF1.

Providing the analysis area setting section 170 eliminates the operator's need for registration of the first analysis area in advance, whereby the operation procedure can be simplified. Further, variation in the first analysis area registered by registration operators can be lowered. The decrease in the variation also increases the accuracy in acquisition of the information on the position of the liquid surface SF1.

The analysis area setting section 170 may further set the second analysis area, which is an area for searching for the boundary BD1 in an image, on the basis of the information representing the amount of the non-dispensed object C2. The image processing section 120A may acquire the information on the position of the boundary BD1 from the contents in the second analysis area.

The position of the boundary BD1 can be roughly estimated on the basis of the information representing the amount of the non-dispensed object C2. The second analysis area can therefore be correctly set on the basis of the information. Correctly setting the second analysis area to limit the range over which the boundary BD1 is searched for in an image allows suppression of wrong recognition of the boundary BD1 for an increase in the accuracy in acquisition of the information on the position of the boundary BD1.

Since the operator does not need to register the second analysis area in advance, the operation procedure can be further simplified. Further, variation in the second analysis area registered by registration operators can be lowered. The decrease in the variation also increases the accuracy in acquisition of the information on the position of the boundary BD1.

The controller 100A may be configured to further perform calibration of the position of the front end section 30a with respect to the robot 10 on the basis of an image captured with the camera 43 in the rack 40. The calibration of the position of the front end section 30a with respect to the robot 10 means that a parameter required to determine the position of the front end section 30a on the basis of the posture of the robot 10 is calculated.

For example, the controller 100A may further include a calibration section 180, as shown in FIG. 30. The calibration section 180 acquires a plurality of images from the camera 43 with the robot 10 controlled via the sub-control section 139 in such a way that the robot 10 changes the posture of the front end section 30a outside the container 90. The calibration section 180 calculates the parameter described above on the basis of the position of the front end section 30a in each of the acquired images and the posture of the robot 10 at the time of the acquisition of the image.

The position of the front end section 30a with respect to the robot 10 may vary depending on the state in which the robot 10 grips the dispenser 30 and other factors. In contrast, using the parameter described above calculated by the calibration section 180 allows accurate calculation of the position of the front end section 30a on the basis of the posture of the robot 10. When the controller 100A includes the calibration section 180, the second processing section 123 may estimate a change in the position of the front end section 30a by using the parameter calculated by the calibration section 180. The sub-control section 139 may also control the robot 10 by using the parameter calculated by the calibration section 180.

As described above, using the camera 43 in the rack 40 also in the calibration described above allows an increase in the reliability of dispensing work performed by the robot 10 without any hardware configuration added to the dispensing system.

The embodiments have been described above, but the present invention is not necessarily limited to the embodiments described above, and a variety of changes can be made thereto to the extent that the changes do not depart from the substance of the present invention.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

When the robot 10 causes the dispenser 30 to descend to allow sucking of the liquid C1, repeating the acquisition of an image and the acquisition of the variety of pieces of positional information is not essential. For example, the controller 100 may be configured, after the image processing section 120 once acquires the variety of pieces of positional information, to perform the following calculation of the positional information with reference to the acquired positional information. The dispenser 30 is not limited to a motorized pipette. The dispenser 30 may, for example, be a syringe. In this case, the controller 100 may control the robot 10 in such a way that one of the arms 13A and 13B grips the outer tube of the syringe and the other one of the arms 13A and 13B pushes and pulls the plunger of the syringe.

What is claimed is:

1. A rack for dispensing, comprising:
a stage;
a container holder that is fixed to the stage and holds a container that contains a liquid to be dispensed;
a camera fixed to the stage in a position where the camera captures an image of the container held by the container holder; and
a stage holder that holds the stage such that the stage is tiltable around a first axis along a direction in which the container holder and the camera are aligned with each other, wherein
the stage holder comprises a support plate, and a hinge configured to link the stage with the support plate such that the stage and the support plate are rotatable with respect to each other around one side of the support plate along the first axis.

2. The rack for dispensing according to claim 1, wherein the first axis is parallel to a central axis of the camera and positioned between the central axis of the camera and the stage.

3. The rack for dispensing according to claim 2, further comprising an angle keeper that allows rotation of the stage when torque resulting from external force acts on the stage and restricts rotation of the stage when no torque resulting from external force acts on the stage.

4. The rack for dispensing according to claim 1, further comprising an angle keeper that allows rotation of the stage when torque resulting from external force acts on the stage and restricts rotation of the stage when no torque resulting from external force acts on the stage.

5. The rack for dispensing according to claim 1, further comprising:
a first handle that is positioned on one end side of the stage in a direction in which the first axis extends and transmits torque to the stage; and
a second handle that is positioned on another end side of the stage in the direction in which the first axis extends and transmits torque to the stage.

6. The rack for dispensing according to claim 5, wherein the first axis is parallel to a central axis of the camera and positioned between the central axis of the camera and the stage.

7. The rack for dispensing according to claim 5, further comprising an angle keeper that allows rotation of the stage when torque resulting from external force acts on the stage and restricts rotation of the stage when no torque resulting from external force acts on the stage.

8. The rack for dispensing according to claim 1, further comprising a light fixed to the stage and positioned to radiate light toward the container held by the container holder.

9. The rack for dispensing according to claim 8, wherein the container holder is positioned between the camera and the light.

10. The rack for dispensing according to claim 1, wherein the container holder includes a first part and a second part formed to sandwich a central axis of the camera such that the first part and the second part approach each other to sandwich the container, and at least one elastic member that produces repulsive force that causes the first part and the second part to approach each other.

11. The rack for dispensing according to claim 10, further comprising a linkage that causes the first part and the second part to synchronously move such that amounts of movement of the first part and the second part are equal to each other when the first part and the second part approach or move away from each other.

12. The rack for dispensing according to claim 1, further comprising means for allowing rotation of the stage when torque resulting from external force acts on the stage and restricting rotation of the stage when no torque resulting from external force acts on the stage.

13. The rack for dispensing according to claim 1, wherein the camera is fixed to the stage in a posture in which the camera captures the image such that the image includes a surface of the liquid in the container to be linear when the container is tilted.

14. A dispensing system, comprising:
a rack for dispensing a liquid, including a container holder that is fixed to a stage and holds a container that contains the liquid, a camera fixed to the stage in a position where the camera captures an image of the container held by the container holder, and a stage holder that holds the stage such that the stage is tiltable around a first axis along a direction in which the container holder and the camera are aligned with each other, the stage holder comprising a support plate, and a hinge configured to link the stage with the support plate such that the stage and the support plate are rotatable with respect to each other around one side of the support plate along the first axis;
a robot configured to transport the container, tilt the rack and descent a dispenser; and
a controller comprising circuitry configured to control the robot to transport the container and cause the container holder to hold the container, acquire information on a position of a liquid surface of the liquid based on the image captured with the camera, control the robot to tilt the rack around the first axis, and control the robot to cause the dispenser to descend based on the information on the position of the liquid surface when the liquid is sucked into the dispenser.

15. The dispensing system according to claim 14, wherein the first axis is parallel to a central axis of the camera and positioned between the central axis of the camera and the stage.

16. The dispensing system according to claim 14, wherein the circuitry of the controller is further configured to calibrate a position of a front end section of the dispenser with respect to the robot based on the image captured with the camera.

17. The dispensing system according to claim 14, wherein the circuitry is further configured to the acquire information on a position of a liquid surface of the liquid by performing image processing on the image captured with the camera.

18. A rack for dispensing, comprising:
a stage;
a container holder that is fixed to the stage and holds a container that contains a liquid to be dispensed; and
a camera fixed to the stage in a position where the camera captures an image of the container held by the container holder,
wherein the container holder includes a first part and a second part formed to sandwich a central axis of the camera such that the first part and the second part approach each other to sandwich the container, and at least one elastic member that produces repulsive force that causes the first part and the second part to approach each other.

19. The rack for dispensing according to claim 18, further comprising a linkage that causes the first part and the second part to synchronously move such that amounts of movement of the first part and the second part are equal to each other when the first part and the second part approach or move away from each other.

20. A rack for dispensing, comprising:
a stage;
a container holder that is fixed to the stage and holds a container that contains a liquid to be dispensed;
a camera fixed to the stage in a position where the camera captures an image of the container held by the container holder; and
a stage holder that holds the stage such that the stage is tiltable around a first axis along a direction in which the container holder and the camera are aligned with each other, wherein
the first axis is parallel to a central axis of the camera and positioned between the central axis of the camera and the stage.

* * * * *